US012355672B2

(12) United States Patent
Oge et al.

(10) Patent No.: US 12,355,672 B2
(45) Date of Patent: Jul. 8, 2025

(54) COMMUNICATION CONTROL DEVICE, INFORMATION PROCESSING DEVICE, COMMUNICATION CONTROL METHOD, AND INFORMATION PROCESSING METHOD

(71) Applicant: KABUSHIKI KAISHA TOSHIBA, Tokyo (JP)

(72) Inventors: Yasin Oge, Sagamihara (JP); Takahiro Yamaura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 341 days.

(21) Appl. No.: 17/939,164

(22) Filed: Sep. 7, 2022

(65) Prior Publication Data
US 2023/0171198 A1 Jun. 1, 2023

(30) Foreign Application Priority Data

Dec. 1, 2021 (JP) .................................. 2021-195486

(51) Int. Cl.
*H04L 47/50* (2022.01)
(52) U.S. Cl.
CPC .................................. *H04L 47/50* (2013.01)
(58) Field of Classification Search
CPC ......... H04L 47/50; H04L 47/56; H04L 47/62; H04L 47/24; H04L 13/00; H04L 12/87;
(Continued)

(56) References Cited

U.S. PATENT DOCUMENTS 10,754,816 B2 * 8/2020 Kasichainula ...... H04L 12/4645
11,140,679 B2 * 10/2021 Nishimura .............. H04L 47/56
(Continued)

FOREIGN PATENT DOCUMENTS

CN 112003791 A 11/2020
JP 2015-115704 A 6/2015
(Continued)

OTHER PUBLICATIONS

"IEEE Standard for Local and metropolitan area networks—Bridges and Bridged Networks—Amendment 25: Enhancements for Scheduled Traffic", IEEE Std 802.1Qbv™-2015 (Amendment to IEEE Std 802.1Q™-2014 as amended by IEEE Std 802.1Qca™-2015, IEEE Std 802.1Qcd™ 2015, and IEEE Std 802.1Q-2014/Cor Jan. 2015), 2016, 57 pages, DOI: 10.1109/IEEESTD.2016.8613095.
"IEEE Standard for Local and Metropolitan Area Network—Bridges and Bridged Networks", IEEE Std 802.1Q™-2018 (Revision of IEEE Std 802.1Q-2014)2018, 1993 pages, DOI: 10.1109/IEEESTD.2018.8403927.
(Continued)

*Primary Examiner* — Man U Phan
(74) *Attorney, Agent, or Firm* — Oblon, McClelland, Maier & Neustadt, L.L.P.

(57) ABSTRACT

According to one embodiment, a communication control device includes a transmission control unit and a communication unit. The transmission control unit is configured to control transfer start timing of a first message stored in a queue, based on gate control information. The communication unit is configured to transmit the first message transferred from the transmission control unit in accordance with the transfer start timing. The transfer start timing of the first message is determined based on a transmission cost at a time when a second message, which has been already determined to pass through the gate, is transmitted by the communication unit, and a transfer status of the second message between the transmission control unit and the communication unit.

11 Claims, 49 Drawing Sheets

(58) Field of Classification Search
CPC . H04L 12/44; H04L 12/94; H04L 5/14; H04L 47/20; H04L 47/22; H04L 47/28; H04L 12/86; H04L 49/90; G06F 13/12; G06F 13/28; G06F 13/16; G06F 9/54; H04W 72/04; H04W 72/12; H04W 72/52; H04W 72/56; H04W 72/10; H04W 28/02; H04W 28/10; H04W 84/04
USPC .......................................................... 370/429
See application file for complete search history.

(56) References Cited

U.S. PATENT DOCUMENTS

| | | | | |
|---|---|---|---|---|
| 11,620,255 | B2* | 4/2023 | Kasichainula | H04L 12/4645 709/212 |
| 11,755,517 | B2* | 9/2023 | Yamaura | G06F 13/1642 710/308 |
| 11,811,665 | B2* | 11/2023 | Mardmoeller | H04L 47/622 |
| 11,824,788 | B2* | 11/2023 | Ko | H04L 45/3065 |
| 11,844,063 | B2* | 12/2023 | Nishimura | H04L 5/14 |
| 11,882,053 | B2* | 1/2024 | Oge | H04L 47/30 |
| 12,047,288 | B2* | 7/2024 | Kobayashi | H04L 49/90 |
| 12,081,321 | B2* | 9/2024 | Zemach | H04J 3/06 |
| 2019/0215832 | A1 | 7/2019 | Nishimura | |
| 2021/0377189 | A1* | 12/2021 | Yamaura | H04L 47/6295 |
| 2022/0197841 | A1 | 6/2022 | Yamaura et al. | |
| 2023/0171200 | A1* | 6/2023 | Yamaura | H04L 47/283 370/392 |

FOREIGN PATENT DOCUMENTS

| | | |
|---|---|---|
| JP | 2018-125597 A | 8/2018 |
| JP | 2019-4379 | 1/2019 |
| JP | 2019-96930 | 6/2019 |
| JP | 6867240 B2 | 4/2021 |
| JP | 2021-190902 A | 12/2021 |
| JP | 2022-096476 A | 6/2022 |
| JP | 2023-81629 A | 6/2023 |

OTHER PUBLICATIONS

Notice of Refusal dated Feb. 12, 2025, issued in corresponding application No. 2021-195486 (with English translation)(citing documents 15-17).

* cited by examiner

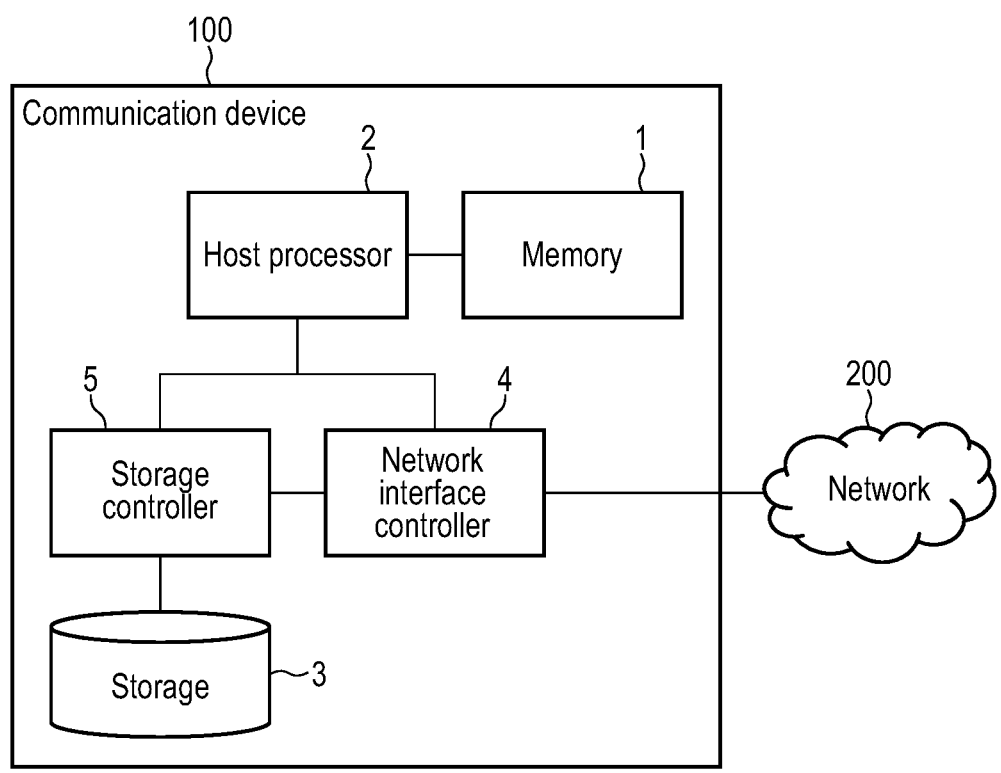
F I G. 1

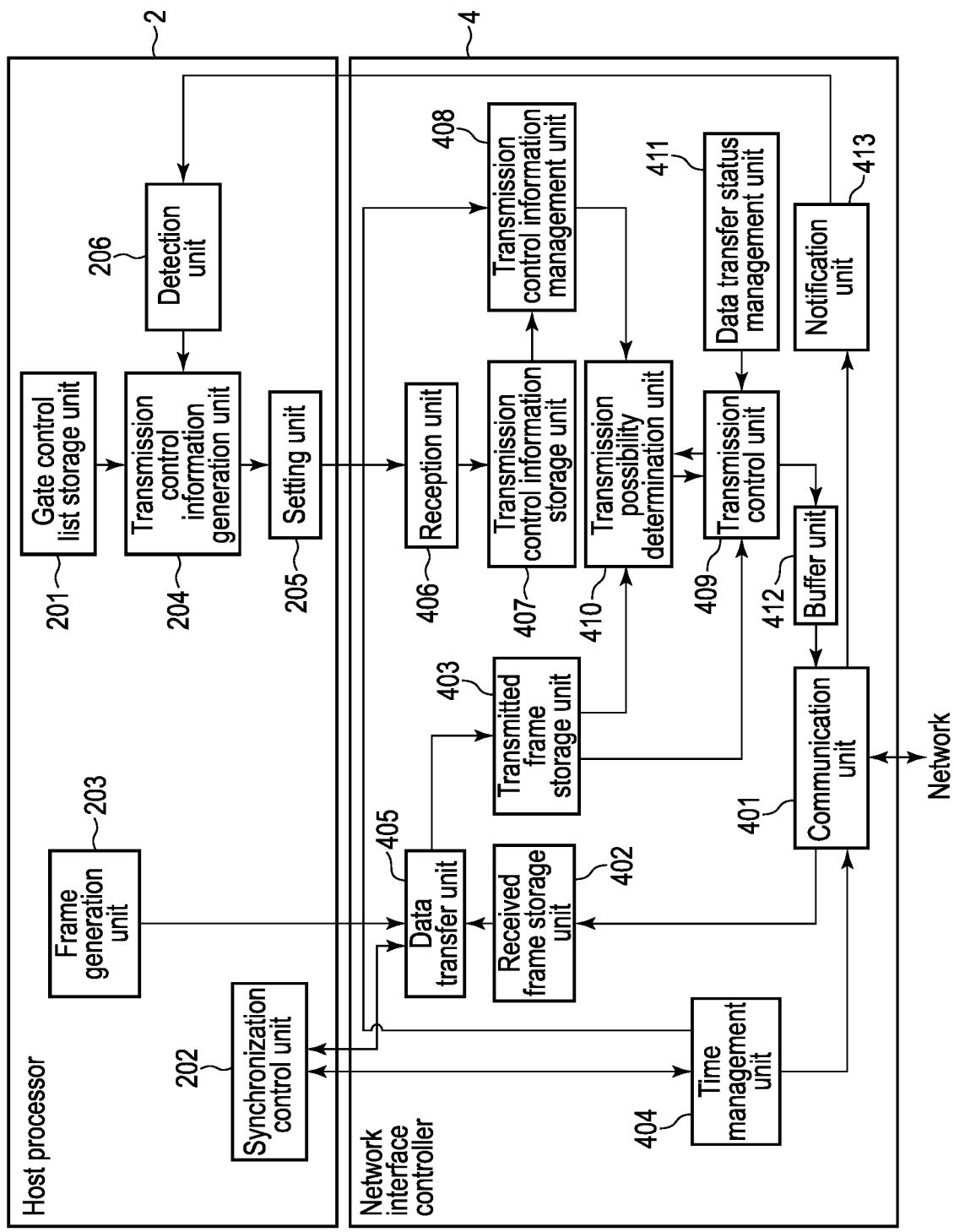
F I G. 2

| | Operations | Gate statuses | | | | | | | | Time intervals |
|---|---|---|---|---|---|---|---|---|---|---|
| | | TC7 | TC6 | TC5 | TC4 | TC3 | TC2 | TC1 | TC0 | |
| T00 | SetGateStates | o | C | o | C | o | C | o | o | 128μs |
| T01 | SetGateStates | C | o | o | o | o | o | o | o | 128μs |
| T02 | SetGateStates | o | o | C | o | C | o | C | o | 512μs |
| T03 | SetGateStates | o | C | C | o | C | o | C | o | 128μs |
| T04 | SetGateStates | C | C | o | C | o | C | o | o | 128μs |
| T05 | SetGateStates | o | C | o | C | o | C | o | o | 512μs |

F I G. 3

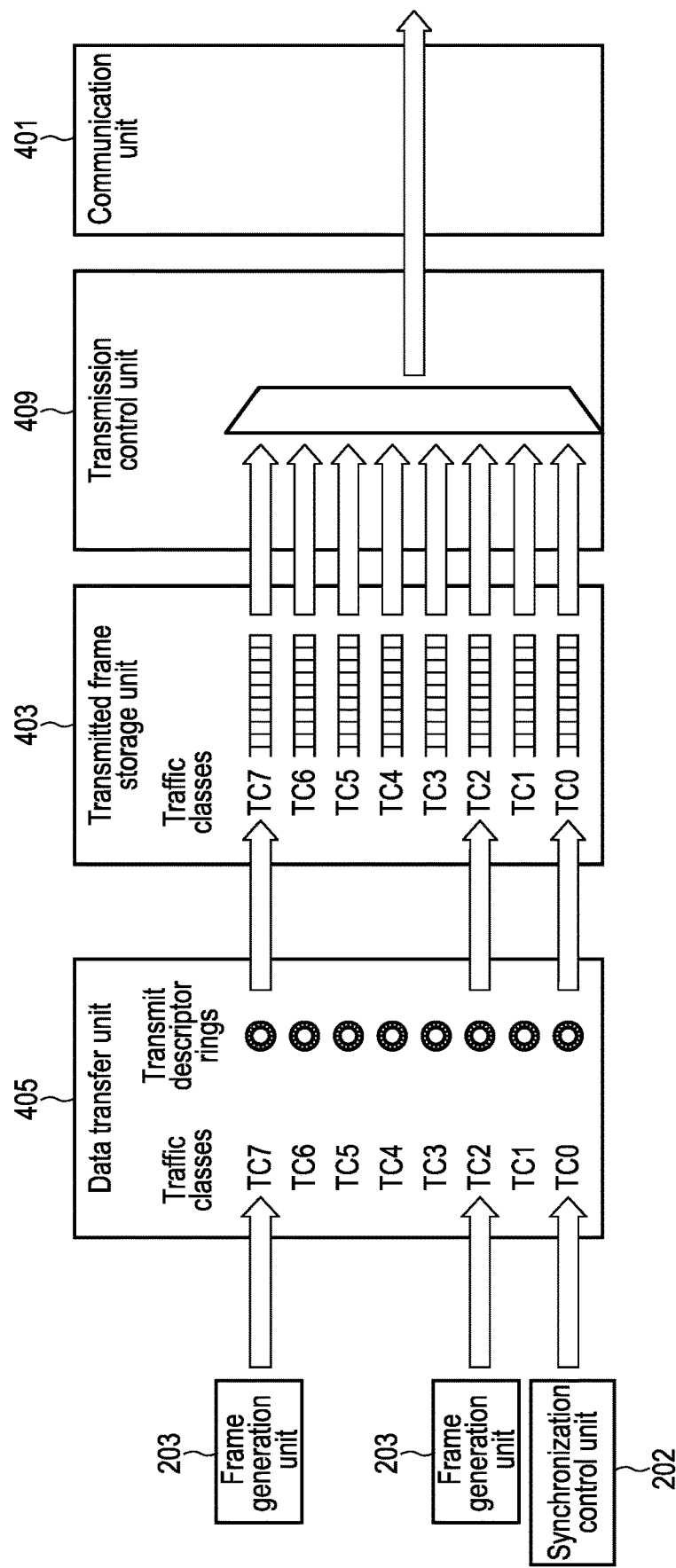
F I G. 7

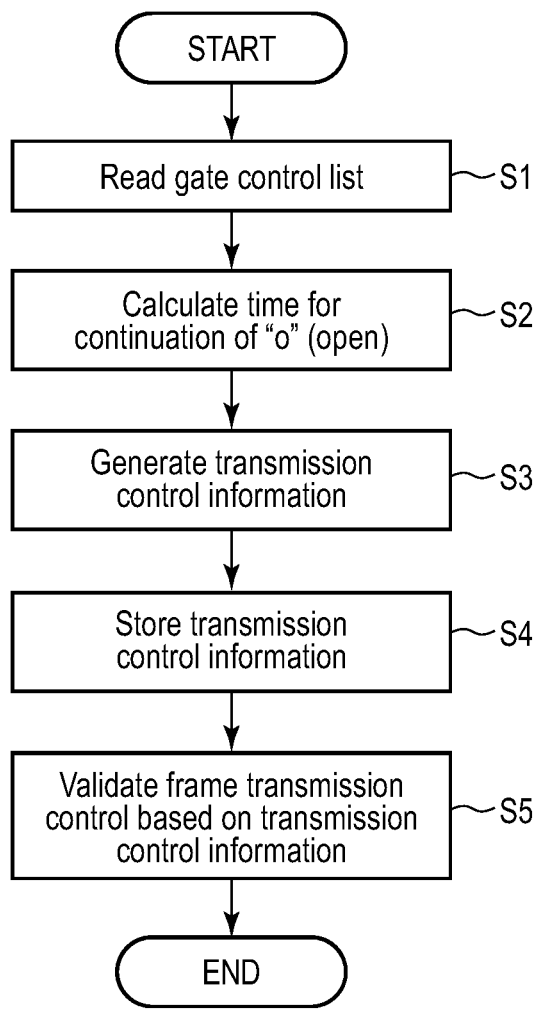
F I G. 8

| | Gate statuses | | | | | | | | Time intervals |
|---|---|---|---|---|---|---|---|---|---|
| | TC0 | TC1 | TC2 | TC3 | TC4 | TC5 | TC6 | TC7 | |
| T00 | o (∞) | o (256μs) | C | o (256μs) | C | o (256μs) | C | o (128μs) | 128μs |
| T01 | o (∞) | o (128μs) | o (768μs) | o (128μs) | o (768μs) | o (128μs) | o (768μs) | C | 128μs |
| T02 | o (∞) | C | o (640μs) | C | o (640μs) | C | o (640μs) | o (640μs) | 512μs |
| T03 | o (∞) | C | o (128μs) | C | o (128μs) | C | o (128μs) | o (128μs) | 128μs |
| T04 | o (∞) | o (896μs) | C | o (896μs) | C | o (896μs) | C | C | 128μs |
| T05 | o (∞) | o (768μs) | C | o (768μs) | C | o (768μs) | C | o (640μs) | 512μs |

F I G. 9

| Period information | Transmittable information (Frame transmittable time) | | | | | | | |
|---|---|---|---|---|---|---|---|---|
| Time | TC7 | TC6 | TC5 | TC4 | TC3 | TC2 | TC1 | TC0 |
| <128 μs | 128 μs | 0 μs | 256 μs | 0 μs | 256 μs | 0 μs | 256 μs | ∞ |
| <256 μs | 0 μs | 768 μs | 128 μs | 768 μs | 128 μs | 768 μs | 128 μs | ∞ |
| <768 μs | 640 μs | 640 μs | 0 μs | 640 μs | 0 μs | 640 μs | 0 μs | ∞ |
| <896 μs | 128 μs | 128 μs | 0 μs | 128 μs | 0 μs | 128 μs | 0 μs | ∞ |
| <1024 μs | 0 μs | 0 μs | 896 μs | 0 μs | 896 μs | 0 μs | 896 μs | ∞ |
| <1536 μs | 640 μs | 0 μs | 768 μs | 0 μs | 768 μs | 0 μs | 768 μs | ∞ |

F I G. 10

| Period information | Transmittable information (Frame transmittable time) | | | | | | | |
| --- | --- | --- | --- | --- | --- | --- | --- | --- |
| Time | TC7 | TC6 | TC5 | TC4 | TC3 | TC2 | TC1 | TC0 |
| <128 μs | 128 μs | | 256 μs | | 256 μs | | 256 μs | ∞ |
| <256 μs | | 768 μs | | 768 μs | | 768 μs | | |
| <768 μs | 640 μs | | | | | | | |
| <896 μs | | | | | | | | |
| <1024 μs | | | 896 μs | | 896 μs | | 896 μs | |
| <1536 μs | 640 μs | | | | | | | |

F I G. 11

| Period information | Transmittable information (Number of frame transmittable bits) | | | | | | | | |
|---|---|---|---|---|---|---|---|---|---|
| Time | TC7 | TC6 | TC5 | TC4 | TC3 | TC2 | TC1 | TC0 |
| <128 μs | 128000 | 0 | 256000 | 0 | 256000 | 0 | 256000 | ∞ |
| <256 μs | 0 | 768000 | 128000 | 768000 | 128000 | 768000 | 128000 | ∞ |
| <768 μs | 640000 | 640000 | 0 | 640000 | 0 | 640000 | 0 | ∞ |
| <896 μs | 128000 | 128000 | 0 | 128000 | 0 | 128000 | 0 | ∞ |
| <1024 μs | 0 | 0 | 896000 | 0 | 896000 | 0 | 896000 | ∞ |
| <1536 μs | 640000 | 0 | 768000 | 0 | 768000 | 0 | 768000 | ∞ |

F I G. 12

| Period information | Transmittable information (Number of frame transmittable bits) | | | | | | | |
|---|---|---|---|---|---|---|---|---|
| Time | TC7 | TC6 | TC5 | TC4 | TC3 | TC2 | TC1 | TC0 |
| <128 μs | 128000 |  | 256000 |  | 256000 |  | 256000 | ∞ |
| <256 μs |  | 768000 |  | 768000 |  | 768000 |  |  |
| <768 μs | 640000 |  |  |  |  |  |  |  |
| <896 μs |  |  |  |  |  |  |  |  |
| <1024 μs |  |  | 896000 |  | 896000 |  | 896000 |  |
| <1536 μs | 640000 |  |  |  |  |  |  |  |

F I G. 13

| Period information | Transmittable information (Number of frame transmittable bits) | | | | | | | |
|---|---|---|---|---|---|---|---|---|
| Number of bits | TC7 | TC6 | TC5 | TC4 | TC3 | TC2 | TC1 | TC0 |
| <128000 | 128000 | 0 | 256000 | 0 | 256000 | 0 | 256000 | ∞ |
| <256000 | 0 | 768000 | 128000 | 768000 | 128000 | 768000 | 128000 | ∞ |
| <768000 | 640000 | 640000 | 0 | 640000 | 0 | 640000 | 0 | ∞ |
| <896000 | 128000 | 128000 | 0 | 128000 | 0 | 128000 | 0 | ∞ |
| <1024000 | 0 | 0 | 896000 | 0 | 896000 | 0 | 896000 | ∞ |
| <1536000 | 640000 | 0 | 768000 | 0 | 768000 | 0 | 768000 | ∞ |

F I G. 14

| Period information | Transmittable information (Number of frame transmittable bits) | | | | | | | |
|---|---|---|---|---|---|---|---|---|
| Number of bits | TC7 | TC6 | TC5 | TC4 | TC3 | TC2 | TC1 | TC0 |
| <128000 | 128000 | | 256000 | | 256000 | | 256000 | ∞ |
| <256000 | | 768000 | | 768000 | | 768000 | | |
| <768000 | 640000 | | | | | | | |
| <896000 | | | | | | | | |
| <1024000 | | | 896000 | | 896000 | | 896000 | |
| <1536000 | 640000 | | | | | | | |

F I G. 15

| Period information | Transmittable information (Number of frame transmittable bits) | | | | | | | |
|---|---|---|---|---|---|---|---|---|
| Time intervals (Number of clock cycles) | TC7 | TC6 | TC5 | TC4 | TC3 | TC2 | TC1 | TC0 |
| 20000 | 128000 | 0 | 256000 | 0 | 256000 | 0 | 256000 | ∞ |
| 20000 | 0 | 768000 | 128000 | 768000 | 128000 | 768000 | 128000 | ∞ |
| 80000 | 640000 | 640000 | 0 | 640000 | 0 | 640000 | 0 | ∞ |
| 20000 | 128000 | 128000 | 0 | 128000 | 0 | 128000 | 0 | ∞ |
| 20000 | 0 | 0 | 896000 | 0 | 896000 | 0 | 896000 | ∞ |
| 80000 | 640000 | 0 | 768000 | 0 | 768000 | 0 | 768000 | ∞ |

F I G. 16

| Period information | Transmittable information (Number of frame transmittable bits) | | | | | | | | |
|---|---|---|---|---|---|---|---|---|---|
| Time intervals (Number of clock cycles) | TC7 | TC6 | TC5 | TC4 | TC3 | TC2 | TC1 | TC0 |
| 20000 | 128000 | | 256000 | | 256000 | | 256000 | ∞ |
| 20000 | | 768000 | | 768000 | | 768000 | | |
| 80000 | 640000 | | | | | | | |
| 20000 | | | | | 896000 | | 896000 | |
| 20000 | | | 896000 | | | | | |
| 80000 | 640000 | | | | | | | |

F I G. 17

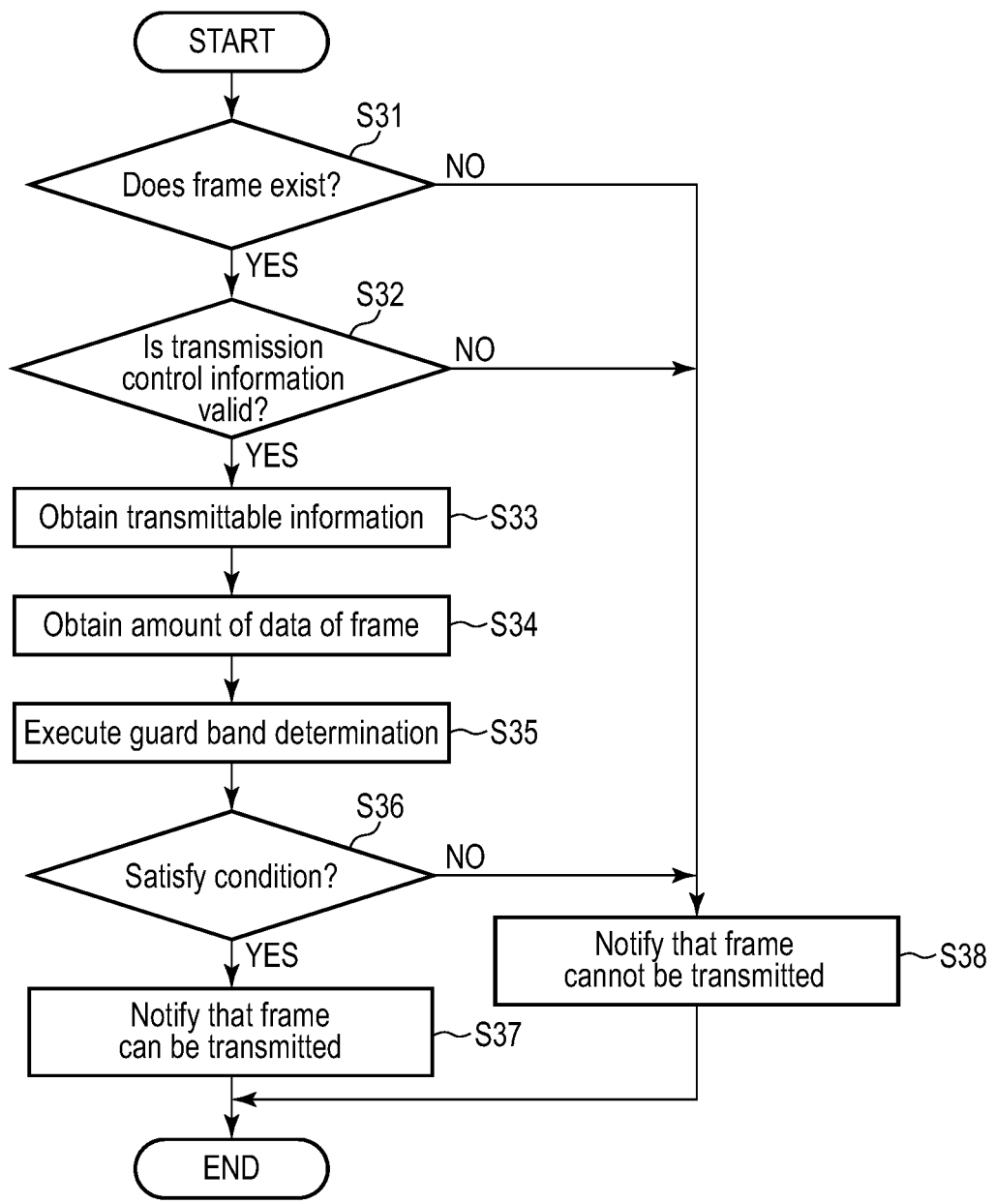
F I G. 21

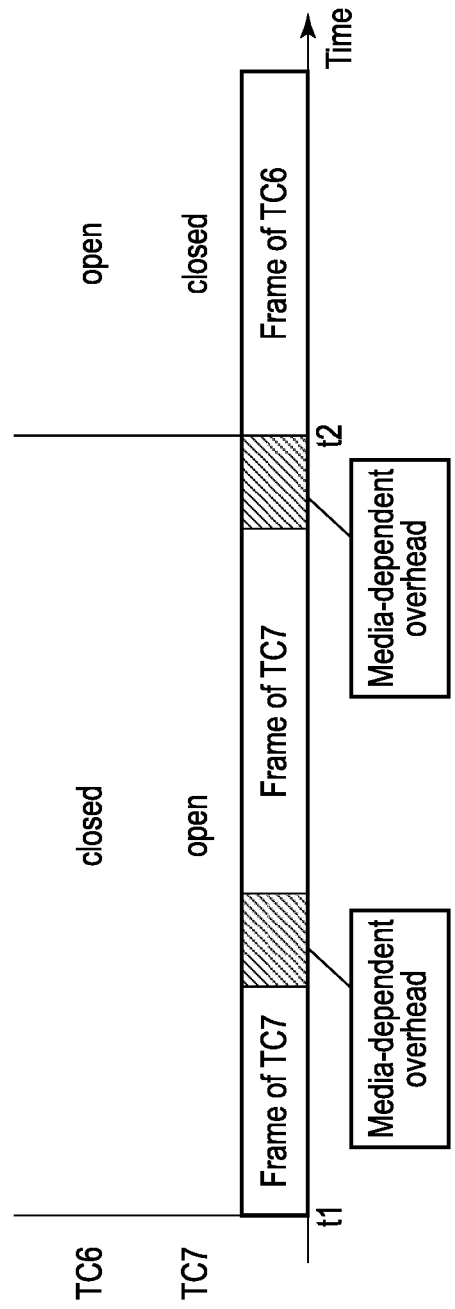
F I G. 22

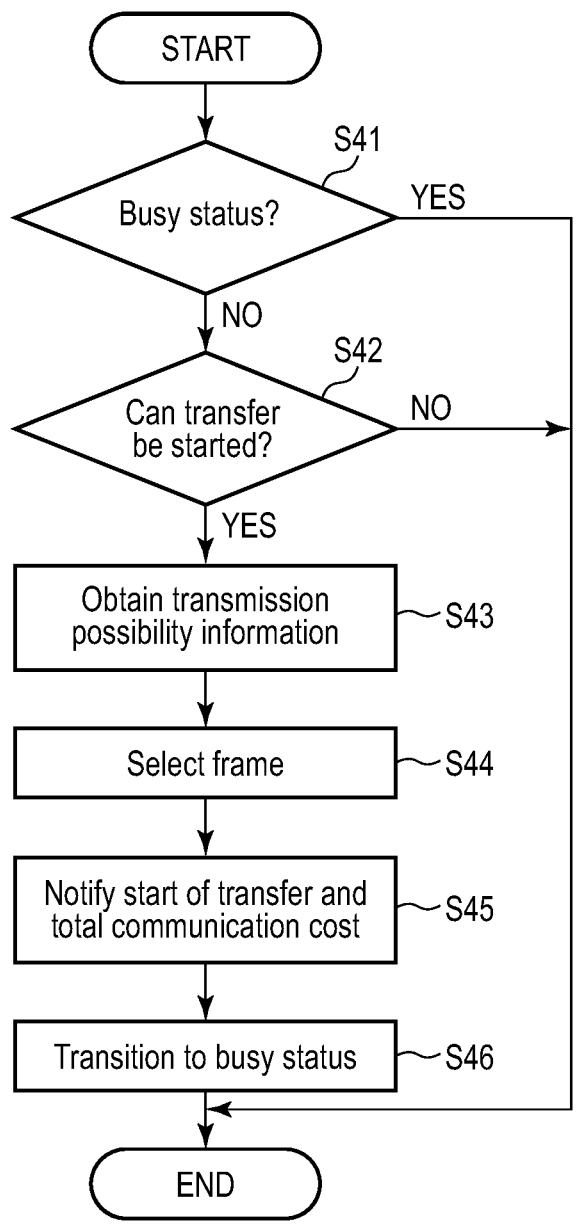
F I G. 23

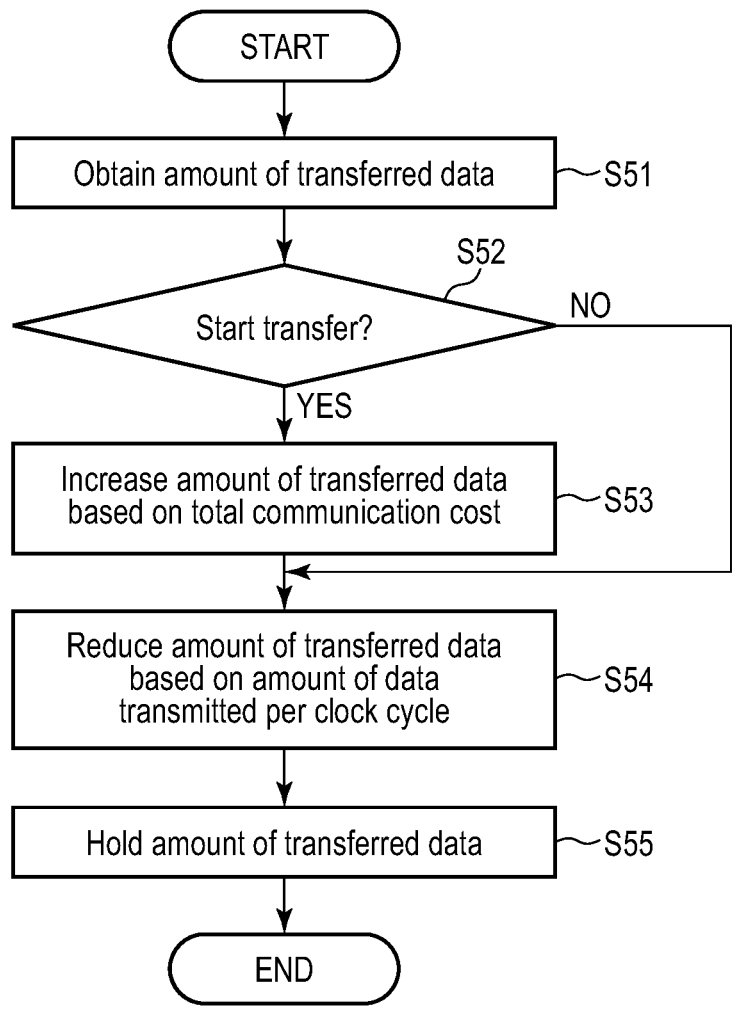
F I G. 24

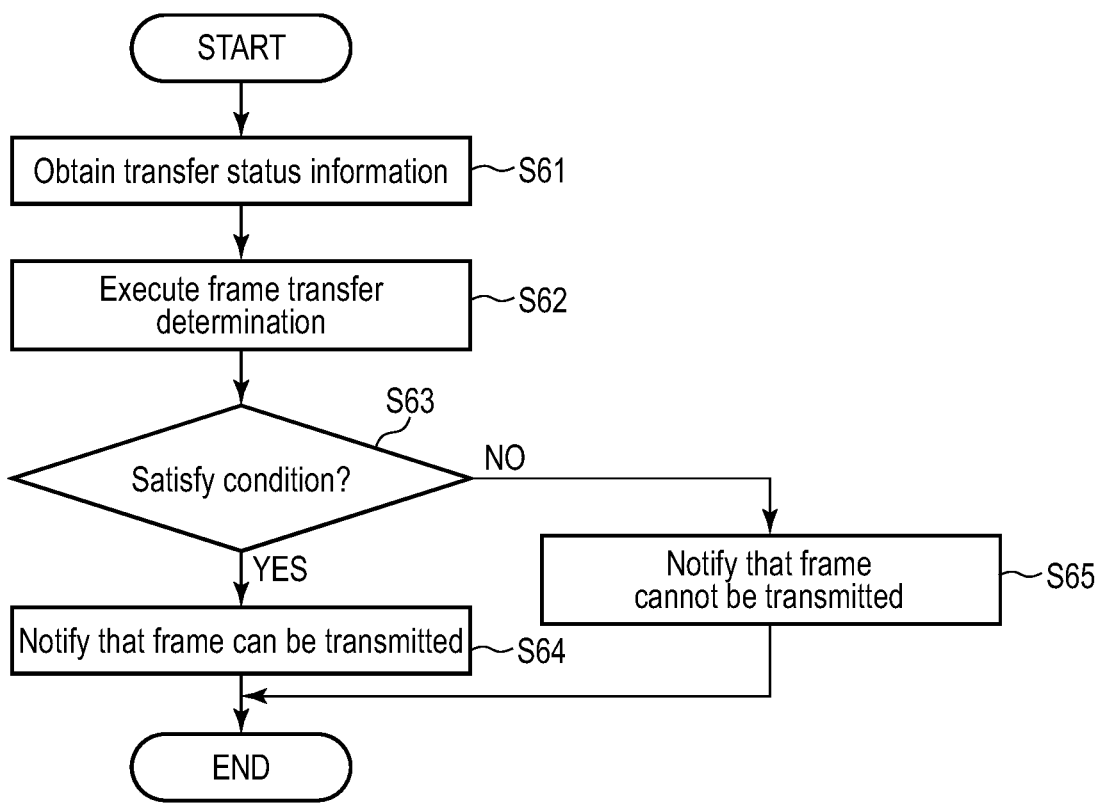
F I G. 25

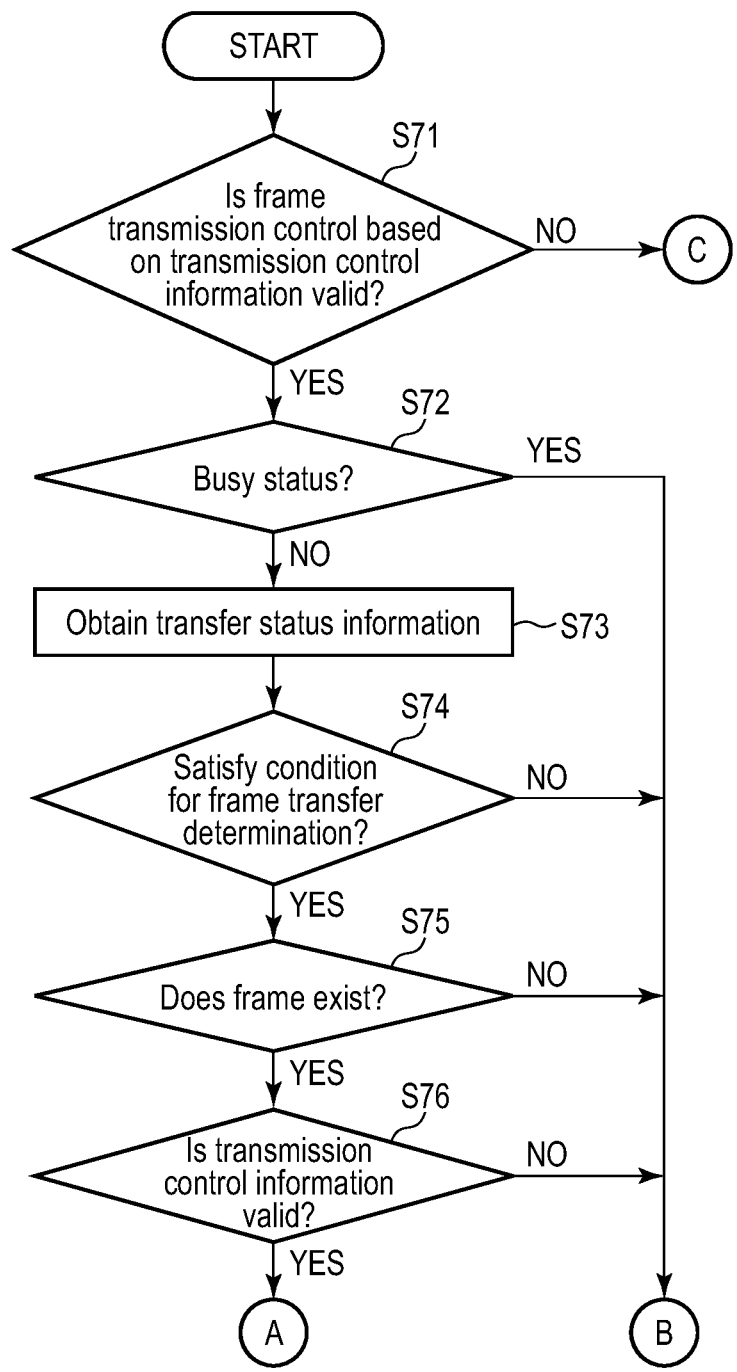
F I G. 26A

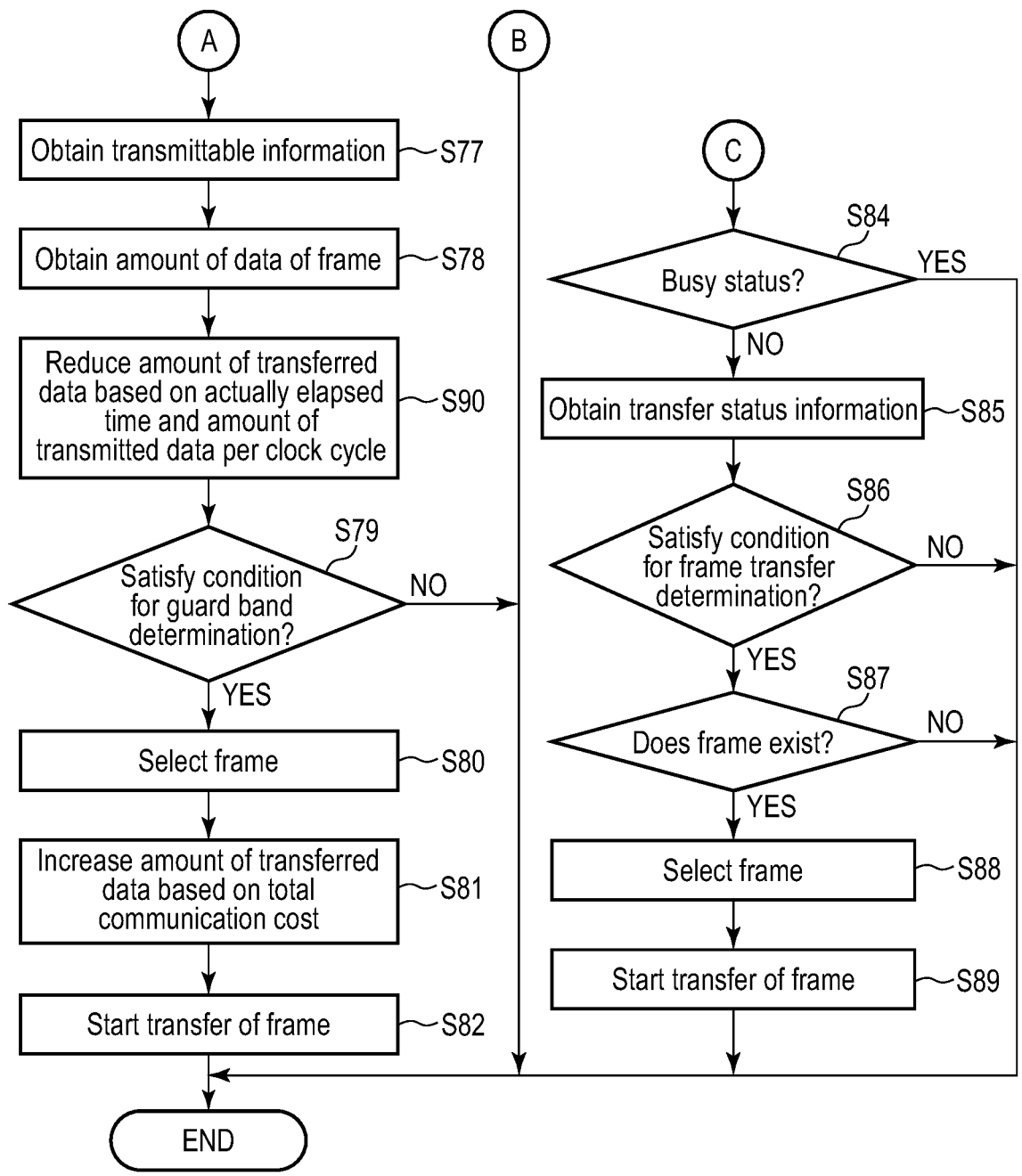
F I G. 27B

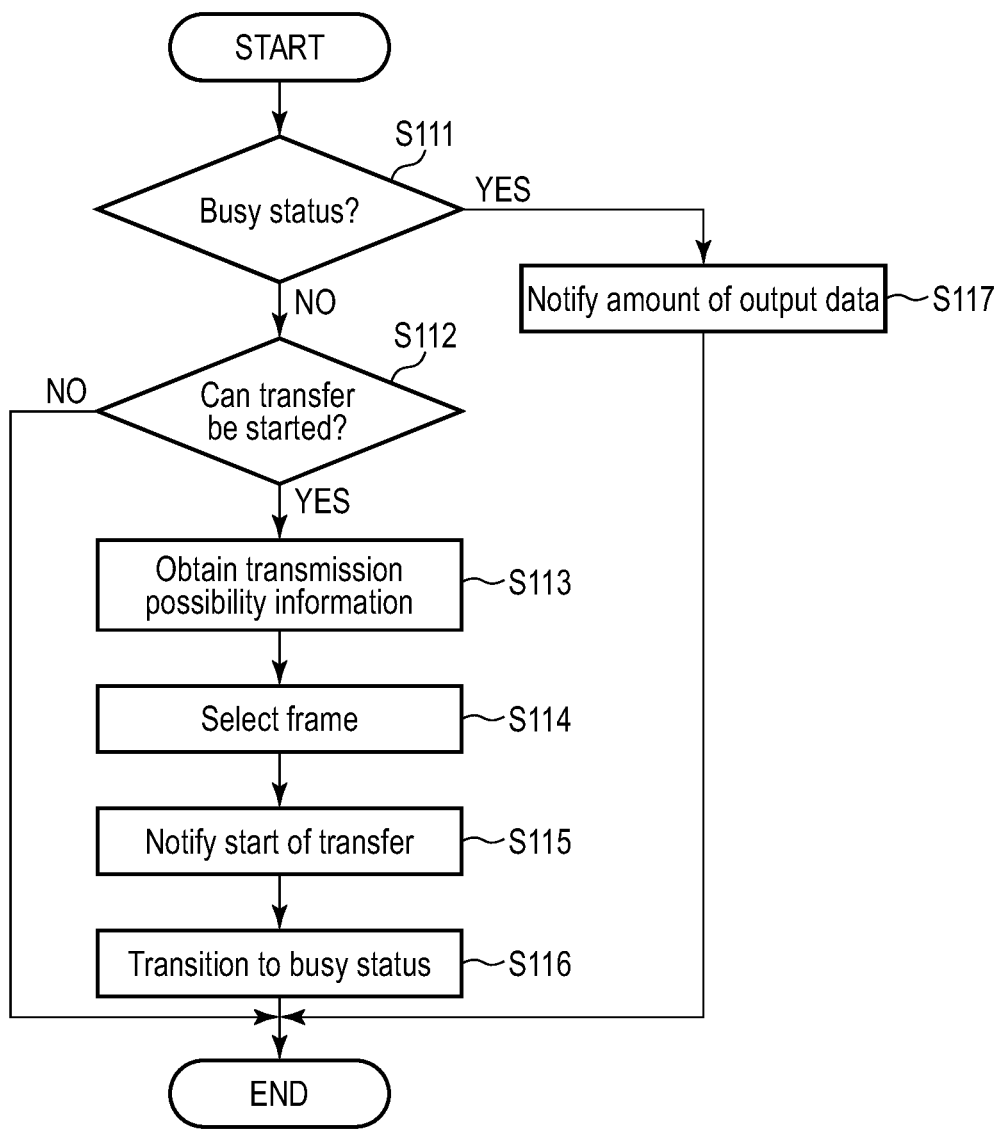
F I G. 29

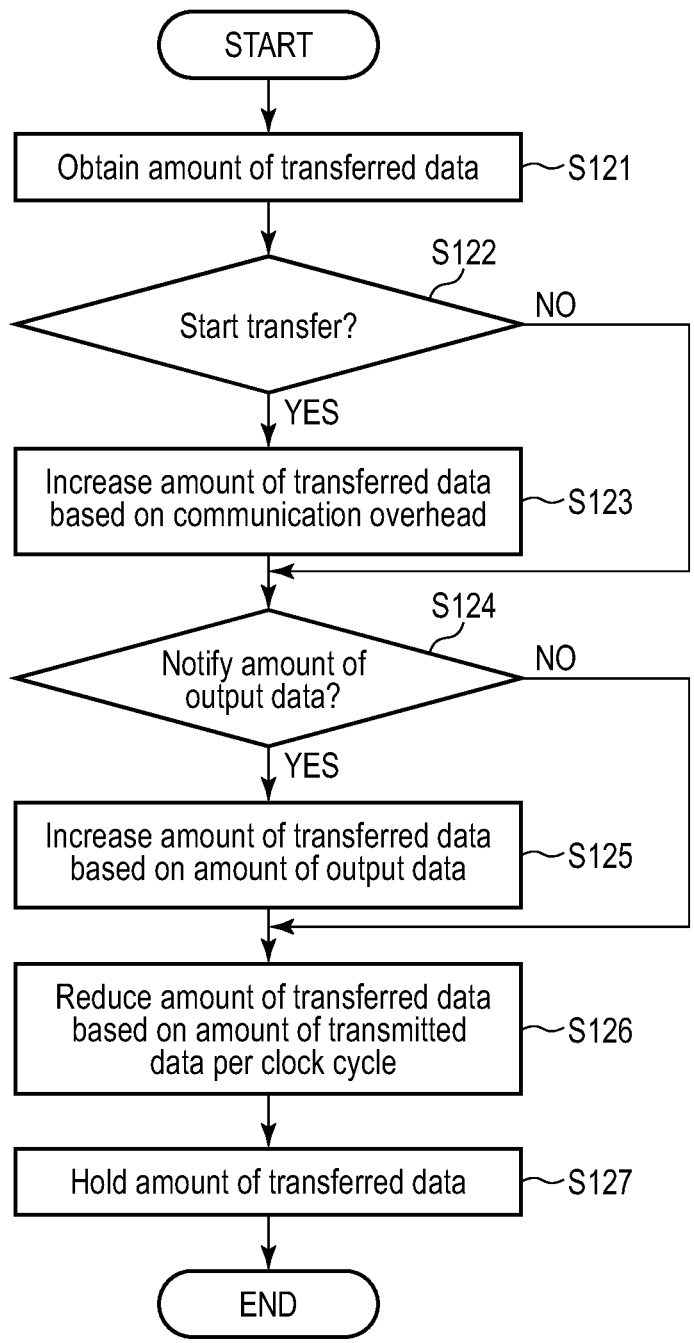
F I G. 30

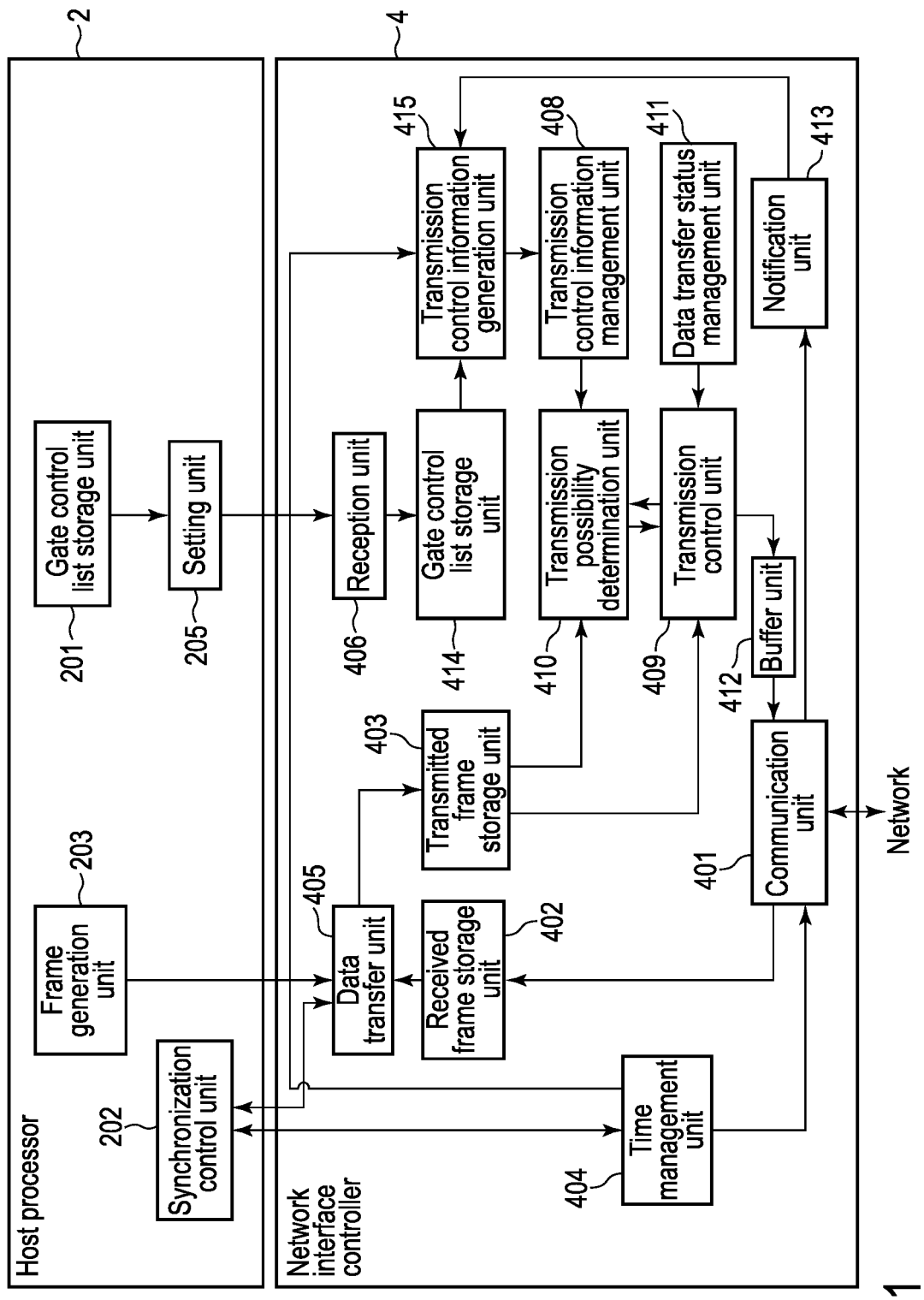
F I G. 31

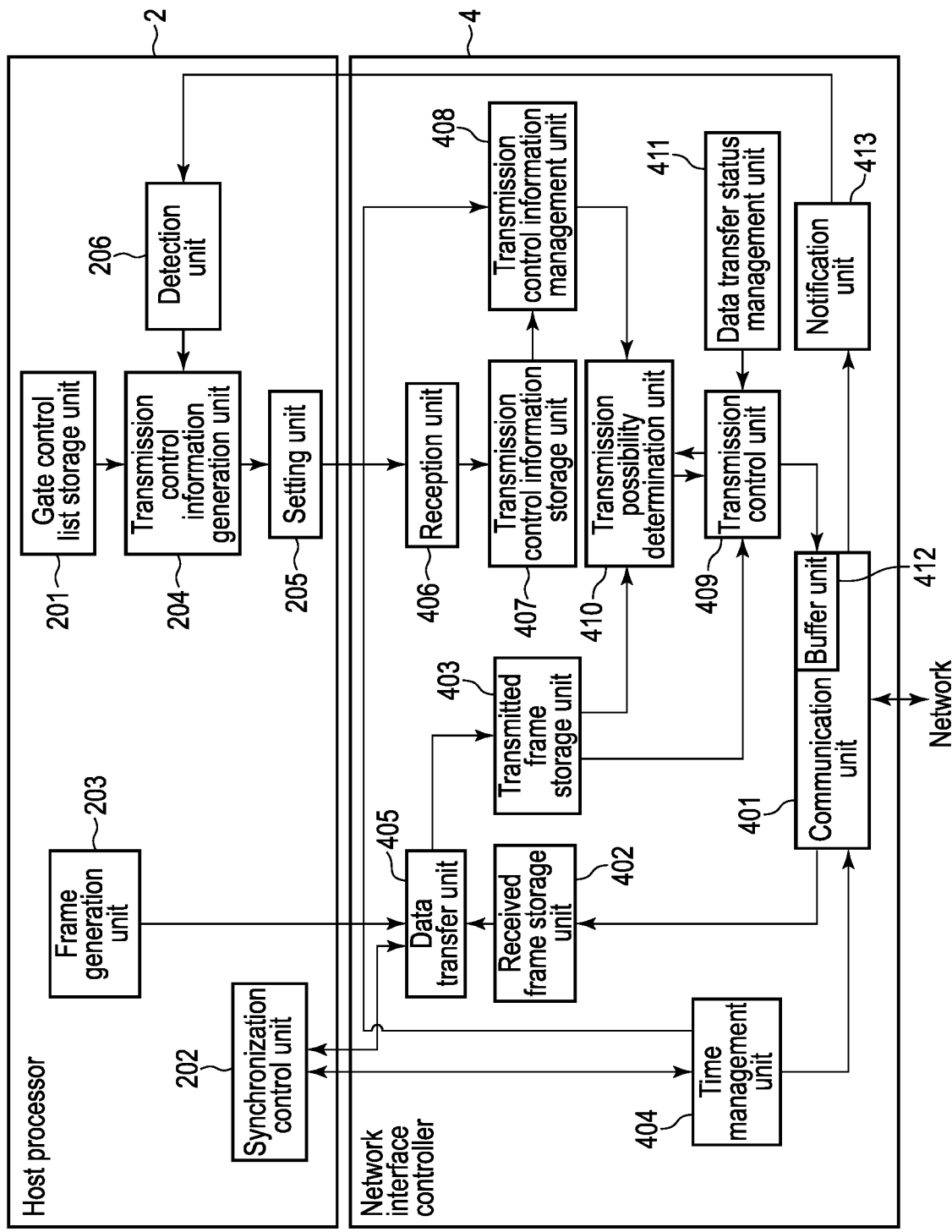
F I G. 32

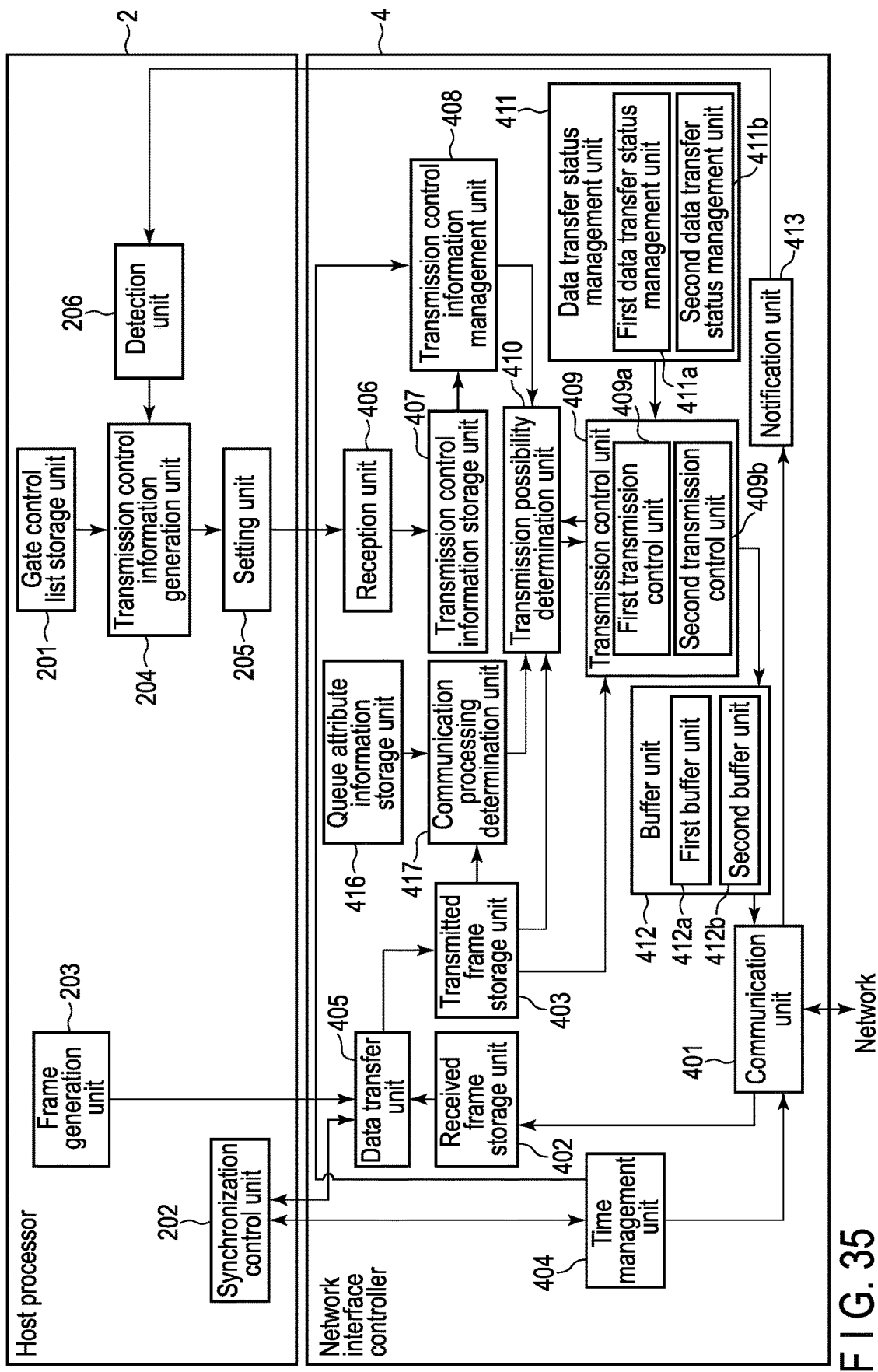
F I G. 35

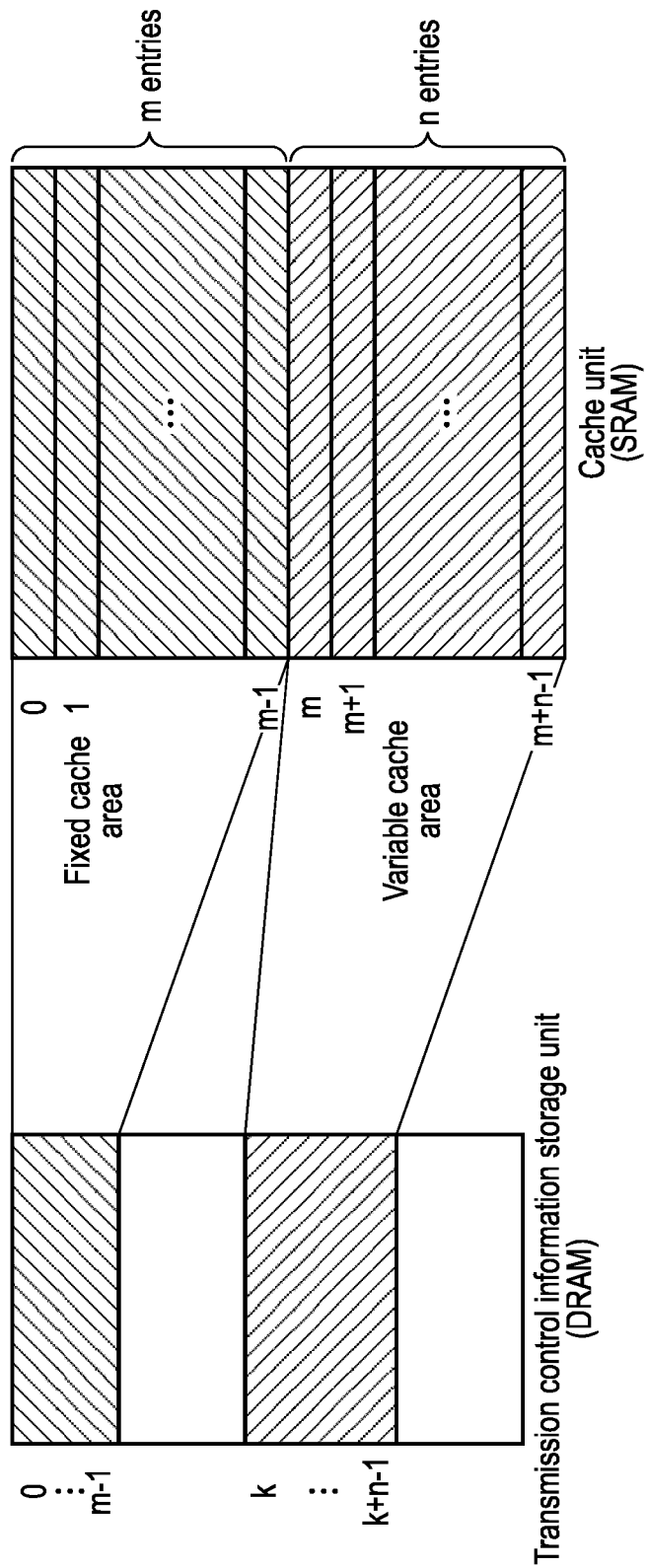
F I G. 37

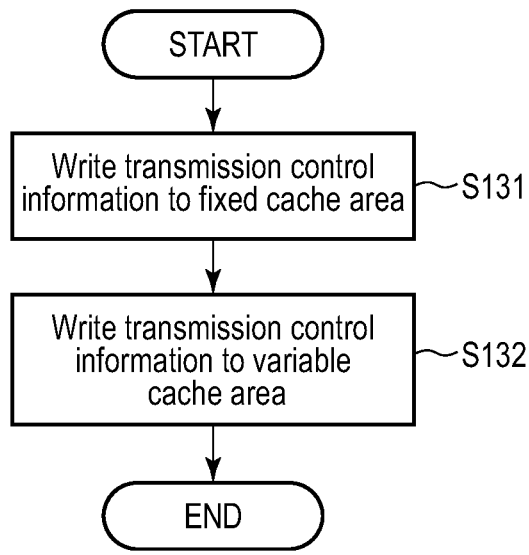
F I G. 38
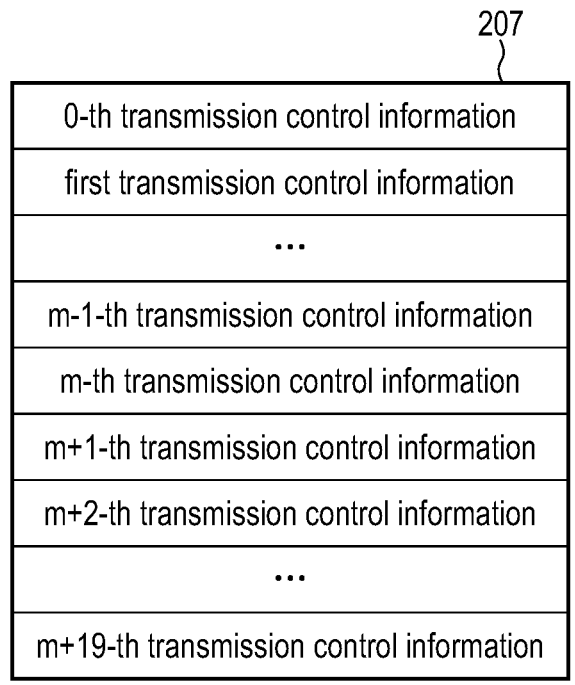
F I G. 39

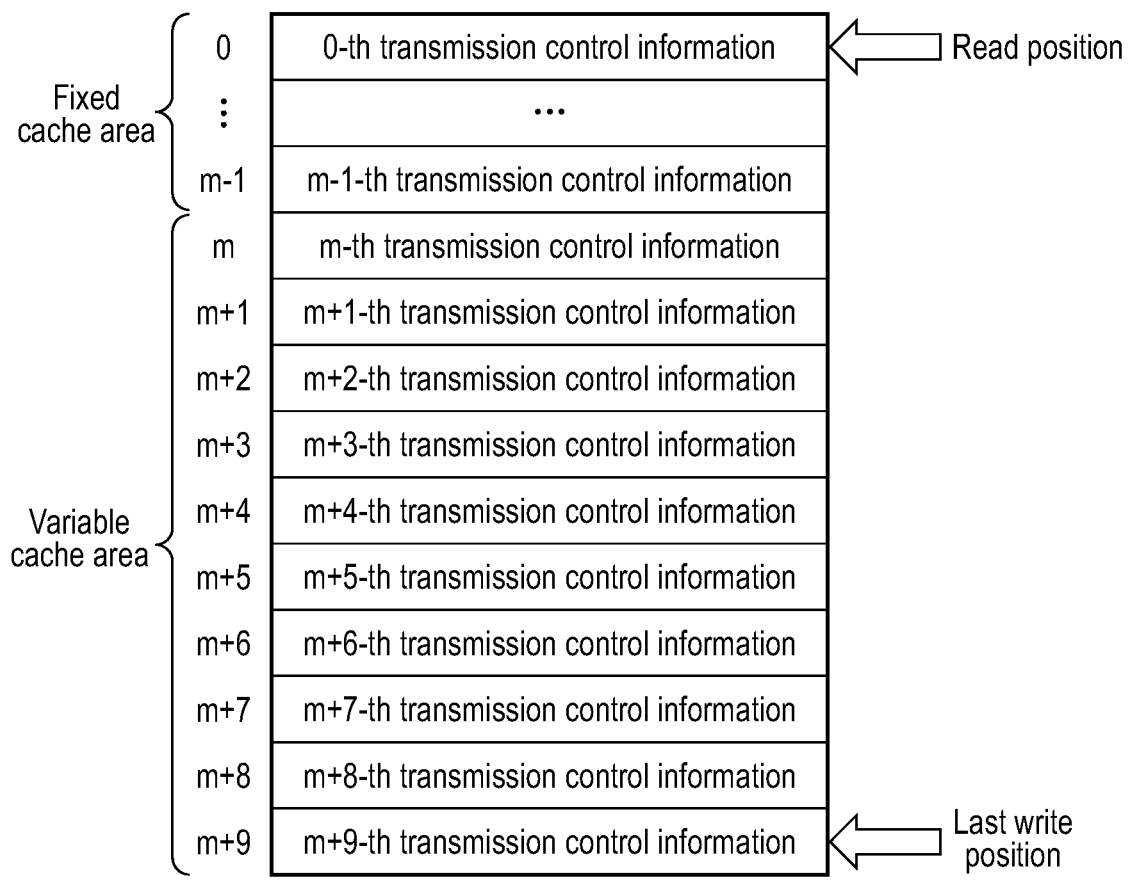
F I G. 40

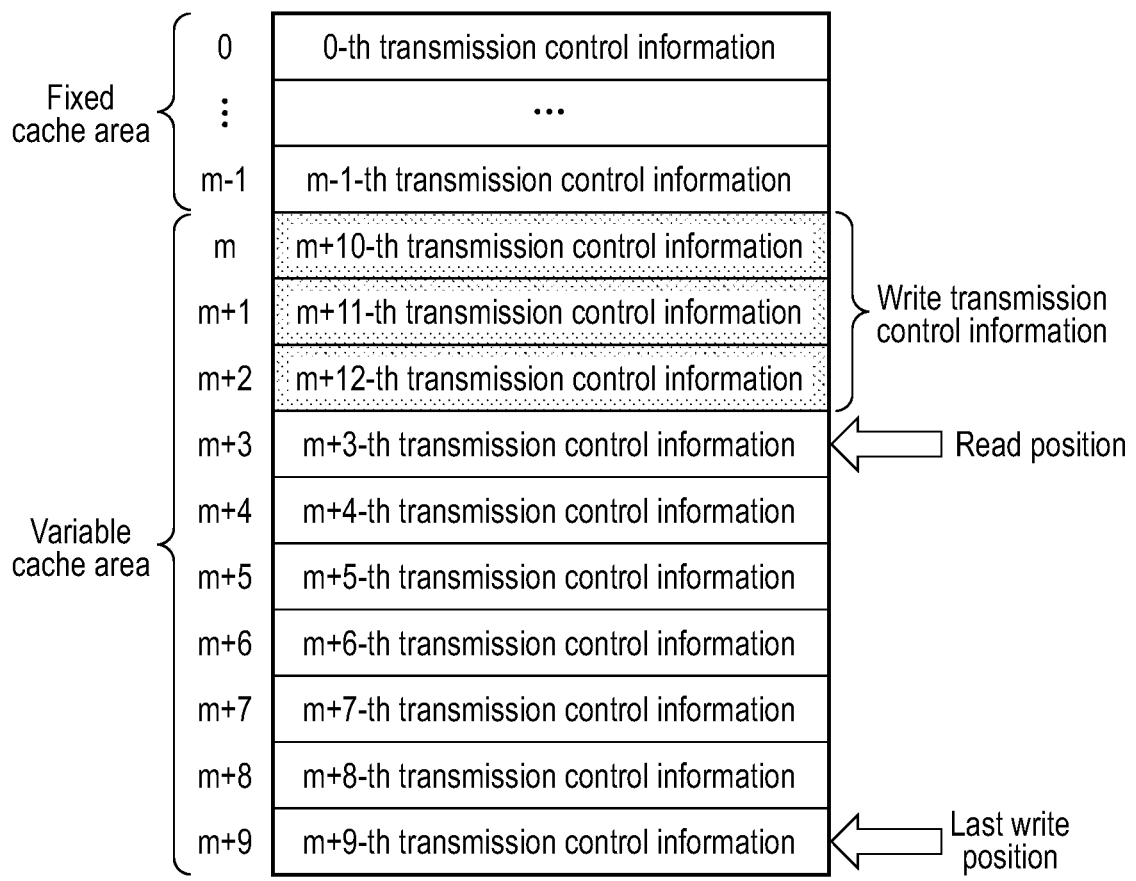
F I G. 42

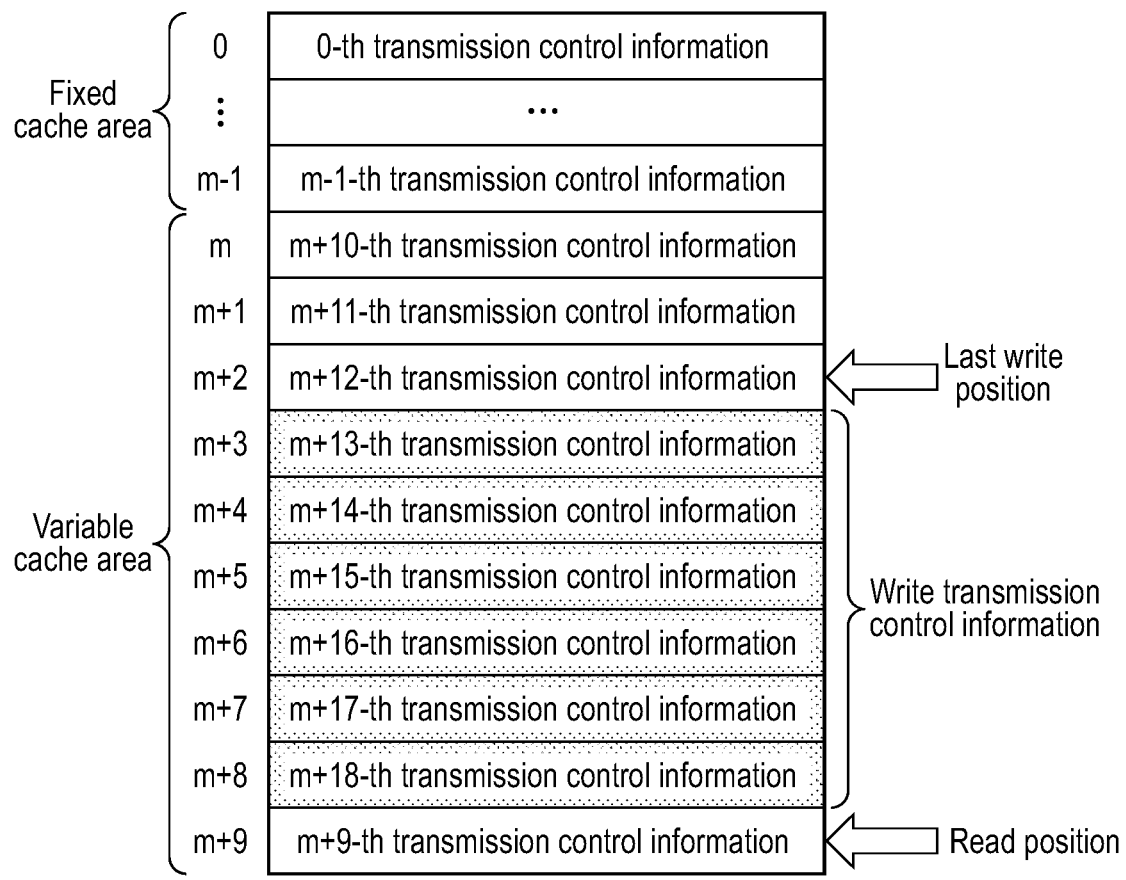
F I G. 43

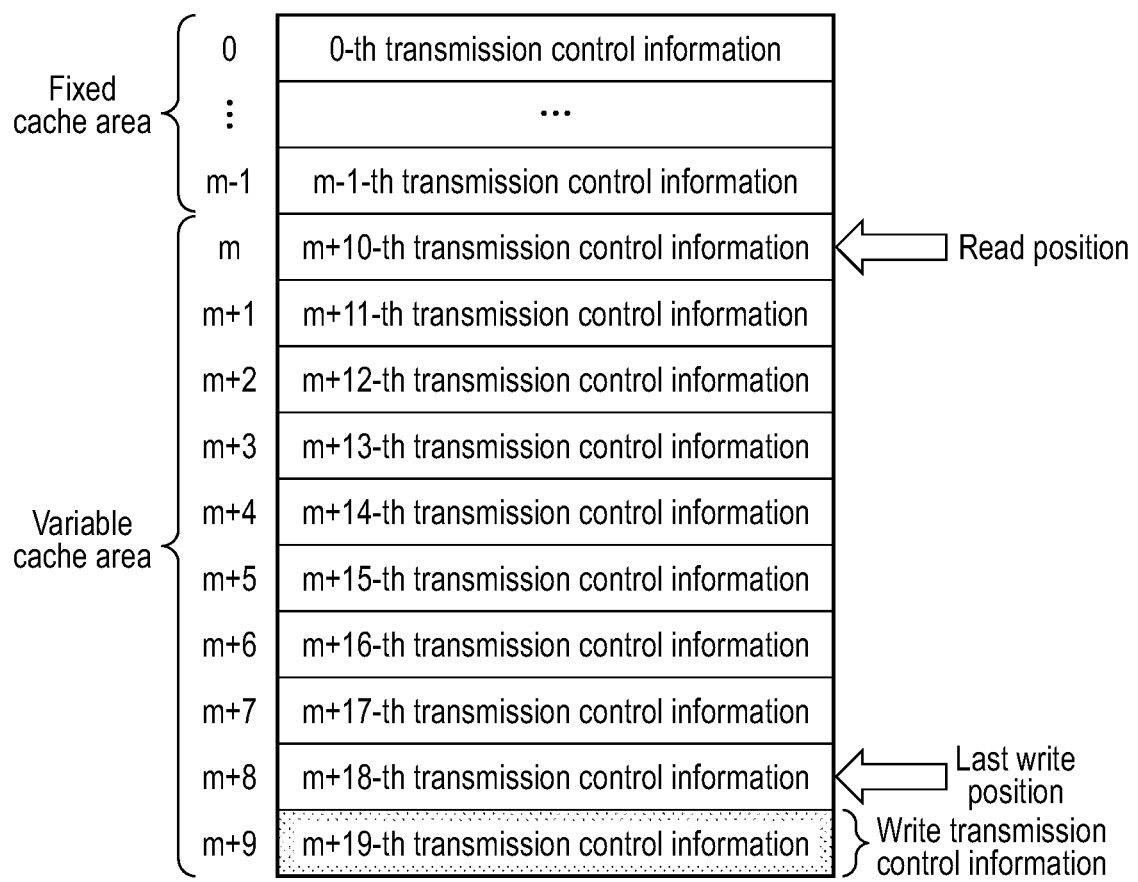
F I G. 44

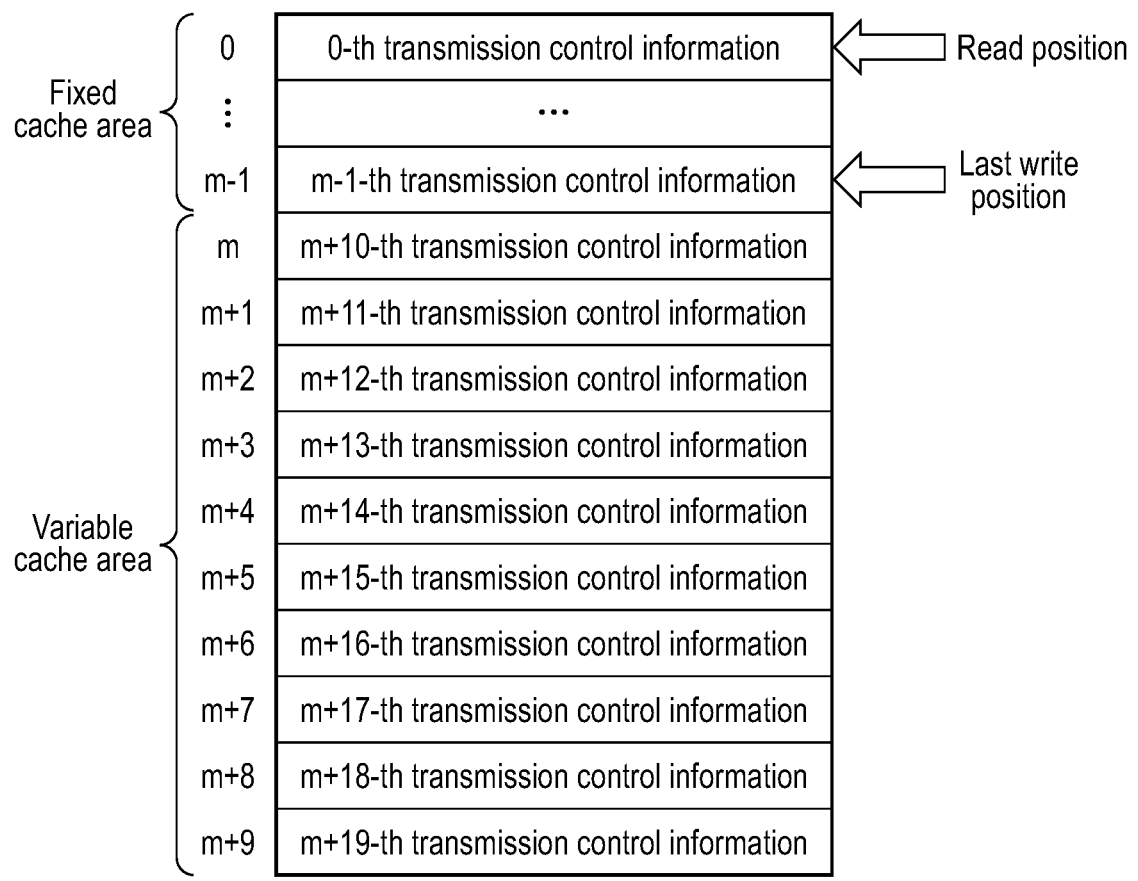
F I G. 45

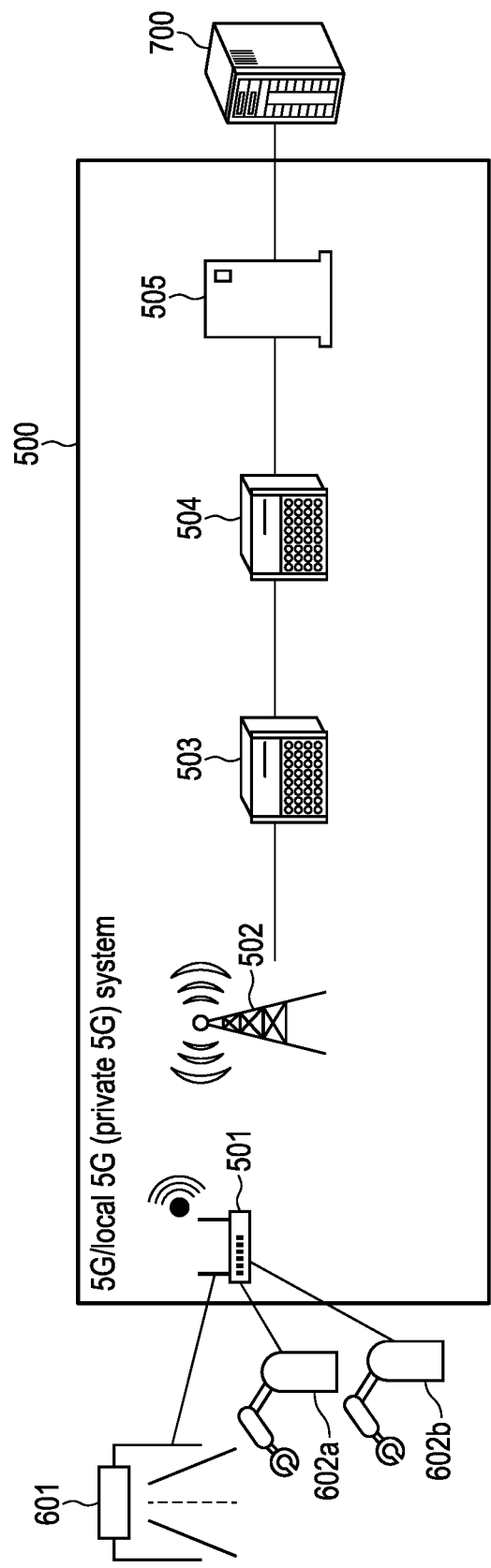
F I G. 49

COMMUNICATION CONTROL DEVICE, INFORMATION PROCESSING DEVICE, COMMUNICATION CONTROL METHOD, AND INFORMATION PROCESSING METHOD

CROSS-REFERENCE TO RELATED APPLICATIONS

This application is based upon and claims the benefit of priority from Japanese Patent Application No. 2021-195486, filed Dec. 1, 2021, the entire contents of which are incorporated herein by reference.

FIELD

Embodiments described herein relate generally to a communication control device, an information processing device, a communication control method, and an information processing method.

BACKGROUND

A communication control device executing real-time communication via a network conforming to Time-Sensitive Networking (TSN) standard or the like is known. In TSN, based on a gate control list in which open or close status of a gate corresponding to each of a plurality of queues (i.e., whether or not to transmit messages stored in the queues) is specified in units of time, the transmission timing and the amount of transmission of messages from the queues are controlled.

In the above-described TSN standards or the like, however, the transmission timing and the amount of transmission of messages from the queues often cannot be controlled.

BRIEF DESCRIPTION OF THE DRAWINGS

FIG. 1 is a diagram showing an example of a hardware configuration of a communication device according to a first embodiment.

FIG. 2 is a block diagram showing an example of a functional configuration of the communication device.

FIG. 3 is a table showing an example of a gate control list.

FIG. 7 is a diagram illustrating an outline of operation of a frame transmission process.

FIG. 8 is a flowchart showing an example of a transmission control information generation process.

FIG. 9 is a table showing an example of a continuous open time.

FIG. 10 is a table specifically illustrating transmission control information.

FIG. 11 is a table specifically illustrating transmission control information.

FIG. 12 is a table specifically illustrating the transmission control information.

FIG. 13 is a table specifically explaining the transmission control information.

FIG. 14 is a table specifically illustrating the transmission control information.

FIG. 15 is a table specifically illustrating the transmission control information.

FIG. 16 is a table specifically illustrating the transmission control information.

FIG. 17 is a table specifically illustrating the transmission control information.

FIG. 21 is a flowchart showing an example of a procedure of a guard band determination process.

FIG. 22 is a chart showing an example of media-dependent overhead.

FIG. 23 is a flowchart showing an example of a procedure of a frame selection process.

FIG. 24 is a flowchart showing an example of a procedure of a transmission cost information calculation process.

FIG. 25 is a flowchart showing an example of a procedure of a back pressure process.

FIG. 26A is a flowchart showing an example of a process flow of the overall frame transmission control.

FIG. 27B is a flowchart showing an example of a process flow of the overall frame transmission control.

FIG. 29 is a flowchart showing the other example of the procedure of the frame selection process.

FIG. 30 is a flowchart showing another example of the procedure of the transmission cost information calculation process.

FIG. 31 is a block diagram showing an example of a functional configuration of the communication device according to a first modified example of the embodiment.

FIG. 32 is a block diagram showing an example of a functional configuration of the communication device according to a second modified example of the embodiment.

FIG. 35 is a block diagram showing an example of a functional configuration of the communication device according to a fourth modified example of the embodiment.

FIG. 37 is a diagram showing a configuration example of a cache area inside a cache unit.

FIG. 38 is a flowchart showing an example of a procedure of an initialization process in the cache unit.

FIG. 39 is a diagram specifically illustrating an updating process of the transmission control information.

FIG. 40 is a diagram specifically illustrating an updating process of the transmission control information.

FIG. 42 is a diagram specifically illustrating an updating process of the transmission control information.

FIG. 43 is a diagram specifically illustrating an updating process of the transmission control information.

FIG. 44 is a diagram specifically illustrating an updating process of the transmission control information.

FIG. 45 is a diagram specifically illustrating an updating process of the transmission control information.

FIG. 49 is a diagram showing a configuration example of a system using the communication device according to each of the embodiments.

DETAILED DESCRIPTION

Figure 4:
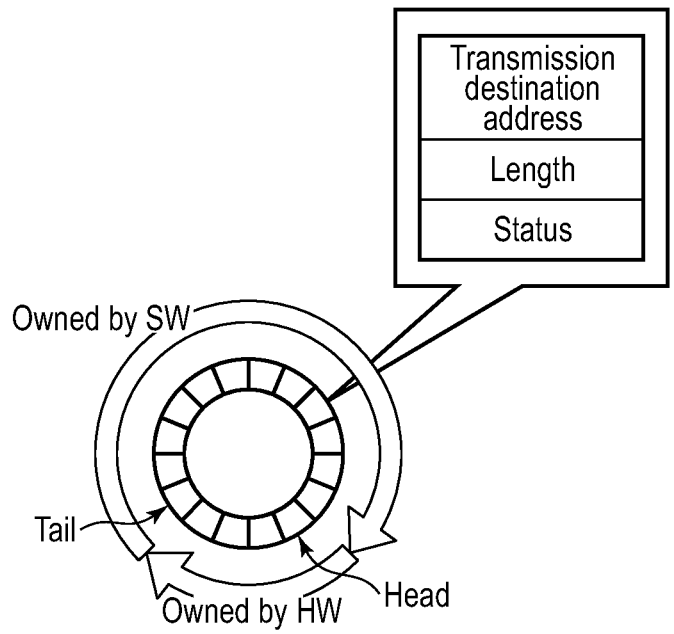
FIG. 4 is a diagram showing a configuration example of a receive descriptor.

In general, according to one embodiment, a communication control device includes a transmission control unit and a communication unit. The transmission control unit is configured to control transfer start timing of a first message stored in a queue, based on gate control information in which open or close status of a gate corresponding to each of a plurality of queues is specified. The communication unit is configured to transmit the first message transferred from the transmission control unit in accordance with the transfer start timing. The transfer start timing of the first message is determined based on a transmission cost at a time when a second message, which has been already determined to pass through the gate, is transmitted by the communication unit, and a transfer status of the second message between the transmission control unit and the communication unit.

Various embodiments will be described with reference to the accompanying drawings.

First Embodiment

First, a first embodiment will be described. A communication device according to the embodiment is a device configured to execute real-time communication of messages via a network. An example of employing Time-Sensitive Networking (TSN) as a standard for real-time communication will be described below, but the standards applicable to the embodiment are not limited to the TSN.

By the way, in the TSN, transmission timing of a frame (an example of a message) is determined using a gate control list (gate control information) in which the open or close status of a gate corresponding to each of a plurality of queues is specified in time units. This gate control list includes an entry for each time unit and, in each of the plurality of queues, when an open status of the gate corresponding to the queue is continuous (successive) over a plurality of entries (time units), the frame stored in the queue can be transmitted until the gate is finally closed. In the TSN standard, the transmission timing of the frame needs to be determined by determining the possibility of transmission of the frame stored in the queue in accordance with open or close status of the gate corresponding to each of the plurality of queues, and the possibility of the transmission of the frame is determined by considering the status (open or close) of the current gate, the status of the subsequent gate (the status of the gate at the time later than the current time), and the status of the frame to pass through the gate (the size of the frame, the upper lit of the size of the frame, overhead which occurs in the communication, and the like).

However, when the possibility of transmission of the frame is determined based on the gate control list defined in the TSN standard as described above, the status of the frame which has been already determined to pass through the gate is not considered, and it is therefore considered that the transmission timing of the frame cannot precisely be controlled. More specifically, the frame transmission timing determined as described above cannot be assured when the bus width upon passing through the gate (i.e., the amount of data calculated based on the number of bits and the operation frequency and transmitted at one operation) is different from the bus width when actually transmitted (output) on the network 200 and when the frame having passed through the gate is once stored in the buffer unit (i.e., buffering is executed).

Thus, in the communication device of the embodiment, not only the status of the frame (i.e., the frame to pass through the gate), but the status of the frame which has been already determined to pass through the gate are considered when determining the possibility of frame transmission (controlling the frame transmission). More specifically, in the embodiment, the amount of data of the frame which has been already determined to pass through the gate is continuously monitored, and a result of monitoring is added to conditions for determining the possibility of transmission of the frame subsequent in time. Furthermore, in the embodiment, the amount of data of the frame waiting for transmission after having passed through the gate is monitored, and back pressure to be described later is made to occur at appropriate timing. In the embodiment, exactly controlling the frame transmission timing is implemented by determining the possibility of transmission of subsequent frames (i.e., controlling the frame transmission) in a form of considering the status of the frame having passed the gate.

FIG. 1 shows an example of a hardware configuration of the communication device according to the embodiment. As shown in FIG. 1, a communication device 100 includes a memory 1, a host processor 2, a storage 3, a network interface controller 4, a storage controller 5, and the like.

The memory 1 is connected to the host processor 2 via a memory controller in the host processor 2. The memory 1 is implemented by, for example, a Dynamic Random Access Memory (DRAM) or the like.

The host processor 2 is connected to the storage controller 5 by using a bus of PCI Express (registered trademark) or the like. Similarly, the host processor 2 is connected to the network interface controller 4 by using a bus of PCI Express or the like.

The host processor 2 functions as an information processing device expanding images of an executable program stored in the storage 3 into the memory 1 and executing processing while reading commands and data on the memory 1. The processing executed by the host processor 2 is executed by one or more cores provided in the host processor 2. The memory 1 and the host processor 2 are shown separately in FIG. 1, but the host processor 2 may be constituted integrally with the memory 1.

The storage 3 is implemented by, for example, a hard disk drive (HDD), a solid state drive (SSD) or the like. The storage 3 is connected to the storage controller 5 under standards such as SATA, SAS, and U.2 (SFF-8639). In addition, the storage 3 and the storage controller 5 may be constituted integrally.

The network interface controller 4 functions as a communication control device that connects the host processor 2 to the network 200.

The network 200 is, for example, Ethernet (registered trademark). More specifically, the network 200 is a network conforming to standards defined under IEEE 802.1. The standards defined under IEEE 802.1 are, for example, the above-described TSN standard, Audio Video Bridging (AVB) standard, and the like. In addition, the type of the network 200 may be any type. More specifically, the network 200 is, for example, an office network, a network inside a data center, an in-vehicle network, a factory network, a network of mobile base stations, a network of core facilities, or the like.

The network interface controller 4 and the storage controller 5 are implemented by, for example, application specific integrated circuits (ASICs), field-programmable gate arrays (FPGAs), or processors such as central processing units (CPUs). In addition, the network interface controller 4 and the storage controller 5 may also be implemented by combining two or three of the ASICs, the FPGAs, and the processors. In addition, the network interface controller 4 and storage controller 5 may incorporate memories different from the above-described memory 1. The network interface controller 4 and storage controller 5 may be mounted as a separate chip from the host processor 2 or may be mounted on the same chip as the host processor 2 as System-on-a-Chip (SoC).

FIG. 2 is a block diagram showing an example of a functional configuration of the communication device 100 according to the embodiment. In FIG. 2, the functional configuration of the host processor 2 (information processing device) and the network interface controller 4 (communication control device) provided in the communication device 100 will be mainly described.

As shown in FIG. 2, the host processor 2 includes a gate control list storage unit 201, a synchronization control unit 202, a frame generation unit 203, a transmission control information generation unit 204, a setting unit 205, and a detection unit 206.

The gate control list storage unit 201 stores a gate control list used in the above-mentioned frame transmission control (transmission timing control). The gate control list is the information used to execute the control of Enhancements for scheduled traffic defined under IEEE 802.1Q.

The gate control list stored in the gate control list storage unit 201 may be stored in the storage 3 or the like in advance or, for example, received (obtained) via the network 200 by centralized network configuration (CNC) defined under IEEE 802.1Qcc.

FIG. 3 shows an example of the gate control list. The gate control list shown in FIG. 3 includes six entries of T00 to T05. Each of the entries includes a time interval and a gate status of a queue corresponding to each of the eight traffic classes. TC0 to TC7 refer to the traffic classes. For example, TC7 refers to traffic class No. 7.

The gate status of each traffic class is represented by "o" and "C". "o" indicates that the gate is open. "C" indicates that the gate is closed. The gate status indicates whether or not transmission in the queue of the traffic class (transmission of frames stored in the queue) is permitted.

The time interval indicates the time in which the entry lasts. For example, in the example in FIG. 3, 128 μs are set in the time interval of the entry T00. This indicates that the entry T00 continues for 128 μs. The set gate status is maintained for the time interval in the order from T00 and, as the time elapses in order of T01, T02, . . . the gate status of the gate of each traffic class is switched. When the last entry (T05 in the example in FIG. 3) is ended, gate control for one cycle is complete. For start timing of a next cycle, the processing may be repeated by returning to the first entry (T00 in the example in FIG. 3) immediately after the last entry has ended. Alternatively, the start timing of the next cycle may be determined based on the time information managed by a time management unit 404. The next cycle may be forced to start based on the time information before the gate control for one cycle is completely ended.

In addition, each entry further includes an operation. In the example shown in FIG. 3, SetGateStates is set in common for each entry, and SetGateStates indicates setting "o" or "C" as the gate status for a plurality of queues (queues for ports included by the network interface controller 4).

Although not shown in FIG. 3, the time (base time) at which gate control is started is also set (stored) in the gate control list. The base time is included in the transmission control information to be described below and is transmitted to the network interface controller 4. The base time is expressed in, for example, year, month, date, hour, minute, second, and the like, but may be expressed in any other format as long as it can specify the timing of starting the gate control. Furthermore, although not shown in FIG. 3, the time (cycle time) for one cycle of the gate control may be included in the gate control list. For example, the total value of the time intervals of all the entries (T00 to T05 in the example in FIG. 3) included in the gate control list may be set (stored) as the cycle time. The cycle time is expressed in, for example, μsec or the like in the same manner as the time interval, but may be expressed in the other format as long as it can specify the time for one cycle.

The synchronization control unit 202 executes time synchronization with other communication devices via the network 200. For example, the synchronization control unit 202 executes the time synchronization under the time synchronization protocol such as IEEE 1588 or IEEE 802.1AS via the network 200 and corrects the time information managed by the network interface controller 4 (time management unit 404 to be described later).

The frame generation unit 203 generates frames (transmitted frames) to be transmitted via the network interface controller 4. The frame refers to the smallest unit of data exchanged at the data link layer. For example, the frame generation unit 203 generates the data included in the transmitted frame, and a header and a footer of a protocol corresponding to the upper layer of Ethernet. For example, the frame generation unit 203 is implemented by a transmission application, a protocol stack, and a device driver operating on the host processor 2.

The frame generator 203 sets the traffic class to the transmitted frame in accordance with the characteristics of the information to be transmitted, and the like. When eight traffic classes are used, for example, values of TC0 to TC7 are used as the identification information of the traffic classes.

Only one frame generation unit 203 is shown in FIG. 2, but the host processor 2 may be configured to include a plurality of frame generation units 203.

The transmission control information generation unit 204 generates transmission control information from the gate control list stored in the gate control list storage unit 201. For example, at the initialization time and in a case where a change in link speed or operating speed information is detected by the detection unit 206 to be described below, the transmission control information generation unit 204 reads the gate control list from the gate control list storage unit 201 and generates transmission control information. Details of a process of generating the transmission control information will be described later, but (each entry of) the transmission control information generated by the transmission control information generation unit 204 includes (period information indicating) the period assigned to the entry, and transmittable information indicating the amount of data (hereinafter referred to as a transmittable amount) and the time of frames that can be transmitted before the gate is next closed at the start of the period (i.e., gate switching timing).

The setting unit 205 transmits the transmission control information generated by the transmission control information generation unit 204 to the network interface controller 4.

The detection unit 206 detects changes in the link speed of the network interface controller 4. For example, the detection unit 206 receives a notification from the network interface controller 4 and detects the change in the link speed. The link speed represents the speed of communication over the network 200 by the network interface controller 4. In addition, for example, the detection unit 206 receives a notification from the network interface controller 4 and also detects a change in operating speed information including at least one of clock information and bit width information. The clock information represents a clock frequency or clock cycle for executing a frame transmission control (process) in the network interface controller 4. The clock frequency or clock cycle (clock period) for executing the frame transmission control in the embodiment includes a clock frequency on a data transmission path between a transmission control unit 409 and a communication unit 401 and a clock frequency on the communication unit 401. The bit width information indicates the bit width of the bus at the time when the network interface controller 4 (communication unit 401) transmits a frame and the bit width of the bus provided between the transmission control unit 409 and a buffer unit 412. When, for example, the buffer unit 412 does not exist or the buffer unit 412 is built in the communication unit 401 as described later, the bit width information indicates the bit width of the bus at the time when the transmission control unit 409 outputs the frame. In addition, when a plurality of buffer units 412 are cascade-connected, the bit width information indicates the bit width of the bus in the data transfer channel between the transmission control unit 409 and the communication unit 401. In other words, although not shown in the figure, the change in the operating speed information that the network interface controller 4 notifies the detection unit 206 may be based on the clock information or the bit width information other than that of the communication unit 401.

The above-described gate control list storage unit 201 is implemented by, for example, the memory 1 configured integrally with the host processor 2, but may also be implemented by a memory other than the memory 1.

In addition, each of the above-described units 202 to 206 is implemented by, for example, one or more processors. More specifically, each of the units 202 to 206 may be implemented by urging a processor such as a central processing unit (CPU) to execute a program, i.e., by software. Each of the units 202 to 206 may be implemented by hardware such as a dedicated integrated circuit (IC) or a combination of software and hardware. When a plurality of processors are used to implement each of the units 202 to 206, each processor may be used to implement one of the units 202 to 206 or to implement two or more of the units 202 to 206.

In addition, as shown in FIG. 2, the network interface controller 4 includes the communication unit 401, a received frame storage unit 402, a transmitted frame storage unit 403, the time management unit 404, a data transfer unit 405, a reception unit 406, a transmission control information storage unit 409, a transmission control information management unit 406, the transmission control unit 409, a transmission possibility determination unit 408, a data transfer status management unit 411, the buffer unit 412, and a notification unit 413.

The communication unit 401 includes functions referred to as a media access controller (MAC) and PHY, and executes processing necessary for frame transmission and reception under protocols of a data link layer and a physical layer in the network 200. More specifically, the communication unit 401 executes processing of a data link layer and a physical layer of Ethernet as defined under IEEE 802.3.

The received frame storage unit 402 stores received frames received by the communication unit 401. The received frame storage unit 402 stores sets of data and frames of the received frames in order, using a queue (FIFO) prepared for each traffic class. The data of the frames may include time stamp information obtained at the reception.

The transmitted frame storage unit 403 stores transmitted frames generated by the frame generation unit 203 included in the host processor 2. The transmitted frame storage unit 403 stores sets of data and frames of the transmitted frames in order, using a queue (FIFO) prepared for each traffic class.

The time management unit 404 manages, for example, (time information indicating) the time in the network interface controller 4.

When the synchronization control unit 202 executes time synchronization, the communication unit 401 executes obtaining the time stamps from the received frames and assigning the time stamps to the transmitted frames, using the time information provided by the time management unit 404.

The data transfer unit 405 transfers data to and from the memory 1 (host processor 2). For example, the data transfer unit 405 transfers the frames by Direct Memory Access (DMA) data, between the received frame storage unit 402 and the memory 1 and between the memory 1 and the transmitted frame storage unit 403.

When the frames are received, the data transfer unit 405 reads a transfer destination address from a receive descriptor, and writes the data of the received frames read from the corresponding queue in the received frame storage unit 402 to an area of the memory 1 specified by the transfer destination address. Then, the data transfer unit 405 writes a length and a status of the receive descriptor.

In contrast, when the frames are transmitted, the data transfer unit 405 reads the transfer source address and the length from the transmit descriptor, reads the data for the length specified by the length from the area of the memory 1 specified by the transfer source address, and writes the data of the frames to the corresponding queue in the transmitted frame storage unit 403. Then, the data transfer unit 405 writes the status of the transmit descriptor.

The frame transmission and reception under the time synchronization protocol are also executed via the data transfer unit 405. For example, the synchronization control unit 202 calculates the time offset to the master connected via the network 200 from the time stamp of each frame, and corrects the time information of the time management unit 404.

FIG. 4 is a diagram showing a configuration example of the receive descriptor. As shown in FIG. 4, the receive descriptor is a ring buffer and is managed using two variables referred to as Head and Tail. As shown in FIG. 4, the descriptor from Head to Tail-1 indicates a descriptor owned by hardware (HW), i.e., the network interface controller 4. In addition, the descriptor from Tail to Head-1 indicates a descriptor owned by software (SW), i.e., software (frame generation unit 203 and synchronization control unit 202) running on the host processor 2. Values of Head and Tail are notified between the network interface controller 4 and the host processor 2 using a register interface and an interrupt signal.

Each entry (each descriptor) of the receive descriptor (receive descriptor ring) includes a transfer destination address, a length and a status. The transfer destination address indicates a leading address that indicates a leading position of the storage area of the data storage unit (for example, memory 1) that stores the data of the frame to be received. The length indicates the length of the frame to be received. Information indicating the status of the receiving process is stored in the status.

Figure 5:
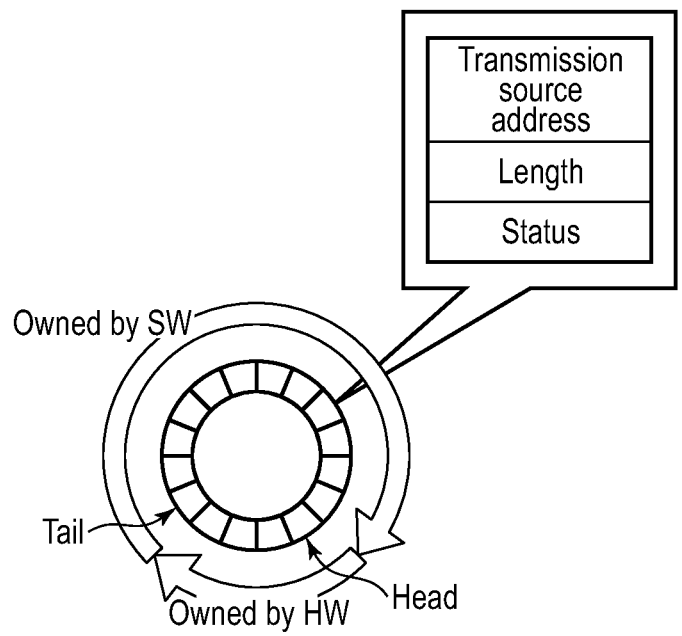
FIG. 5 is a diagram showing a configuration example of a transmit descriptor.

FIG. 5 shows a configuration example of the transmit descriptor. Detailed explanation is omitted, but the transmit descriptor is a ring buffer, similarly to the above-described receive descriptor, and is managed using two variables referred to as Head and Tail.

Each entry (each descriptor) of the transmit descriptor (transmit descriptor ring) includes a transfer source address, a length and a status. The transfer source address indicates a leading address that indicates a leading position of the storage area of the data storage unit (for example, memory 1) that stores the data of the frame to be transmitted. The length indicates the length of the frame to be transmitted. Information indicating the status of the transmitting process is stored in the status.

The above-described statuses include, for example, error bits, DONE bits, and the like. The error bit indicates the presence or absence of a transfer error. The DONE bit indicates that the process has been ended in the network interface controller 4. When the DONE bit of the receive descriptor is 1, the bit indicates that the receiving process has been ended. When the DONE bit of the transmit descriptor is 1, the bit indicates that the transmitting process has been ended. The network interface controller 4 writes 1 to each bit (error bit and DONE bit). Then, after confirming each bit, the frame generation unit 203 or the synchronization control unit 202 clears each bit by writing 0 to each bit.

The reception unit 406 accepts input of the transmission control information transmitted by the setting unit 205 of the host processor 2. The reception unit 406 may be able to set the transmission control information by a predefined register. The setting unit 205 may notify the leading address and length of the transmission control information stored in the memory 1 in a predetermined format, and the reception unit 406 may access the memory 1 and read the transmission control information.

The transmission control information accepted by the reception unit 406 is stored in the transmission control information storage unit 409.

The transmission control information management unit 408 determines timing of reading (loading) a new entry from among a plurality of entries included in the transmission control information stored in the transmission control information storage unit 409, based on the time information managed by the time management unit 404 (global clock synchronized throughout the network) and the local clock inside the network interface controller 4 (for example, a 156.25 MHz clock signal supplied by a 10 Gbps MAC).

More specifically, for example, the transmission control information management unit 408 determines the timing of reading the leading entry of the gate control list (start timing of transmission control cycle, corresponding to the timing of validating CycleStart of IEEE 802.1Qbv), with reference to the above-described global clock, base time, and cycle time. In addition, timing of reading a second or subsequent entry (i-th entry) (corresponding to the timing at which Exit Timer of IEEE 802.1Qbv becomes 0) is determined based on the above-described local clock and a time interval of the i−1st entry (the time in which the entry continues).

In addition, the transmission control information management unit 408 manages the read entry and updates, for example, (the transmittable amount indicated by) the transmittable information included in the entry, based on (progress of) the local clock.

The transmittable information included in the entry managed by the transmission control information management unit 408 is provided to the transmission possibility determination unit 410. The transmittable information provided to the transmission possibility determination unit 410 by the transmission control information management unit 408 is the number of frame transmission bits or the frame transmission time to be described below.

The transmission control unit 409 determines the transfer start timing (transmission timing) of the frame to be transmitted, which is selected from the frames stored in the plurality of queues, by cooperating with the transmission possibility determination unit 410 and the data transfer status management unit 411. The frame transfer start timing is determined based on, for example, the transmission cost at the time when the frame, which has been already determined to pass through the gate, is transmitted by the communication unit 401 and the frame transfer status between the transmission control unit 409 and the communication unit 401, which will be described later.

When the frame transfer start timing is determined by the transmission control unit 409 as described above, the frame is transferred from the transmission control unit 409 to the communication unit 401 in accordance with the transfer start timing and is transmitted to the network 200 by the communication unit 401.

The transmission possibility determination unit 410 executes determination (hereinafter referred to as guard band determination) on whether or not to transmit the frame stored in the leading queue of the plurality of queues (leading frame of the queue) under Enhancements for scheduled traffic. The guard band determination in the embodiment is executed based on the transmittable information provided by the transmission control information management unit 408 as described above, and a transmission cost (hereinafter referred to as transfer cost information) of the frame which is based on a transmission cost at the time when the leading frame of each of the plurality of queues is transmitted by the communication unit 401 and a transmission cost at the time when the frame, which has been already determined to pass through the gate corresponding to each of the plurality of queue, is transmitted by the communication unit 401. In the following descriptions, it is mainly assumed that the transfer cost information is an amount of transferred data (transfer cost indicated by the unit of the amount of data), but the transfer cost information may be data transfer time (transfer cost indicated by the unit of time).

The data transfer status management unit 411 monitors the transferred status of the frame passed through the gate corresponding to each of the plurality of queues (status of the frame which has been output from the transmission control unit 409), and causes a back pressure for suppressing the output (transfer) of the frame from the transmission control unit 409 to occur. More specifically, the data transfer status management unit 411 executes determination (hereinafter referred to as frame transfer determination) on whether or not the transmission control unit 409 can transfer the frame to the communication unit 401, based on a time-delay that occur between the transmission control unit 409 and the communication unit 401, the amount of data of the frame waiting for transmission between the transmission control unit 409 and the communication unit 401, and the amount of data that can be transmitted per unit time by the communication unit 401. The time-delay that occurs between the transmission control unit 409 and the communication unit 401, which is used in the frame transfer determination, includes the time delayed until the frame output from the transmission control unit 409 actually reaches an input port of the communication unit 401, the time delayed until the frame output from the transmission control unit 409 reaches the input port of the communication unit 401 and leading data of the frame are taken in the communication unit 401, and the like. The frame transfer determination that the transmission control unit 409 determines that the frame cannot be transferred to the communication unit 401 corresponds to the occurrence of the above-described back pressure.

The frame transfer start timing (timing at which the leading part of the frame passes through the gate) in the embodiment is determined based on a result of the above-described guard band determination and a result of the frame transfer determination.

In the embodiment, the buffer unit 412 is located between the communication unit 401 and the transmission control unit 409. In other words, transfer of the frame from the transmission control unit 409 to the communication unit 401 is executed via the buffer unit 412. In the embodiment, it is assumed that the network interface controller 4 includes the buffer unit 412, but the network interface controller 4 may not include the buffer unit 412. Alternatively, though not shown in the figure, for example, when the network interface controller 4 does not include the buffer unit 412, the transmission control unit 409 and the communication unit 401 may be connected directly to each other.

The notification unit 413 obtains the link speed and the operating speed information of the communication unit 401 and notifies the host processor 2 (detection unit 206) of the link speed and the operating speed information. For this notification, interruption may be used or the detection unit 206 may be made to execute a polling operation.

The received frame storage unit 402, the transmitted frame storage unit 403, the transmission control information storage unit 407, and the buffer unit 412 described above are implemented by, for example, static random access memories (SRAMs).

In addition, in the embodiment, it is assumed that each of the above-described units 401, 404 to 406, 408 to 411, and 413 is implemented by hardware such as a dedicated IC, but each of the units 401, 404 to 406, 408 to 411, and 413 may be implemented by urging one or more processors to run programs, i.e., by software or may be implemented by a combination of software and hardware. In addition, when a plurality of processors are used to implement each of the units 401, 404 to 406, 408 to 411, and 413, each processor may be used to implement one of the units 401, 404 to 406, 408 to 411, and 413 or to implement two or more of the units 401, 404 to 406, 408 to 411, and 413.

Figure 6:
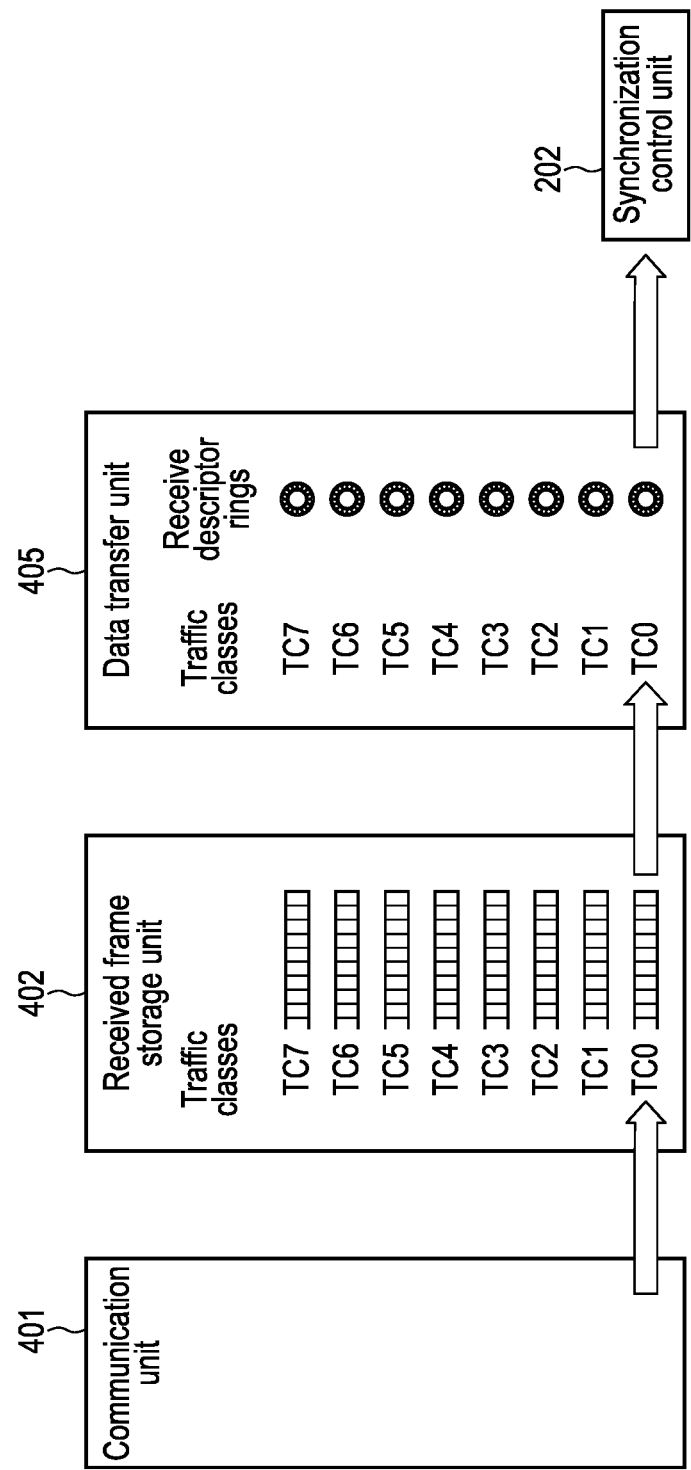
FIG. 6 is a diagram illustrating an outline of operation of a frame reception process.

Next, an overview of the operations of the frame reception process and the frame transmission process will be described with reference to FIG. 6 and FIG. V. FIG. 6 is a diagram showing the overview of the operation of the frame reception process. The communication unit 401 checks presence of a virtual local area network (VLAN) tag of the received frame and, if the VLAN tag is present, classifies the received frame into a traffic class by using its priority code point (PCP) value. The received frames are stored in order in the corresponding queues of the received frame storage unit 402. After that, the received frames are stored in the memory address of the memory 1 set in the corresponding receive descriptor of the data transfer unit 405, and are delivered to the synchronization control unit 202, and the like.

FIG. 7 is a diagram showing the overview of the operation of the frame transmission process. The frame transmission process is started with the frame generation unit 203 or the synchronization control unit 202. The frame generation unit 203 and the synchronization control unit 202 generate the payload data for the frames and assign headers and (if necessary) footers for each protocol, and generate frames (transmitted frames). The frame generation unit 203 and the synchronization control unit 202 select a traffic class to transmit the frame in accordance with the characteristics of the application and the like. For example, the transmit descriptor of the data transfer unit 405 is prepared for each traffic class. The frame which is instructed to be transferred using the transmit descriptor is read from the memory 1 and transferred to the queue of the corresponding traffic class in the transmitted frame storage unit 403. After that, the first transmission control unit 409 selects a frame to be transmitted and transmits the frame using the communication unit 401.

Next, the transmission control information generation process will be described with reference to a flowchart in FIG. 8. For example, the transmission control information generation process is executed when the gate control list is set and when a change in the link speed or operating speed information is detected by the detection unit 206.

The transmission control information generation unit 204 reads the gate control list from the gate control list storage unit 201 (step S1). It is assumed here that, for example, the gate control list shown in FIG. 3 is read.

The transmission control information generation unit 204 calculates the time for which "o" in the gate control list continues (continuous open time) for each traffic class (step S2).

FIG. 9 shows an example of the continuous open time calculated in step S2. For example, for entry T02 of traffic class TC7, "o" continues from T02 to T03, and becomes "C" in T04. Since the time intervals of T02 and T03 are 512 µs and 128 µs, "o" continues for 512+128=640 µs from the leading part of T02. Similarly, in the case of T03, "o" continues for 128 µs since it becomes "C" in T04. When advancing to the last entry, the gate control list returns to the first entry (leading entry). In the case of T05, since "o" continues from T05 to T00, "o" is considered to continue for 512+128=640 µs. When the gate status is always "o" similarly to traffic class TC0, "o" continues as long as the gate control list is not changed, and the continuous open time becomes infinite ($\infty$).

The description returns again to FIG. 8, and the transmission control information generator 204 generates the transmission control information by using the continuous open time calculated in step S2 (step S3).

The transmission control information generated in step S3 will be described below. FIG. 10 to FIG. 17 are tables specifically illustrating the transmission control information generated by the transmission control information generation unit 204.

The transmission control information shown in FIG. 10 includes the time in which frames can be transmitted in the queue of each traffic class at the timing of gate switching (hereinafter referred to as a frame transmittable time) as transmittable information. In addition, in the example shown in FIG. 10, the time corresponds to period information and is expressed as a relative value (relative time) from the leading time of the gate control list. In addition, the transmission control information includes information on the base time and the cycle time set in the gate control list.

FIG. 10 shows an example of the transmission control information that includes the frame transmission available time for all traffic classes at the time of gate switching. In contrast, FIG. 11 shows an example of the transmission control information including the only frame transmittable time for a newly open case. In the example shown in FIG. 11, the entry in the fourth line may be deleted.

By the way, if, for example, the link speed is obtained, the frame transmittable time can be converted into the amount of data in the frame that can be transmitted in the time (i.e., the number of frame transmittable bits). FIG. 12 and FIG. 13 show an example of the transmission control information that includes the number of frame transmittable bits to which the frame transmittable time shown in FIG. 10 and FIG. 11 is converted, as the transmittable time, in a case where the link speed is 1 Gbps. For example, when the link speed is 1 Gbps, the number of bits that can be transmitted in 128 μs is 1,000,000,000×(128/1,000,000)=128,000,000 bits. If the transmittable information is expressed by the number of frame transmittable bits, the amount of calculation required when using the number of frame transmittable bits can be reduced on the network interface controller 4 side. Furthermore, the relative value (period information) from the leading part may be expressed in bits instead of time. FIG. 14 and FIG. 15 show examples of transmission control information employing a number of bits instead of time. When the transmittable information is not expressed as the number of frame transmittable bits, for example, the link speed does not need to be detected, and the above-described process of detecting the link speed in the detection unit 206 may be omitted.

FIG. 12 to FIG. 15 described above show the examples in which the transmittable information (transmittable amount) is expressed in bits, but the transmittable information may also be expressed in bytes.

Furthermore, as shown in FIG. 16, the period information included in the transmission control information may be the number of clock cycle (i.e., the number of clock cycle based on the local clock) of the network interface controller 4 (for example, transmission control unit 409), which indicates the value of the time interval included in the gate control list. In addition, the value of the time interval may also be expressed in hours similarly to the gate control list.

The number of clock cycles indicating the above value of the time interval indicates how many clock operations of the transmission control unit 409 or the like correspond to the time interval of each entry. For example, when the transmission control unit 409 operates at 156.25 MHz, one clock cycle is 1/156.25=6.4 ns. For example, the time interval of 128 μs is expressed as 128 μs/6.4 ns=20000 in clock cycle.

The transmission control information including the transmittable information (number of frame transmittable bits) for all traffic classes at the timing of gate switching is shown in FIG. 16, but the transmission control information may be, for example, transmission control information including the only transmittable information for a newly open case as shown in FIG. 17.

The transmission control information including the number of clock cycles as the period information as described above is generated based on, for example, clock information indicating the clock frequency or clock cycle in which the network interface controller 4 (transmission control unit 409 or the like) executes processing, or the like. The clock information may be obtained as the operating speed information by, for example, the notification unit 413 as described above, and may be notified to the host processor 2 (detection unit 206) by the notification unit 413.

The transmission control information in the embodiment is considered as information indicating the amount of data of the frame transmittable until the gate corresponding to each of the plurality of queues is closed, in consideration of the feature that the frame transmittable time can be converted into the amount of data (i.e., the transmittable amount) of the frame transmittable within the time as described above.

Description returns again to FIG. 8, and the setting unit 205 urges the transmission control information storage unit 407 included in the network interface controller 4 to store the transmission control information generated in step S3 (step S4).

When the transmission control information is stored in the transmission control information storage unit 407 in step S4, for example, the transmission control unit 409 validates the frame transmission control (gate control), based on the transmission control information (step S5).

Figure 18:
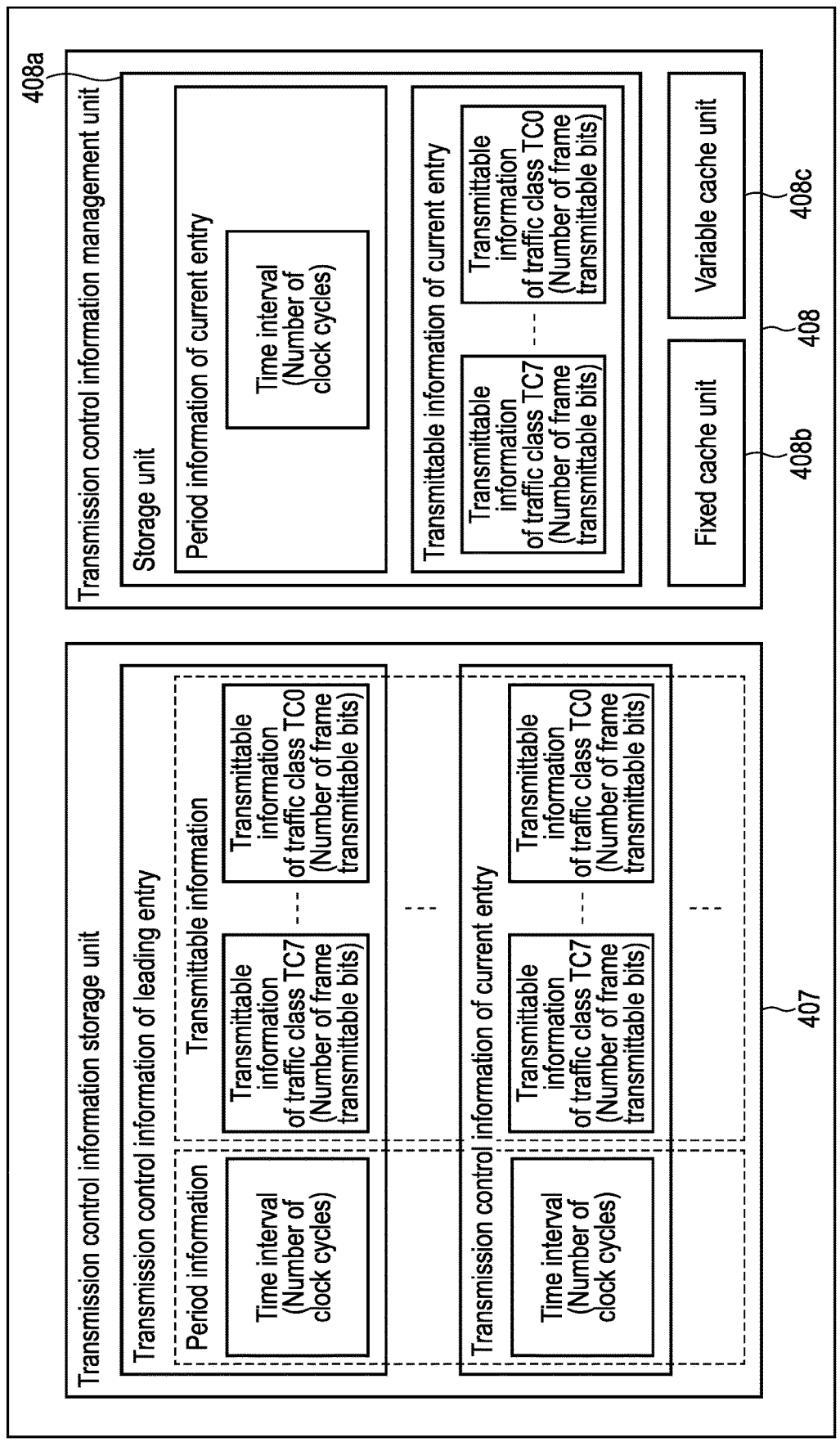
FIG. 18 is a diagram illustrating an example of a configuration of a transmission control information management unit.

When the processes in FIG. 8 are executed as described above, the transmission control information including a plurality of entries is stored in the transmission control information storage unit 407 as shown in, for example, FIG. 18, and the transmission control information management unit 408 can specify and read a currently valid entry (hereinafter referred to as a current entry) among the plurality of entries, using the time managed in the time management unit 404 (i.e., global clock), local clock, base time, and cycle time. The current entry read by the transmission control information management unit 408 is temporarily stored in a storage unit (temporary storage unit) 408a in the transmission control information management unit 408.

The current entry stored in the storage unit 408a is assumed to include the period information (time interval indicated by the number of clock cycles) and the transmittable information (number of frame transmittable bits) for each traffic class as shown in FIG. 16 and FIG. 17 described above.

Furthermore, the transmission control information management unit 408 includes a fixed cache unit 408b and a variable cache unit 408c. The fixed cache unit 408b holds the leading entry (period information and transmittable information). The variable cache unit 408c holds an entry (period information and transmittable information) next to the current entry. Even in a case where, for example, the transmission control information management unit 408 cannot immediately read the entry from the transmission control information storage unit 407, the current entry can be appropriately switched at the entry switching timing, by preparing such fixed cache unit 408b and variable cache unit 408c. The fixed cache unit 408b holds the leading entry fixedly, while the variable cache unit 408c operates to hold the entry next to the current entry every time the current entry stored in the storage unit 408a is switched.

It has been described that the transmission control information management unit 408 includes the fixed cache unit 408b and the variable cache unit 408c, but the transmission control information management unit 408 may be configured to include one cache unit, which includes a storage area corresponding to the fixed cache unit 408b and a storage area corresponding to the variable cache unit 408c.

Figure 19:
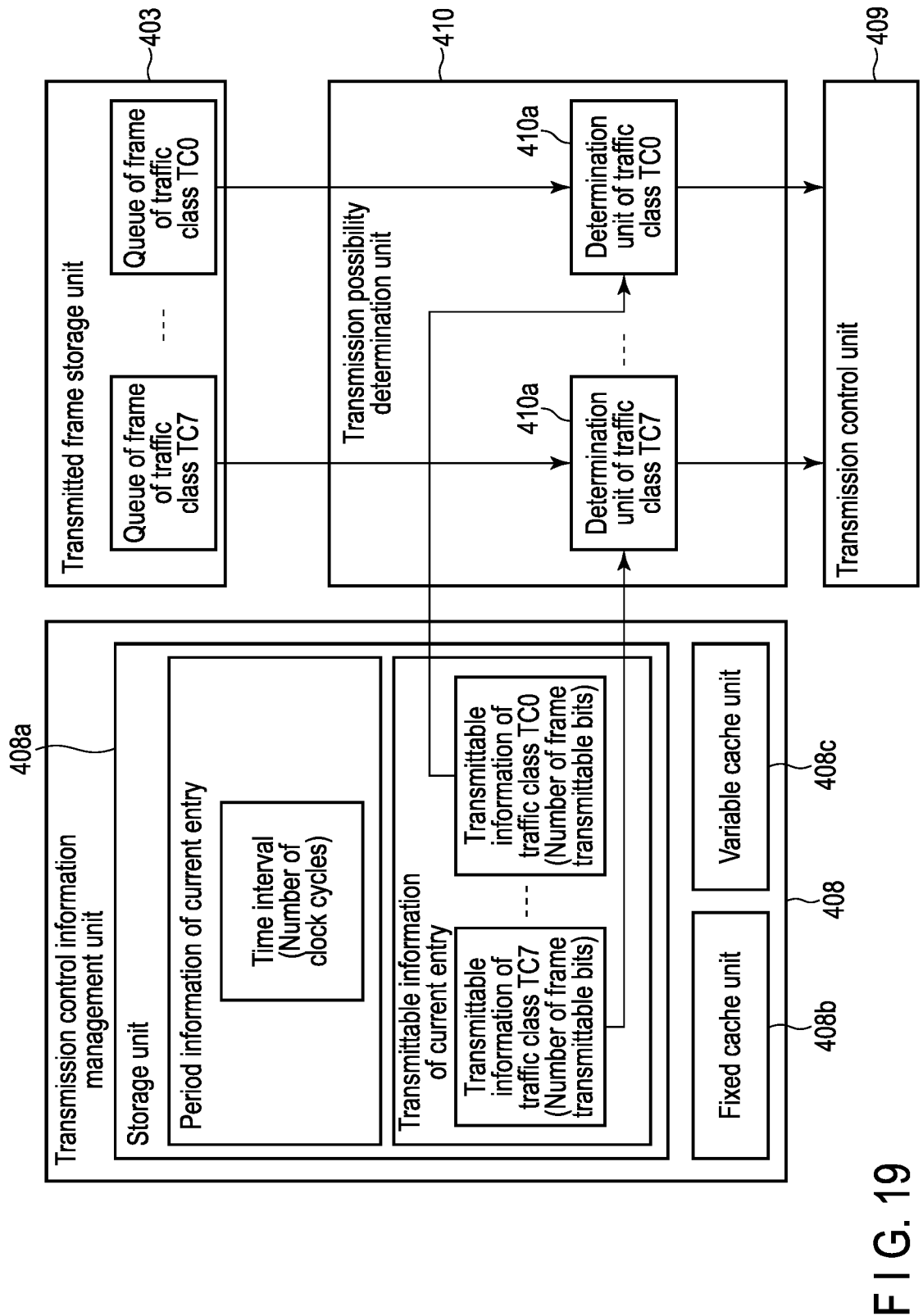
FIG. 19 is a diagram illustrating an example of a configuration of a transmission possibility determination unit.

When the current entry is stored in the storage unit 408a in the transmission control information management unit 408 as described with reference to FIG. 18, the transmission possibility determination unit 410 obtains the transmittable information (number of frame transmittable bits) included in the current entry, obtains the frame stored at the leading part of each of the plurality of queues prepared in the transmitted frame storage unit 403, and executes the above-describe guard band determination. As shown in FIG. 19, the transmission possibility determination unit 410 is assumed to include a plurality of determination units (hereinafter referred to as traffic class determination units) 410a corresponding to a plurality of traffic classes. According to this, the guard band determination is executed for each traffic class. More specifically, for example, the determination unit 410a of traffic class TC7 executes the guard band determination using the transmittable information of traffic class TC7 which is read from the storage unit 408a in the transmission control information management unit 408 and the frame information obtained from the queue of traffic class TC7. Traffic class TC7 has been described, and (the determination units 410a of) the other traffic classes are also constituted in the same manner.

The operations of the network interface controller 4 (communication control device) according to the embodiment will be described below. It is assumed in the following descriptions that, for example, the transmission control information shown in FIG. 16 is stored in the transmission control information storage unit 407.

Figure 20:
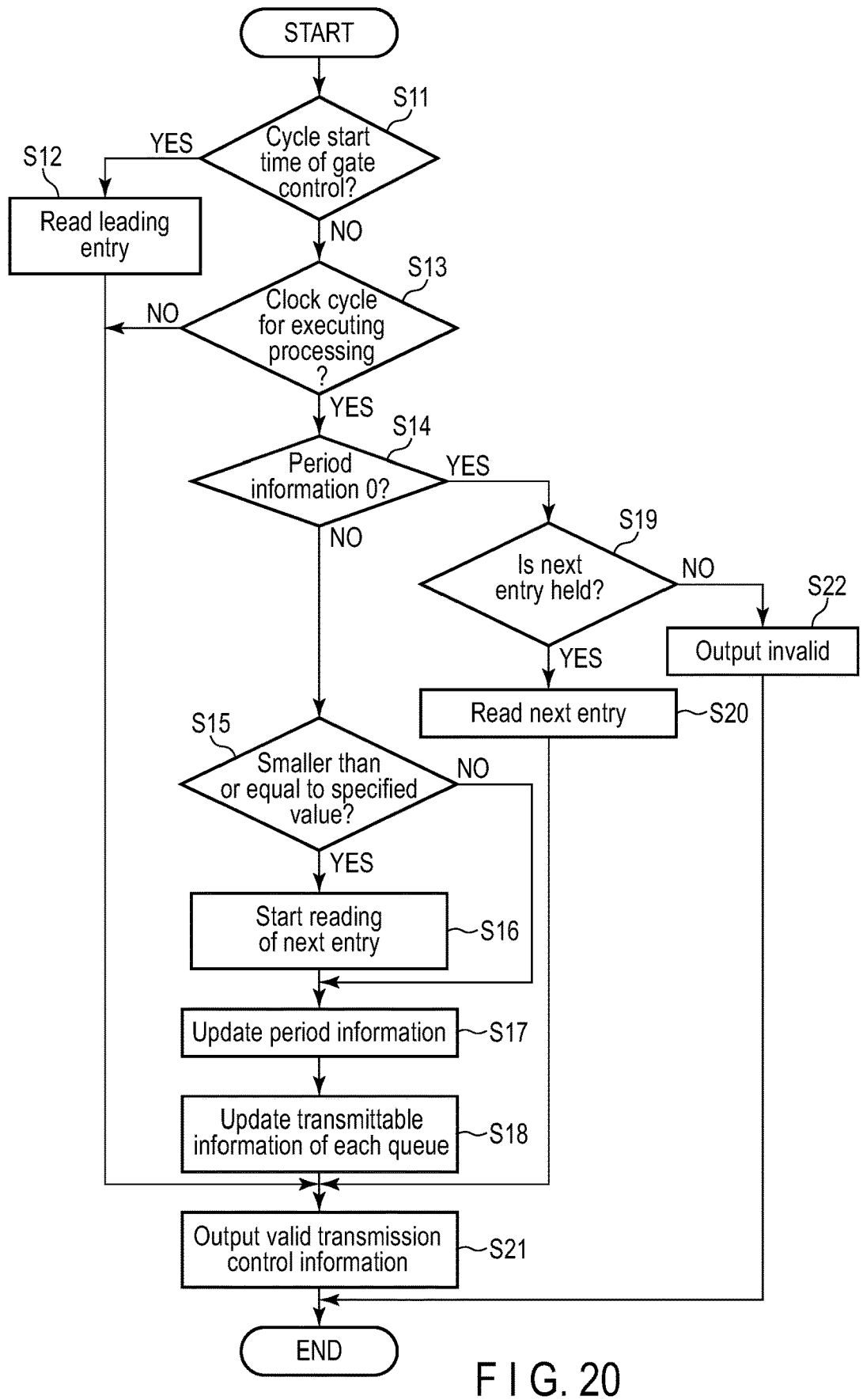
FIG. 20 is a flowchart showing an example of a procedure of the transmission control information management unit.

First, an example of a procedure of the transmission control information management unit 408 will be described with reference to a flowchart of FIG. 20. The processing shown in FIG. 20 is executed in each clock cycle based on the local clock (operation clock of the transmission control unit 409 or the like) in the network interface controller 4. In addition, it is assumed that a leading entry of the transmission control information is stored in the fixed cache unit 408b provided in the transmission control information management unit 408 from the transmission control information storage unit 407.

The transmission control information management unit 408 determines whether or not the current time is the cycle start time of the gate control (i.e., start time of the leading process) by referring to the time information managed in the time management unit 404 (i.e., time information provided by the time management unit 404) (step S11). The process of step S11 corresponds to the process of determining whether or not a cycle start signal under IEEE 802.1Qbv is active, and executes the determination using the cycle time and base time included in the transmission control information and the time information provided by the time management unit 404.

If it is determined that the current time is the start time of the gate control cycle (YES in step S11), the transmission control information management unit 408 reads the leading entry of the transmission control information from the fixed cache unit 408b provided in the transmission control information management unit 408 (step S12). When the process of step S12 is executed, the entry read in step S12 is stored in the storage unit 408a in the transmission control information management unit 408 as the above-described current entry.

In contrast, if it is determined that the current time is not the start time of the gate control cycle (NO in step S11), the transmission control information management unit 408 determines whether or not the current clock cycle is a clock cycle for processing (i.e., a clock cycle according to the number of preset processing unit clock cycles) (step S13). For example, if the number of processing unit clock cycles is 1, it means executing the processing in every clock cycle. In addition, for example, if the number of processing unit clock cycles is five (i.e., processing is executed once every five clock cycles), then four clock cycles following the clock cycle in which the processing has been executed is not executed, but the processing is executed in the next clock cycle.

If it is determined that the current clock cycle is the clock cycle for executing (YES in step S13), the current entry is already stored in the storage unit 408a of the transmission control information management unit 408. In this case, the transmission control information management unit 408 determines whether or not the period information (time interval value expressed as the number of clock cycles) included in the current entry stored in the memory unit 408a is 0 (step S14).

If it is determined that the period information is not 0 (NO in step S14), the transmission control information management unit 408 determines whether or not the period information included in the current entry stored in the storage unit 408a is smaller than or equal to a specified value (step S15). The specified value in step S15 is set in consideration of the time required to read the entry from the transmission control information storage unit 407.

If it is determined that the period information is smaller than or equal to the specified value (YES in step S15), the transmission control information management unit 408 starts reading the entry next to the current entry from the transmission control information storage unit 407 (step S16). If reading the entry next to the current entry is completed by executing the process of step S16, the next entry is stored in the variable cache unit 408c provided in the transmission control information management unit 408.

In contrast, if it is determined that the period information is not smaller than or equal to the specified value (NO in step S15), the process of step S16 is not executed.

Next, the transmission control information management unit 408 updates the period information included in the current entry stored in the storage unit 408a (step S17). In step S17, a process of subtracting the above number of processing unit clock cycles from the period information (number of clock cycles) is executed.

In addition, the transmission control information management unit 408 updates the transmittable information (for example, the number of frame transmittable bits or the frame transmittable time) for each traffic class included in the current entry stored in the storage unit 408a (step S18). If the transmittable information is the number of frame transmittable bits, a process of subtracting, for example, a predetermined value such as the amount of data that can be transmitted for the number of processing unit clock cycles by the communication unit 401 from (the number of frame transmittable bits indicated by) the transmittable information of each traffic class is executed in step S18. In the case of frame transmission to the outside, the amount of data that can be transmitted per clock cycle needs to be consistent with the data transfer rate of the MAC. Although not shown in the figure, when only internal data transfer is executed, the amount of data that can be transmitted per clock cycle needs to be consistent with the data transfer rate of the internal module connected to the output portion of the transmission control unit 409 (i.e., the module that does not make direct communication with the external network to which the communication unit 401 is connected). For example, to implement 10 Gbps in a case where one clock cycle is 6.4 ns when executing frame transmission to the outside (when the operating frequency is 156.25 MHz), 64-bit data are transferred for each clock cycle. In this case, if the number of processing unit clock cycles is set to five, 64 bits×5=320 bits are subtracted from the transmittable information of each traffic class in step S18. In contrast, if the transmittable information is the frame transmittable time, a process of subtracting a value corresponding to the time actually elapsed from (the frame transmittable time indicated by) the transmittable information may be executed in step S18.

In contrast, if it is determined that the period information is 0 (YES in step S14), the determination means that the period allocated to the current entry stored in the memory unit 408a has expired, and the transmission control information management unit 408 determines whether or not the next entry is stored in the variable cache unit 408c provided in the transmission control information management unit 408 (step S19).

If it is determined that the next entry is stored in the variable cache unit 408c (YES in step S19), the transmission control information management unit 408 reads the next entry from the variable cache unit 408c (step S20). The next entry read in step S20 is stored in the storage unit 408a as the current entry.

If the above step S12 is executed, the transmission control information management unit 408 outputs the current entry stored in the storage unit 408a as valid transmission control information (step S21). In other words, the transmission control information management unit 408 outputs the transmission available information (for example, number of frame transmittable bits or frame transmittable time) updated to the latest status. The process of step S21 is also executed in the same manner when it is determined in step S13 that the current clock cycle is not the clock cycle for processing (NO in step S13), when the process of step S18 is executed, and when the process of step S20 is executed.

In contrast, if it is determined in step S19 that the next entry is not stored in the variable cache unit 408c (NO in step S19), the transmission control information management unit 408 outputs "invalid" indicating that the current entry stored in the storage unit 408a is invalid (step S22). In the embodiment, "invalid" means that the transmission control information (entry) has not been updated to the latest status. In other words, "invalid" means that the transmittable information (for example, the number of frame transmittable bits or the frame transmittable time) has not been updated to the latest status.

It has been described with reference to FIG. 20 that the process of step S21 is executed if the current clock cycle is not determined as a clock cycle for processing in step S13, but the process of step S22 may be executed if the current clock cycle is not determined as a clock cycle for processing. In addition, the value calculated as the transmission control information may be a value obtained by subtracting the number of processing unit clock cycles in advance.

By executing the above process shown in FIG. 20, the transmission control information management unit 408 can appropriately switch entries according to the operating clock of the transmission control unit 409 or the like and keep (the period information and the transmittable information of each traffic class, which are included in) the entries in the latest status at any time.

For example, if the operating frequency of the network interface controller 4 (for example, transmission control unit 409) and the bus width transmitted on the network 200 (i.e., the amount of data that can be transmitted per clock cycle by the communication unit 401) do not match, the value that is subtracted from the transmittable information of each traffic class (hereafter referred to as the subtracted value) may be changed in step S18. In this case, the host processor 2 may notify the transmission control information management unit 408 of information on the subtracted value to be changed (subtracted value information). For example, when the subtracted value is changed at a predetermined clock cycle, the subtracted value information may be, for example, information including a first subtracted value and its repetition number and a second subtracted value and its repetition number, or the like. The subtracted value information may be the information in other formats as long as the subtracted value at each clock cycle position in a predetermined number of clock cycles (operating clocks) can be specified.

It has been described that the transmission control information shown in FIG. 16 is stored in the transmission control information storage unit 407, but, for example, if the transmission control information shown in FIG. 10, i.e., the transmittable information is expressed in terms of time in the transmission control information storage unit 409, 6.4 ns may be subtracted from the transmittable information (frame transmittable time) for each clock cycle, based on, for example, the clock operating frequency of 156.25 MHz. In addition, when the period (information) assigned to each entry, such as the transmission control information shown in FIG. 10, is managed in terms of time (relative time from the leading part of the gate control list), it may be determined whether or not a new entry is read based on the time information managed by the time management unit 404. In addition, the time interval in each entry may be kept and determined in the form of time.

Next, the frame transmission control of the embodiment will be described. In the frame transmission control in the embodiment, when the transmission control (gate control) of the frame based on the transmission control information is validated in step S5 shown in FIG. 8 described above, the following guard band determination process, frame selection process, transfer cost information calculation process, and back pressure process are executed in parallel in each clock cycle. It is assumed that the local clock signal inside the network interface controller 4 (for example, 156.25 MHz clock signal supplied from the 10 Gbps MAC) is used as a synchronization clock signal which execution of these processes is based, but the other clock signals may be used.

The guard band determination process, frame selection process, transfer cost information calculation process, and back pressure process described above will be described below. It is assumed here that the store-and-forward method is employed in the network interface controller 4 (transmitted frame storage unit 403).

First, an example of a procedure of the guard band determination will be described with reference to a flowchart of FIG. 21. The guard band determination process is executed by the transmission possibility determination unit 410. In addition, as described above, the transmission possibility determination unit 410 includes a plurality of determination units 410a corresponding to a plurality of traffic classes, and the guard band determination process is executed by each of the plurality of determination units 410a.

The guard band determination processing executed by a determination unit (hereinafter referred to as a target determination unit) 410*a* among a plurality of determination units 410*a* will be described. In addition, the queue of the traffic class corresponding to the target determination unit 410*a* is referred to as a target queue for convenience.

In this case, the target determination unit 410*a* determines whether or not a frame in a transmittable status is in the target queue (step S31). When the store-and-forward method is employed in the network interface controller 4 (transmitted frame storage unit 403) as described above, the above-mentioned "transmittable frame in the target queue" means that a frame in which all data are stored in the target queue is present (i.e., a frame in which all data constituting the frame are collected is stored in the target queue). In other words, a transmittable frame is a frame whose amount of data is fixed.

If it is determined that a transmittable frame is in the target queue (YES in step S31), the target determination unit 410*a* determines whether or not the transmission control information is valid (i.e., the current entry is output as valid transmission control information from the transmission control information management unit 408) (step S32). In other words, the target determination unit 410*a* determines whether or not the transmission control information updated to the latest status is output from the transmission control information management unit 408.

If it is determined that the transmission control information is valid (YES in step S32), the target determination unit 410*a* obtains the transmittable information of the traffic class corresponding to the target determination unit 410*a* included in the current entry output from the transmission control information management unit 408 (step S33).

Next, the target determination unit 410*a* obtains the amount of data (frame length) of a frame (hereinafter referred to as a target frame) stored at the leading part of the target queue (step S34).

When the process of step S34 is executed, the target determination unit 410*a* executes the guard band determination, based on the transmittable information (number of frame transmittable bits or frame transmittable time) obtained in step S33, the total communication cost (transmission cost) for which the target frame is transmitted by the communication unit 401, and the transfer cost information (amount of transferred data and data transfer time) (step S35).

For example, a total value of the amount of data of the target frame obtained in step S34 and the communication overhead generated when the communication unit 401 actually transmits the target frame can be used as the total communication cost used in the guard band determination of step S35. The communication overhead includes, for example, the amount of data added internally in the communication unit 401 when transmitting the target frame (for example, a frame checksum sequence such as 32-bit CRC), and a media-dependent overhead. FIG. 22 shows an example of the media-dependent overhead. The media-dependent overhead includes, for example, the inter-frame gap (IFG), as well as the size of a preamble and a start frame delimiter (SFD) of the next frame.

In addition, the total communication cost can also be expressed in time units. For example, the total communication cost can be converted in time units, based on the total value (amount of data) described above and the link speed (the amount of data that can be transmitted per unit time). More specifically, for example, when the total communication cost (amount of data) is 1000 bits and the link speed is 10 Gbps, the total communication cost (time) is 1000 bits/10 Gbps=100 ns. Such a total communication cost expressed in time units is used in the guard band determination when the transmittable information is the frame transmittable time as described above.

The total communication cost has been described, but transfer cost information (amount of transferred data) to be described later can also be converted per unit time, similarly to the total communication cost.

In addition, the transfer cost information (for example, the amount of transferred data or data transfer time) used in the guard band determination in step S35 is calculated in each clock cycle by executing the transfer cost information calculation process to be described later but, if it is assumed that the guard band determination process shown in FIG. 21 is executed in N-th clock cycle, the transfer cost information calculated in an N−1-th clock cycle is used in the guard band determination of step S35. More specifically, the transfer cost information calculated in the N−1-th clock cycle may be stored in the register or the like and the register or the like may be retrieved as needed in the guard band determination. Details of the transfer cost information will be described later.

If the process of step S35 is executed, the target determination unit 410*a* determines whether or not the target frame satisfies a condition of the guard band determination (step S36). If the transmittable information obtained in step S33 is the number of frame transmittable bits, the condition for guard band determination is, for example, "transmittable information (number of frame transmittable bits) the total communication cost (amount of data)+amount of transferred data when the target frame is transmitted by the communication unit 401". In contrast, if the transmittable information obtained in step S33 is the frame transmittable time, the condition for guard band determination is, for example, "transmittable information (frame transmittable time) total communication cost (time)+data transfer time when the target frame is transmitted by the communication unit 401". In other words, the condition for guard band determination is "transmittable information transmission cost+transfer cost information".

If it is determined that the target frame satisfies the condition for guard band determination (YES in step S36), the target determination unit 410*a* notifies the transmission control unit 409 that the target frame (i.e., the frame stored at the leading part of the target queue) can be transmitted (step S37). More specifically, in step S37, the transmission possibility information indicating that the target frame can be transmitted is delivered from the target determination unit 410*a* to the transmission control unit 409.

In contrast, if it is determined that the target frame does not satisfy the condition for guard band determination (NO in step S36), the target determination unit 410*a* notifies the transmission control unit 409 that the target frame cannot be transmitted (i.e., untransmittable) (step S38). More specifically, in step S37, the transmission possibility information indicating that the target frame is transmittable is delivered from the target determination unit 410*a* to the transmission control unit 409.

If it is determined that there is no frame in the status of being transmittable to the target queue in step S31 described above (NO in step S31) or if it is determined that the transmission control information is not valid in step S32 (NO in step S32), the process of step S38 is executed.

Since the above-described guard band determination process is executed by a plurality of determination units 410*a* corresponding to a plurality of traffic classes, the transmission possibility determination unit 410 (a plurality of determination units 410*a*) notifies the transmission control unit 409 of the possibility of transmission of the queue stored in the leading part of the queue of each traffic class, by executing the guard band determination process.

Next, an example of a procedure of the frame selection process will be described with reference to a flowchart of FIG. 23. The frame selection process is executed by the transmission control unit 409.

First, the transmission control unit 409 determines whether or not the transmission control unit 409 is in a busy status (step S41). The busy status means the status in which the transmission control unit 409 is transferring frames to the communication unit 401 (buffer unit 412).

If it is determined that the transmission control unit 409 is not in the busy status (i.e., in the idle status in which no frame is transmitted) (NO in step S41), the transmission control unit 409 determines whether or not transfer of a new frame can be started based on a notification (i.e., a result of the frame transfer determination) from the data transfer status management unit 411, which is made by executing the back pressure process to be described later (step S42).

If it is determined that transfer of a new frame can be started (YES in step S42), the transmission control unit 409 obtains the transmittable information delivered from the transmission possibility determination unit 410 (a plurality of determination units 410a) by executing the above guard band determination process (step S43). According to the transmittable information obtained in step S43, the transmission control unit 409 can recognize whether or not each of the frames stored at the leading part of the queue among the plurality of traffic classes, can be transmitted.

Next, the transmission control unit 409 selects a frame whose transfer from the transmission control unit 409 to the communication unit 401 is to be actually started, among the transmittable frames (step S44). The process of step S44 may be executed according to any selection algorithm and, for example, if "Strict Priority" is used as the selection algorithm, the frame with the highest priority is selected among the transmittable frames. The frame selected in step S44 is hereinafter referred to as a transfer start frame.

When the process of step S44 is executed, the transmission control unit 409 notifies the transmission possibility determination unit 410 of the start of transfer of the transfer start frame, and of the total communication cost (hereinafter referred to as the total communication cost of the transfer start frame) at the time when the transfer start frame is transmitted by the communication unit 401 (step S45).

When the process of step S45 is executed, the transmission control unit 409 starts transfer of the transfer start frame and transitions to the busy status (step S46). The busy status of the transmission control unit 409 is canceled at the timing when the transfer of the transfer start frame is completed. When the busy status is canceled, the transmission control unit 409 automatically transitions to the idle status.

In contrast, if it is determined in step S41 that the transmission control unit 409 is in the busy status (YES in step S41) and if it is determined in step S42 that transfer of a new frame cannot be started (NO in step S42), the process shown in FIG. 23 is ended.

According to the above-described frame selection process, the transfer start frame can be selected (i.e., the frame transfer start timing can be determined) and the transmission of the transfer start frame can be started, based on the result of the guard band determination executed by the transmission possibility determination unit 410 and a result of the frame transfer determination executed by the data transfer status management unit 411.

Next, an example of a procedure of the transfer cost information calculation process will be described with reference to a flowchart of FIG. 24. The transfer cost information calculation process is executed by the transmission possibility determination unit 410. It is assumed that the transfer cost information is the amount of transferred data, and the same process is also executed when transfer cost information is the data transfer time.

First, the transmission possibility determination unit 410 obtains, for example, the amount of transferred data held in the transmission possibility determination unit 410 (step S51). The transfer cost information calculation process shown in FIG. 24 is a process of calculating the transfer cost information (amount of transferred data in this case) and, if it is assumed that the transfer cost information calculation process is executed in, for example, the N-th clock cycle, the amount of transferred data obtained in step S52 is the amount of transferred data calculated in the transfer cost information calculation process executed in the N−1-th clock cycle. In this case, the amount of transferred data calculated in the N−1-th clock cycle is stored in the register or the like, and the process of step S51 may be executed by referring to the register or the like as needed. In addition, since the initial status in which the frame is not transferred at all is 0, 0 may be set as a default value when the register or the like storing the amount of transferred data is initialized.

Next, the transmission possibility determination unit 410 determines whether or not transfer of a new frame is started based on a notification from the transmission control unit 409 made by executing the above-described frame selection process (step S52). In step S52, when the process of step S45 shown in FIG. 23 described above is executed, it is determined that transfer of a new frame is started. In contrast, if the process of step S45 shown in FIG. 23 is not executed, it is determined that the transfer of a new frame is not started.

If it is determined that the transfer of a new frame is started (YES in step S52), the transmission possibility determination unit 410 increases the amount of transferred data obtained in step S51, based on the total communication cost (i.e., total communication cost of the transfer start frame) notified from the transmission control unit 409 by executing the process of step S45 shown in FIG. 23 described above (step S53). In step S53, for example, the process of adding the total communication cost to the amount of transferred data may be executed, but the other process may be executed if the total communication cost can be reflected on the amount of transferred data.

It has been described that the total communication cost is notified by the transmission control unit 409 but, if the total communication cost is not notified by the transmission control unit 409, the process of step S53 is omitted.

Next, the transmission possibility determination unit 410 reduces the amount of transferred data obtained in step S51 or the amount of transferred data after the process of step S53 is executed, based on the amount of data that the communication unit 401 can transmit per clock cycle (hereinafter referred to as amount of data transmitted per clock cycle) (step S54). In step S54, for example, the process of reducing the amount of data that the communication unit 401 can transmit per clock cycle from the amount of transferred data may be executed, but the other process may be executed if the amount of data can be reflected on the amount of transferred data.

The amount of data transferred after the process of step S54 is executed is held in the transmission possibility determination unit 410 (step S55). When the transmission determined information calculation process is executed in the N-th clock cycle as described above, the amount of transferred data held in step S55 of the transfer cost information calculation process is used in the guard band determination process executed in the N+1-th clock cycle.

According to the above-described transfer cost information calculation process, it is possible to calculate the amount of transferred data in each clock cycle and to reflect the amount of transferred data on the frame selection process (i.e., determination of frame transfer start timing).

In the embodiment, the amount of transferred data is the value obtained by periodically subtracting the amount of data transmitted per clock cycle, from the total communication cost (amount of data) calculated based on both the frame determined to be transferred in near past by the transmission control unit 409 and the communication overhead that is to occur when the communication unit 401 actually transmits the frame. In other words, the amount of transferred data is considered as a current evaluation value of the communication cost (transmission cost) whose occurrence is confirmed. Since the amount of transferred data in a status in which no frames are transferred from the transmission control unit 409 is 0, the amount of transferred data is a value more than or equal to 0.

It is assumed that the transfer cost information is the amount of transferred data but, when the transfer cost information is the data transfer time, the data transfer time may be a value obtained by periodically subtracting the time corresponding to one clock cycle from the total communication cost (time).

Next, an example of a procedure of the back pressure process (process of causing the back pressure to occur) will be described with reference to a flowchart of FIG. 25. The back pressure process is executed by the data transfer status management unit 411.

First, the data transfer status management unit 411 obtains information (hereinafter referred to as transfer status information) on the transfer status of the frame whose transfer is started by the transmission control unit 409 (transfer start frame) (step S61).

The transfer status information obtained in step S61 includes, for example, both a time-delay which occurs between the transmission control unit 409 and the communication unit 401 (i.e., a time-delay for which the data output from the transmission control unit 409 actually reaches the input port of the communication unit 401) and a total value of the amount of data of the frame staying (waiting for transmission) between the transmission control unit 409 and the communication unit 401 (hereinafter referred to as an amount of staying data).

The time-delay may be, for example, a static value calculated in advance based on specifications of each IP core or the like or a value dynamically calculated by monitoring input and output ports of the buffer unit 412 or the like.

Since the amount of staying data corresponds to, for example, the amount of data of the frame stored in the buffer unit 412, the amount of staying data can be obtained from, for example, the buffer unit 412. The amount of staying data may be dynamically estimated by monitoring the output port of the transmission control unit 409 or the like. In this case, for example, the value larger than or equal to 0, which is obtained by periodically subtracting the amount of data transmitted per clock cycle from the actual amount of data output from the transmission control unit 409 can be estimated as the amount of staying data.

When the process of step S61 is executed, the data transfer status management unit 411 executes the frame transfer determination, based on the transfer status information (time-delay and amount of staying data) obtained in step S61 and the amount of data transmitted per clock cycle (step S62).

When the process of step S62 is executed, the data transfer status management unit 411 determines whether or not the transfer status of the current frame satisfies the condition for the guard band determination (step S63). The condition for the frame transfer determination is, for example, "amount of staying data≤time-delay×amount of data transmitted per clock cycle". In other words, the condition for the frame transfer determination is to determine whether or not the smallest amount of data necessary to efficiently use the network bandwidth exists between the transmission control unit 409 and the communication unit 401.

If it is determined that the transfer status of the current frame satisfies the condition for the frame transfer determination (YES in step S63), the data transfer status management unit 411 notifies the transmission control unit 409 that the frame can be transmitted (step S64).

In contrast, if it is determined that the transfer status of the current frame does not satisfy the condition for the frame transfer determination (NO in step S63), the data transfer status management unit 411 notifies the transmission control unit 409 that the frame cannot be transmitted (step S65). When the process of step S65 is executed, it is determined that the transfer of a new frame cannot be started in the frame selection process (step S32 shown in FIG. 23), and the back pressure can be made to occur.

In the above-described back pressure process, the back pressure can be made to occur in consideration of the frame transfer status between the transmission control unit 409 and the communication unit 401. The back pressure process in the embodiment does not cause the back pressure to occur for the frame whose transfer is previously started (frame which is currently being transferred). In other words, it is assumed that the frame subjected to the back pressure is the frame whose transfer is to be newly started by the transmission control unit 409 (i.e., the frame to pass through the gate), and that the back pressure is not made to occur for the frame whose leading part already passes through the gate even slightly (i.e., the frame which has been already determined to pass through the gate).

In the embodiment, the frame transmission control is implemented in consideration of the result of the guard band determination and the result of the frame transfer determination, by executing a combination of the guard band determination process, the frame selection process, the transfer cost information calculation process, and the back pressure process in each clock cycle.

The transfer cost information is used in the guard band determination and the data transfer status is used in the back pressure process, and the transfer cost information and the data transfer status are independent concepts.

More specifically, for the transfer cost information, the communication overhead (32-bit CRC, media-dependent overhead or the like) is considered as well as the frame (data) actually output from the transmission control unit 409. However, when the communication overhead can be ignored (for example, when only internal data transfer not shown is executed), the communication overhead may not be included in the transfer cost information.

In contrast, for the data transfer status (frame transfer status), the frame actually output from the transmission control unit 409 (for example, data flowing between the transmission control unit 409 and the communication unit 401) is considered, but the communication overhead is not considered. For example, even if the frame is transmitted externally or internally, the communication overhead is basically excluded from the target as the data transfer status used in the back pressure process.

Figure 26B:
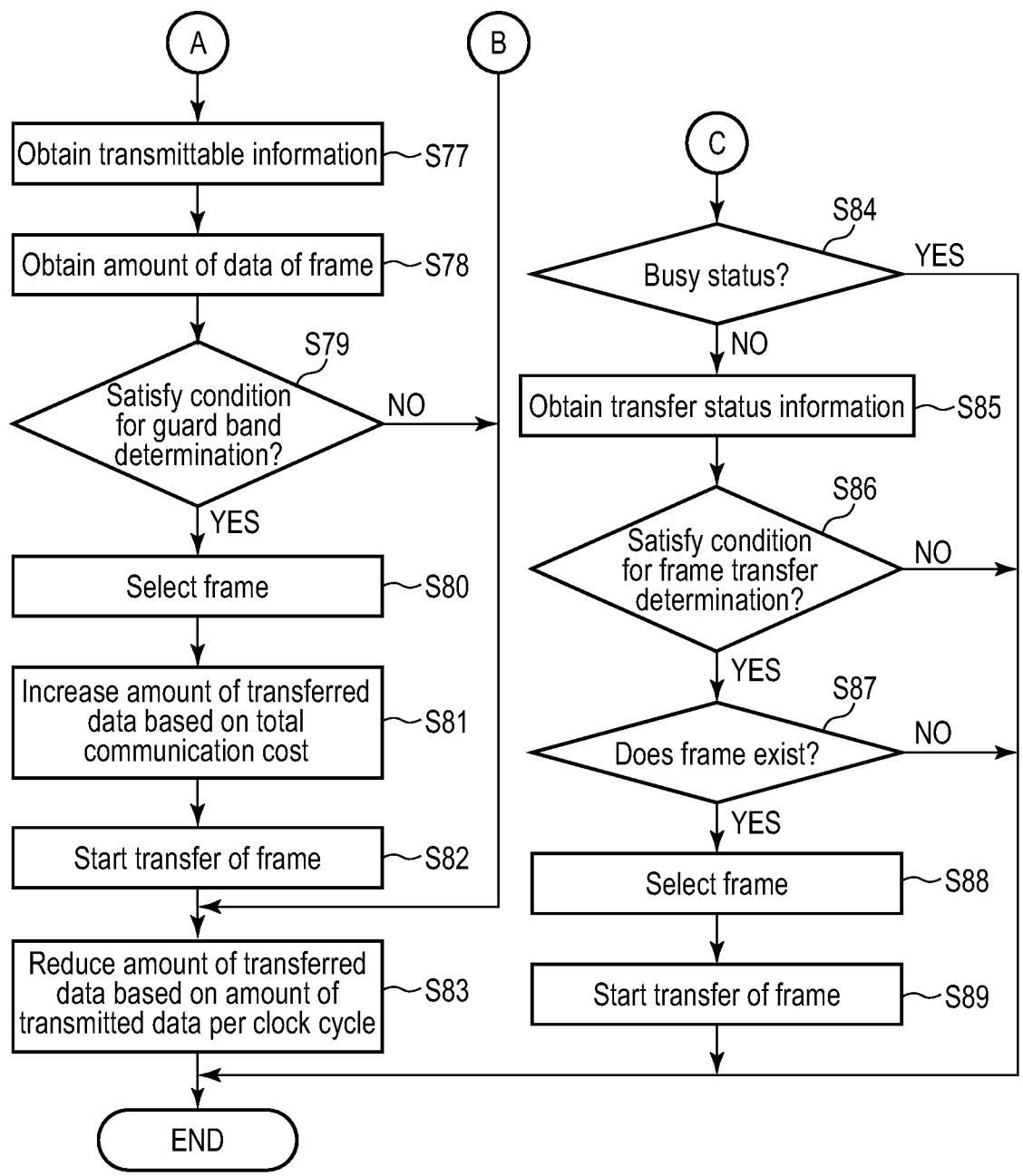
FIG. 26B is a flowchart showing an example of a process flow of the overall frame transmission control.

Flowcharts in FIG. 26A and FIG. 26B show entire process flows of the frame transmission control implemented by a combination of the guard band determination process, frame selection process, the transfer cost information calculation process, and the back pressure process described above.

First, in the frame transmission control, it is determined whether or not the frame transmission control (gate control) based on the transmission control information is valid (step S71). In step S71, when the process shown in FIG. 8 (process of step S5) is executed, it is determined that the frame transmission control based on the transmission control information is valid.

If it is determined that the frame transmission control based on the transmission control information is valid (YES in step S71), a process of steps S72 corresponding to the process of step S41 shown in FIG. 23 is executed.

If it is determined in step S72 that the transmission control unit 409 is not in the busy status (NO in step S72), a process of step S73 corresponding to the process of step S61 shown in FIG. 25 is executed.

If the process of step S73 is executed, it is determined whether or not the condition for the frame transfer determination is satisfied (step S74). The process of step S74 corresponds to the processes of steps S62 and S63 shown in FIG. 25.

If it is determined in step S74 that the transfer status of the current frame satisfies the condition for the frame transfer determination (YES in step S74), processes of steps S75 to S78 corresponding to the processes of steps S31 to S34 shown in FIG. 21 are executed.

Next, it is determined whether or not the condition for the guard band determination is satisfied (step S79). The process of step S79 corresponds to the processes of steps S35 and S36 shown in FIG. 21.

If it is determined in step S79 that the condition for the guard band determination is satisfied (YES in step S79), a process of step S80 corresponding to the process of step S44 shown in FIG. 23 is executed and a process of step S81 corresponding to the process of step S53 shown in FIG. 24 is executed.

When the process of step S81 is executed, transfer of the transfer start frame is started (step S82). When the process of step S82 is executed, the transmission control unit 409 transitions to the busy status.

When the process of step S82 is executed, a process of step S83 corresponding to the process of step S54 shown in FIG. 24 is executed.

The process of step S83 is executed if it is determined in step S72 that the transmission control unit 409 is in the busy status (YES in step S72), if it is determined in step S74 that the condition for the frame transfer determination is not satisfied (NO in step S74), if it is determined in step S75 that there are no transmittable frames in all queues (NO in step S75), if it is determined in step S76 that the transmission control information is not valid (NO in step S76), and if it is determined in step S79 that there is no frame that satisfies the condition for the guard band determination (NO in step S79).

If it is determined in step S71 that the transmission control based on the transmission control information is valid as described above, the frame transmission control (i.e., determination of the frame transfer start timing) based on (the condition for) the guard band determination and (the condition for) the frame transfer determination is executed.

In contrast, in the examples shown in FIG. 26A and FIG. 26B, if it is determined in step S71 that the transmission control based on the transmission control information is not valid (NO in step S71), for example, the frame transmission control based on (the condition for) the frame transfer determination is executed.

More specifically, processes of steps S84 to S87 corresponding to the processes of steps S72 to S75 described above are executed.

In addition, if it is determined in step S87 that the frame in the transmittable status is in the target queue (YES in step S31), processes of steps S88 and S89 corresponding to the processes of steps S80 and S82 described above are executed.

It has been described that the processes of steps S84 to S89 are executed if the frame transmission control based on the transmission control information is not valid but, if the frame transmission control is not valid, the processes of steps S84 to S89 may not be executed and the frame transmission control may be ended.

The (series of processes of the) frame transmission control described with reference to FIG. 26A and FIG. 26B described above is assumed to be completed in one clock cycle, and is suitable to a case where the guard band determination process, frame selection process, transfer cost information calculation process, and back pressure process described above are implemented by hardware implementation.

Figure 27A:
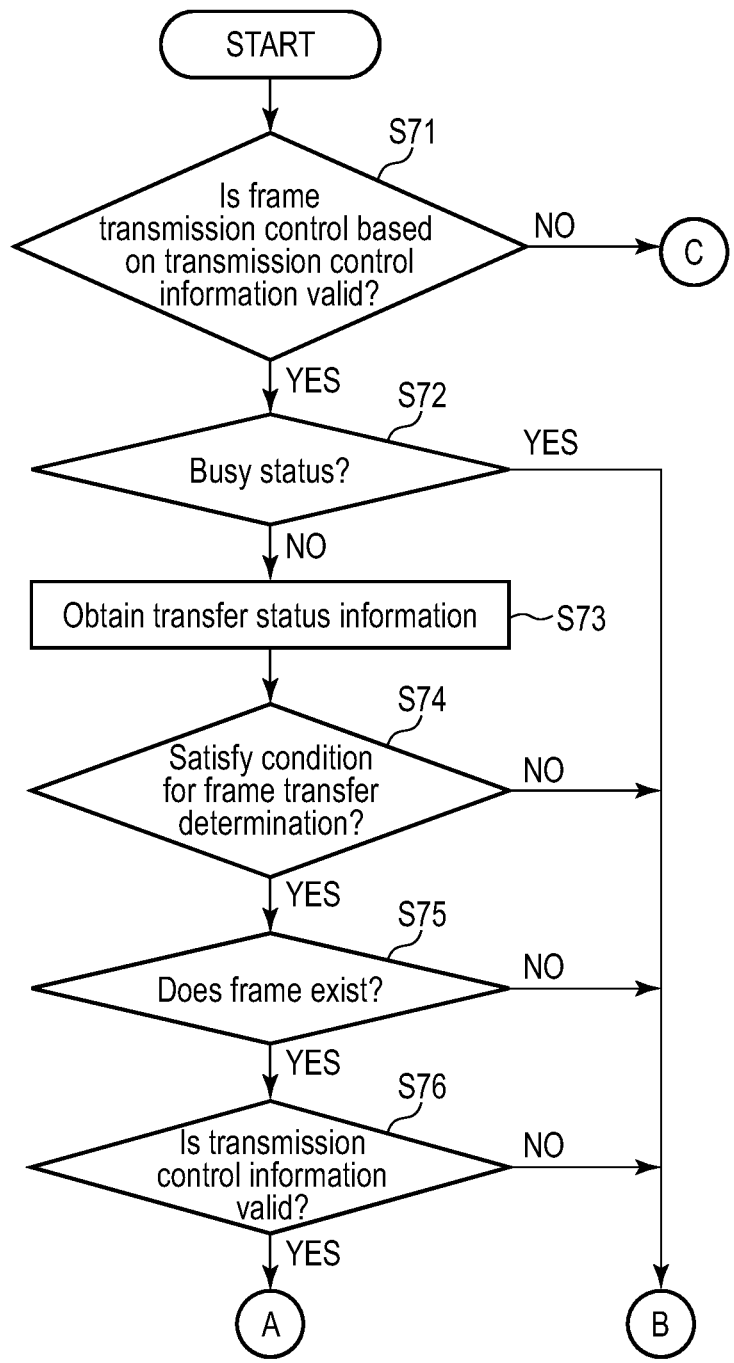
FIG. 27A is a flowchart showing an example of a process flow of the overall frame transmission control.

In contrast, flowcharts shown in FIG. 27A and FIG. 27B show entire process flows of the frame transmission control in a case where the (series of processes of the) frame transmission control is not completed in one clock cycle.

Since the processes of FIG. 27A and FIG. 27B are substantially the same as the processes of FIG. 26A and FIG. 26B, the same portions as those in FIG. 26A and FIG. 26B are denoted by the same reference numerals and their detailed descriptions are omitted here.

The processes of FIG. 27A and FIG. 27B are different from the processes of FIG. 26A and FIG. 26B in that a process of step S90 is added between processes of steps S78 and S79 shown in FIG. 26A and FIG. 26B and that the process of step S83 is omitted. In step S90, a process of reducing the amount of transferred data based on the time actually elapsed from the previous iteration (repetition process) and the amount of data transmitted per clock.

The frame transmission control shown in FIG. 27A and FIG. 27B is suitable to a case where the guard band determination process, the frame selection process, the transfer cost information calculation process, and the back pressure process are implemented by software implementation. When the guard band determination process, the frame selection process, the transfer cost information calculation process, and the back pressure process are implemented by hardware implementation, the frame transmission control shown in shown in FIG. 27A and FIG. 27B may be executed.

By the way, the frame transmission control in the case where the store-and-forward method is employed in the network interface controller 4 (transmitted frame storage unit 403) has been described, but the transmission control of the frame cannot be applied to the cut-through method in which the frame transmission is started before the frame reception is completed.

Thus, the frame transmission control in a case where the cut-through method is employed in the network interface controller 4 (transmitted frame storage unit 403) will be described. In the following descriptions, for convenience, the guard band determination process shown in FIG. 21 described above is referred to as a first guard band determination process, the frame selection process shown in FIG. 23 is referred to as a first frame selection process, and the transfer cost information calculation process shown in FIG. 24 is referred to as a first transfer cost information calculation process, and the guard band determination process, the frame selection process, and the transfer cost information calculation process in a case where the cut-through method is employed are referred to as a second guard band determination process, a second frame selection process, and a second transfer cost information calculation process, respectively.

Figure 28:
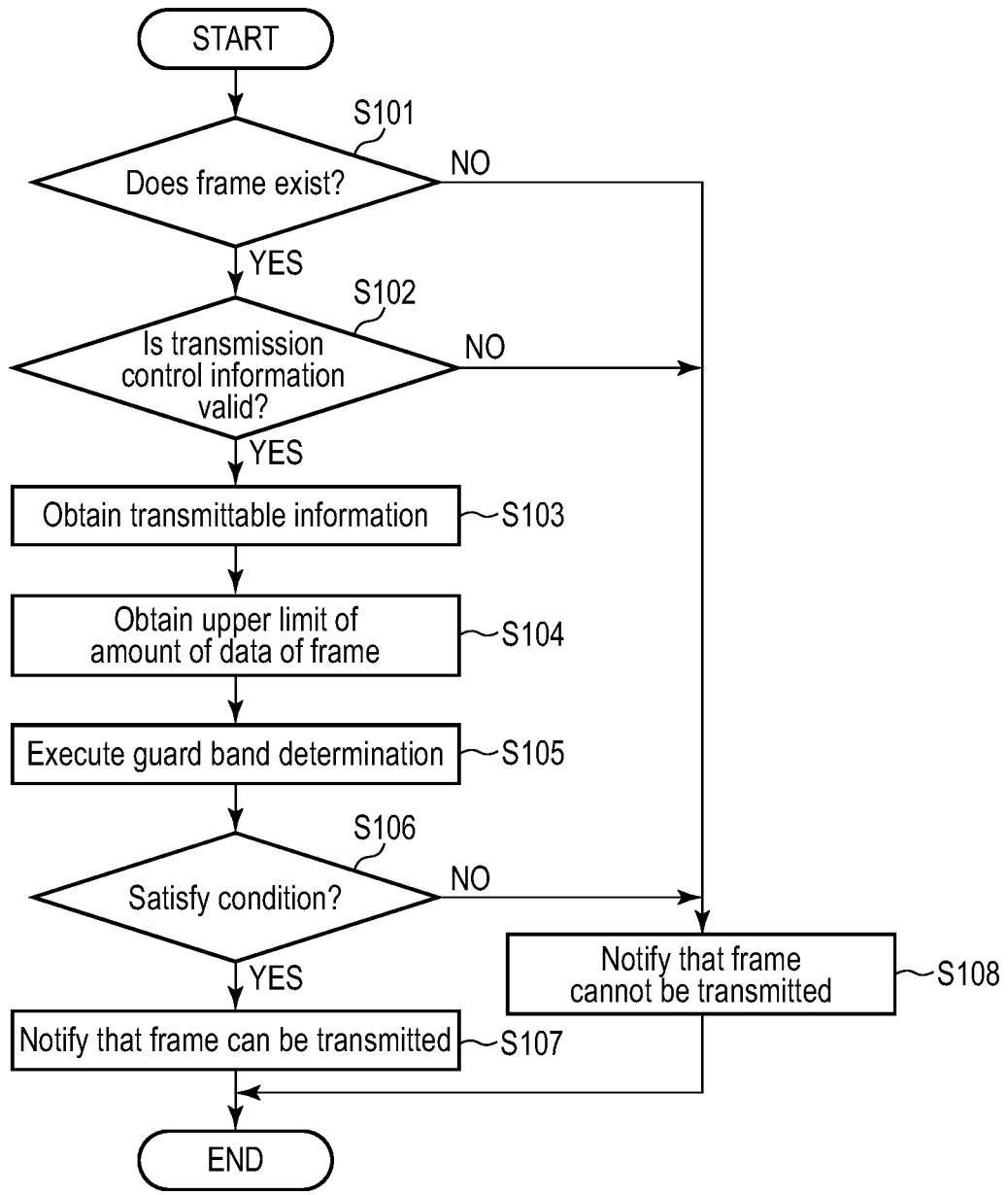
FIG. 28 is a flowchart showing another example of the procedure of the guard band determination process.

First, an example of a procedure of the second guard band determination process will be described with reference to a flowchart of FIG. 28. Portions different from the above-described first guard band determination process will be described here.

The target determination unit 410a determines whether or not a frame in a transmittable status is in the target queue (step S101). When the cut-through method is employed in the network interface controller 4 (transmitted frame storage unit 403) as described above, "the frame in the transmittable status in the target queue" indicates that the frame in which leading data are prepared may be stored in the target queue, and the frame in which all data constituting the frame are arranged does not necessarily need to be stored in the target queue (i.e., the amount of data does not need to be confirmed), unlike the above-described first guard band determination process (i.e., step S31 shown in FIG. 21).

If it is determined that the frame in the transmittable status is in the target queue (YES in step S101), processes of steps S102 and S103 corresponding to the processes of steps S32 and S33 shown in FIG. 21 described above are executed.

The amount of data of the frame (target frame) stored at the leading part of the target queue is obtained in the above-described first guard band determination process, but all data of the target frame are not arranged in the target queue and the amount of data of the target frame cannot be obtained in the second guard band determination process. For this reason, the target determination unit 410a obtains an upper limit of the amount of data (frame length) of the frame stored in the target queue (step S104). In step S104, for example, a value of queueMaxSDU (maximum data unit defined for each queue) of the target queue can be obtained as the upper limit of the amount of data of the frame. Alternatively, a maximum transmission unit (MTU) that is the maximum transmission unit in the communication unit 401 may also be used as the upper limit of the amount of data of the frame.

When the process of step S104 is executed, the target determination unit 410a executes the guard band determination, using the upper limit of the amount of data of the frame obtained in step S104 instead of the amount of data of the target frame in the first guard band determination process (step S105). In other words, in step S105, the guard band determination is executed based on the upper limit of the total communication cost when the target frame is transmitted by the communication unit 401. Detailed description of step S105 will be omitted here since the process is similar to the guard band determination in the first guard band determination process except for using the upper limit of the amount of data of the frame instead of the amount of data of the target frame.

When the process of step S105 is executed, processes of steps S106 to S108 corresponding to the processes of steps S36 to S38 shown in FIG. 21 are executed.

In the above-described second guard band determination process, the guard band determination can be executed appropriately even when the cut-through method is employed, by using the upper limit of the amount of data in the frame.

Next, an example of a procedure of the second frame selection process will be described with reference to a flowchart of FIG. 29. Portions different from the above-described first frame selection process will be mainly described here.

First, processes of steps S111 to S114 corresponding to the processes of steps S41 to S44 shown in FIG. 23 are executed.

When the process of step S114 is executed, the transmission control unit 409 notifies the transmission possibility determination unit 410 of the start of transfer of the transfer start frame (step S115). The transmission possibility determination unit 410 is notified of the start of transfer of the transfer start frame and the total communication cost of the transfer start frame in the first frame selection process but, in the second frame selection process, the transmission possibility determination unit 410 is not notified of the total communication cost since the amount of data of the transfer start frame is not confirmed.

When the process of step S115 is executed, a process of step S116 corresponding to the process of step S46 shown in FIG. 23 is executed.

If it is determined in step S111 that the transmission control unit 409 is in the busy status (YES in step S111), the transmission control unit 409 obtains the amount of data of the frame output from the transmission control unit 409 (i.e., the frame which is being transferred) and notifies the transmission possibility determination unit 410 of the amount of data (hereinafter referred to as an amount of output data) (step S117).

In the above-described second frame selection process, unlike the first frame selection process, when the transmission control unit 409 is in the busy status, the amount of output data can be reflected on the transfer cost information (amount of transferred data or data transfer time) calculated in the transfer cost information calculation process, by notifying the transmission possibility determination unit 410 of the amount of output data.

Next, an example of a procedure of the second transfer cost information calculation process will be described with reference to a flowchart of FIG. 30. Portions different from the above-described first transfer cost information calculation process will be mainly described here.

First, processes of steps S121 and S122 corresponding to the processes of steps S51 and S52 shown in FIG. 24 are executed.

If it is determined in step S122 that the transfer of a new frame is started (YES in step S122), the transmission possibility determination unit 410 increases the amount of transferred data obtained in step S122, based on the communication overhead of the frame whose transfer is newly started (i.e., amount of data and media-dependent overhead added in the communication unit 401 when transmitting the frame) (step S123). In step S123, for example, the process of adding the communication overhead to the amount of transferred data may be executed, but the other process may be executed if the communication overhead can be reflected on the amount of transferred data.

If it is determined that the transfer of a new frame is not started (NO in step S121) or if the process of step S123 is executed, the transmission possibility determination unit 410 determines whether or not notification of the amount of output data from the transmission control unit 409 caused by executing the above second frame selection process is made (step S124).

If it is determined that the notification of the amount of output data from the transmission control unit 409 is made (YES in step S124), the transmission possibility determination unit 410 increases the amount of transferred data after the process of step S123 is executed, based on the amount of output data (step S125). In step S125, for example, the process of adding the amount of output data to the amount of transferred data may be executed, but the other process may be executed if the amount of output data can be reflected on the amount of transferred data.

When the process of step S125 is executed, the transmission possibility determination unit 410 reduces the amount of transferred data after the process of step S125 is executed, based on the amount of data transmitted per clock cycle (step S126).

In contrast, if it is determined that the notification of the amount of output data from the transmission control unit 409 is not made (NO in step S124), the transmission possibility determination unit 410 reduces the amount of transferred data after the process of step S123 is executed, based on the amount of output data (step S126).

Since the process of step S126 corresponds to the process of step S54 shown in FIG. 24, its detailed descriptions are omitted here.

When the process of step S126 is executed, a process of step S127 corresponding to the process of step S55 shown in FIG. 24 is executed.

According to the above-described second transfer cost information calculation process, the amount of transferred data can be calculated by using the communication overhead and the amount of output data even when the cut-through method is employed. It is assumed that the transfer cost information is the amount of transferred data but, when the transfer cost information is the data transfer time, the data transfer time obtained by expressing the communication overhead and the output data in units of the time may be calculated in the second transfer cost information calculation process.

The second guard band determination process, the second frame selection process, and the second transfer cost information calculation process have been described by assuming that the cut-through method is employed but, even when the store-and-forward method or the cut-through method is employed, the back pressure process shown in FIG. 25 can be executed commonly.

In the embodiment, the frame transmission control is implemented by the combination of the first guard band determination process, the first frame selection process, the first transfer cost information calculation process, and the back pressure process when the store-and-forward method is employed, and the frame transmission control is assumed to be implemented by the combination of the second guard band determination process, the second frame selection process, the second transfer cost information calculation process, and the back pressure process when the cut-through method is employed.

In other words, the frame transmission control that is a combination of the first guard band determination process, the first frame selection process, the first transfer cost information calculation process, and the back pressure process is considered suitable to the communication method in which the amount of data (frame length) of the frame is confirmed at the timing of determining the possibility of the frame transmission (i.e., at the timing of determining whether or not the transmission control unit 409 is in the busy status in the first frame selection process). In contrast, the frame transmission control that is a combination of the second guard band determination process, the second frame selection process, the second transfer cost information calculation process, and the back pressure process is considered suitable to the communication method in which the amount of data (frame length) of the frame is not confirmed at the timing of determining the possibility of the frame transmission (i.e., at the timing of determining whether or not the transmission control unit 409 is in the busy status in the second frame selection process).

In the embodiment, the second guard band determination process, the second frame selection process, and the second transfer cost information calculation process have been described as the processes to be executed when the cut-through method is employed, but, the second guard band determination process, the second frame selection process, and the second transfer cost information calculation process may also be executed when the store-and-forward method is employed. More specifically, for example, combined processes of the first guard band determination process, the second frame selection process, the second transfer cost information calculation process, and the back pressure process may be executed as the frame transmission control suitable to the communication method in which the amount of data of the frame (frame length) is confirmed when the possibility of frame transmission is determined.

As described above, the network interface controller 4 (communication control device) according to the embodiment includes the transmission control unit 409 that controls the transfer start timing of the frame (first message) stored in the queue, based on the gate control list (gate control information) in which the open or close status of the gate corresponding to each of a plurality of queues is specified, and the communication unit 401 that transmits the frame transferred from the transmission control unit 409 according to the transfer start timing. In the embodiment, the transfer start timing is determined based on both the transmission cost at the time when the frame (second message), which has been already determined to pass through the gate, is transmitted by the communication unit 401 and the frame transfer status between the transmission control unit 409 and the communication unit 401.

In the embodiment, the transfer start timing and the amount of data of the frame (i.e., transmission timing and amount of transmission of the message) can be exactly controlled by such a configuration.

In the embodiment, "the frame which has been already determined to pass through the gate" is a concept including a frame which has previously passed through the gate (which has been completely passed through the gate) and a frame which is currently passing through the gate. In other words, "the frame which has been already determined to pass through the gate" means the fact that the timing for the frame to pass through the gate is confirmed, i.e., a status that the timing at which the transmission control unit 409 transfers leading data of the frame is confirmed. In addition, the "frame which has previously passed through the gate" is a frame whose transfer is completed by the transmission control unit 409. Furthermore, the "frame which is currently passing through the gate" is a frame which is being transferred when the transmission control unit 409 is in the busy status.

In addition, in the embodiment, the "transmission cost" is a concept including the above total communication cost and an upper limit of the total communication cost, and corresponds to the total communication cost when the store-and-forward method is employed, and corresponds to the upper limit of the total communication cost when the cut-through method is employed.

Furthermore, the "frame transfer status between the transmission control unit 409 and the communication unit 401" corresponds to the transfer status of the frame (data) having passed through the gate, and the "frame having passed through the gate" in the embodiment is a concept including a frame which is being transferred between the transmission control unit 409 and the buffer unit 412, a frame stored in the buffer unit 412, and data which are being transferred between the buffer unit 412 and the communication unit 401. In the embodiment, it has been described that the network interface controller 4 includes the buffer unit 412 but, when the network interface controller 4 does not include the buffer unit 412, the "frame having passed through the gate" is a concept including the data which are being transferred between the transmission control unit 409 and the communication unit 401.

In addition, in the embodiment, it is determined whether the frame stored at the top (in the leading part) of each queue can be transmitted (i.e., the guard band determination is executed), based on the transmission control information (transmittable information) generated from the gate control list, the transmission cost at the time when the frame stored at the top of each queue is transmitted by the communication unit 401, and the transfer cost information that is based on the transmission cost at the time when the frame, which has been already determined to pass through the gate, is transmitted by the communication unit 401. The transmission control information (transmittable information) of each queue indicates the transmittable data amount of the frame until the gate corresponding to each queue is closed or the time (transmittable time) until the gate is closed, at the time when the transmission control unit 409 determines the frame transfer start timing. The frame transfer start timing in the embodiment is determined based on the result of the guard band determination (i.e., result of the determination made by the transmission possibility determination unit 410).

In the embodiment, possibility of the transmission of the subsequent frame can be determined in a form of considering the status of the frame having passed through the gate.

In addition, in the embodiment, for example, the first guard band determination process using the total communication cost may be executed when the store-and-forward method is employed, and the second guard band determination process using the upper limit of the total communication cost may be executed when the cut-through method is employed.

In the embodiment, the "time when the transmission control unit 409 determines the frame transfer start timing" is the time at which the transmission control unit 409 is in the idle status. In addition, the transmission control information in the embodiment is managed by the transmission control information management unit 408, and the amount of data of frame (i.e., the transmittable amount indicated by the transmittable information) that can be transmitted until the gate corresponding to each of the plurality of queues is closed can be received from the transmission control information management unit 408. Furthermore, in the embodiment, the guard band determination is executed based on the transfer cost information (transmittable information), the transmission cost, and the transfer cost information, and the transmission control information, the transmission cost, and the transfer cost information can be defined (expressed) in units of the amount of data (bit, bytes, or the like), and may be defined in, for example, units of time (nanoseconds or the like).

Furthermore, in the embodiment, it is determined whether or not the frame can be transferred (i.e., the frame transfer determination is executed), based on a time-delay that occurs between the transmission control unit 409 and the communication unit 401, the amount of data of the frame waiting for transmission between the transmission control unit 409 and the communication unit 401, and the amount of data transmitted per clock cycle (amount of data that can be transmitted per unit time by the communication unit 401). The frame transfer start timing in the embodiment is determined based on the result of the guard band determination (i.e., result of the determination made by the data transfer status management unit 411).

When the buffer unit 412 is located between the transmission control unit 409 and the communication unit 401 as described in the embodiment, the time-delay that occurs between the transmission control unit 409 and the communication unit 401 includes the time-delay that occurs in the buffer unit 412, and the amount of data of the frame waiting for transmission between the transmission control unit 409 and the communication unit 401 includes the amount of data of the frame stored in the buffer unit 412.

In the embodiment, it is possible to make the back pressure occur appropriately, avoid more frames (data) than needed from being stored in the buffer unit 412, and effectively utilize the given area by this configuration.

In the embodiment, the "amount of data of the frame staying (waiting for transmission)" is a concept including the amount of data of the frame which is being transferred between the transmission control unit 409 and the buffer unit 412 and the frame which is being transferred between the buffer unit 412 and the communication unit 401, and the amount of data of the frame stored in the buffer unit 412 (amount of data buffered).

In addition, in the embodiment, it has been described that the frame transfer start timing is determined based on the result of the guard band determination (first determination result) and the result of the frame transfer determination (second determination result), but the embodiment may be configured to determine the frame transfer timing based on at least one of the result of the guard band determination and the result of the frame transfer determination. More specifically, for example, the embodiment may be configured to determine the frame transfer start timing based on only the result of the guard band determination. Furthermore, in the embodiment, it has been described that the guard band determination is executed using the transfer cost information (the transmission cost at the time when the frame, which has been already determined to pass through the gate, is transmitted by the communication unit 401), but the embodiment may be configured to determine the frame transfer start timing by a combination of the guard band determination that does not use the transfer cost information and the above frame transfer determination.

Furthermore, in the embodiment, the operation according to the gate control list can be executed exactly and the given bandwidth can be effectively used while simplifying the processes of the hardware configuration or software configuration, by the configuration of determining the frame transfer start timing using the transmission control information generated from the gate control list. Furthermore, the real-time performance (completing the process within a determined time) can be formed for the transmission control process (frame transmission control).

In the embodiment, it has been described that the transmission control information is generated by the transmission control information generation unit 204 included in the host processor 2 as shown in FIG. 2 and that the transmission control information is stored in the transmission control information storage unit 407 included in the network interface controller 4, but the transmission control information may be dynamically generated (calculated) on the network interface controller 4 side.

FIG. 31 is a block diagram showing an example of the functional configuration of the communication device 100 (hereinafter referred to as a first modified example of the embodiment) in a case where the transmission control information is generated on the network interface controller 4 side. The same portions as those of FIG. 2 are denoted by the same reference numerals in FIG. 31 and their detailed explanations are omitted.

As shown in FIG. 31, the network interface controller 4 includes a gate control list storage unit 414 and a transmission control information generation unit 415.

In the first modified example of the embodiment, the host processor 2 does not include the transmission control information generation unit 204, and the reception unit 406 provided in the network interface controller 4 accepts the gate control list stored in the gate control list storage unit 201 via the setting unit 205 provided in the host processor 2. The gate control list thus received by the reception unit 406 is stored in the gate control list storage unit 414.

The transmission control information generation unit 415 reads one or more entries from the gate control list storage unit 414, calculates the amount of transmission (for example, the number of frame transmittable bits) indicated by the transmittable information of (the queue corresponding to) each traffic class, and generates the transmission control information including the period information (for example, the number of clock cycles indicating the time interval value) and the transmittable information, based on the global clock and the local clock.

Since the transmission control information management unit 408 switches entries according to (progress of) the global clock and local clock as described above, the transmission control information generation unit 415 desirably operates to calculate in advance the amount of transmission indicated by the transmittable information included in an entry next to the current entry stored in the storage unit 408a in the transmission control information management unit 408 in order to smoothly execute such switching of entries. For example, if the calculation of the amount of transmission executed by the transmission control information generation unit 415 (i.e., generation of transmittable information) cannot be completed in time, the transmission control information management unit 408 may output "invalid" to the transmission possibility determination unit 410. The "invalid" means that the transmission control information (transmittable information) is not updated to the latest status as described above.

It is assumed that the transmission control information generation unit 415 calculate in advance the amount of transmission indicated by the transmittable information included in the first (leading) entry before the gate control becomes effective, and holds the entry. In addition, for the second and subsequent entries, the once-calculated transmittable amount (transmittable information) may be cached, and the cached transmittable amount may be reused for the next and subsequent entries.

Since the frame transmission control itself in the first modified example of the embodiment has been described in the embodiment, its detailed description is omitted here.

Furthermore, in the embodiment, it has been described that the buffer unit 412 is located between the transmission control unit 409 and the communication unit 401, but a configuration (hereinafter referred to as a second modified example of the embodiment) that the buffer unit 412 is provided in the communication unit 401 as shown in FIG. 32 may be employed.

In the configuration according to the second modified example of the embodiment, for example, the amount of data of the frame stored in the buffer unit 412 often cannot be obtained in the frame transmission control and, even in this case, for example, it is possible to recognize the amount of data of the frame which is pushed into the buffer unit 412 as the amount of staying data and execute the above back pressure process based on the amount of data, by monitoring the output port of the transmission control unit 409, or the like.

Figure 33:
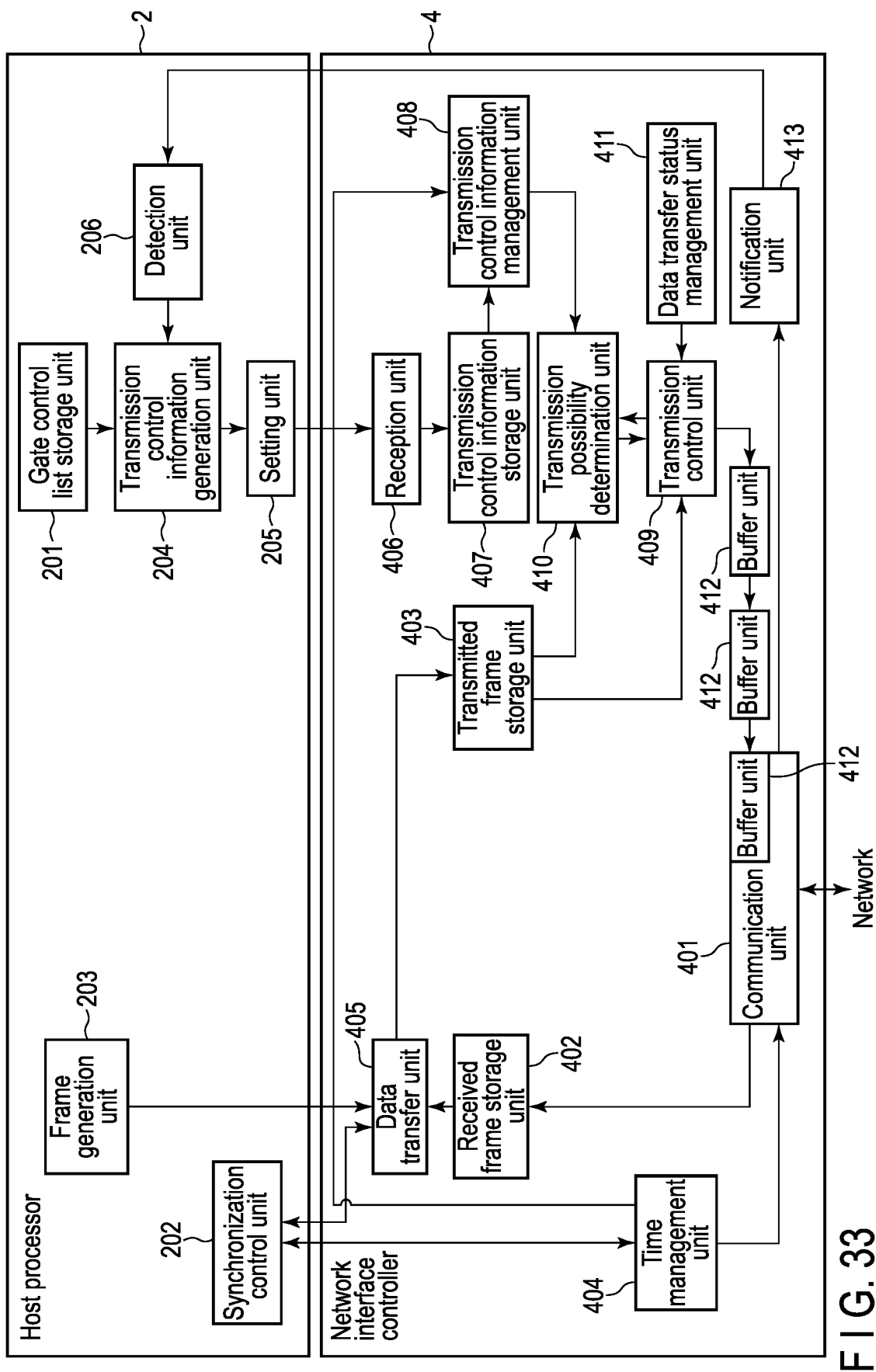
FIG. 33 is a block diagram showing an example of a functional configuration of the communication device according to a third modified example of the embodiment.

Alternatively, as shown in FIG. 33, the network interface controller 4 may include a configuration (hereinafter referred to as a third modified example of the embodiment) of including a plurality of buffer units 412. For example, when including a plurality of buffer units 412, the process of converting the bus width may be executed by the buffer units 412 of the front stage. Furthermore, the process of converting the clock frequency, i.e., the process of switching the clock domain (CDC: Clock Domain Crossing) may be executed by the buffer units 412 of the back stage.

Figure 34:
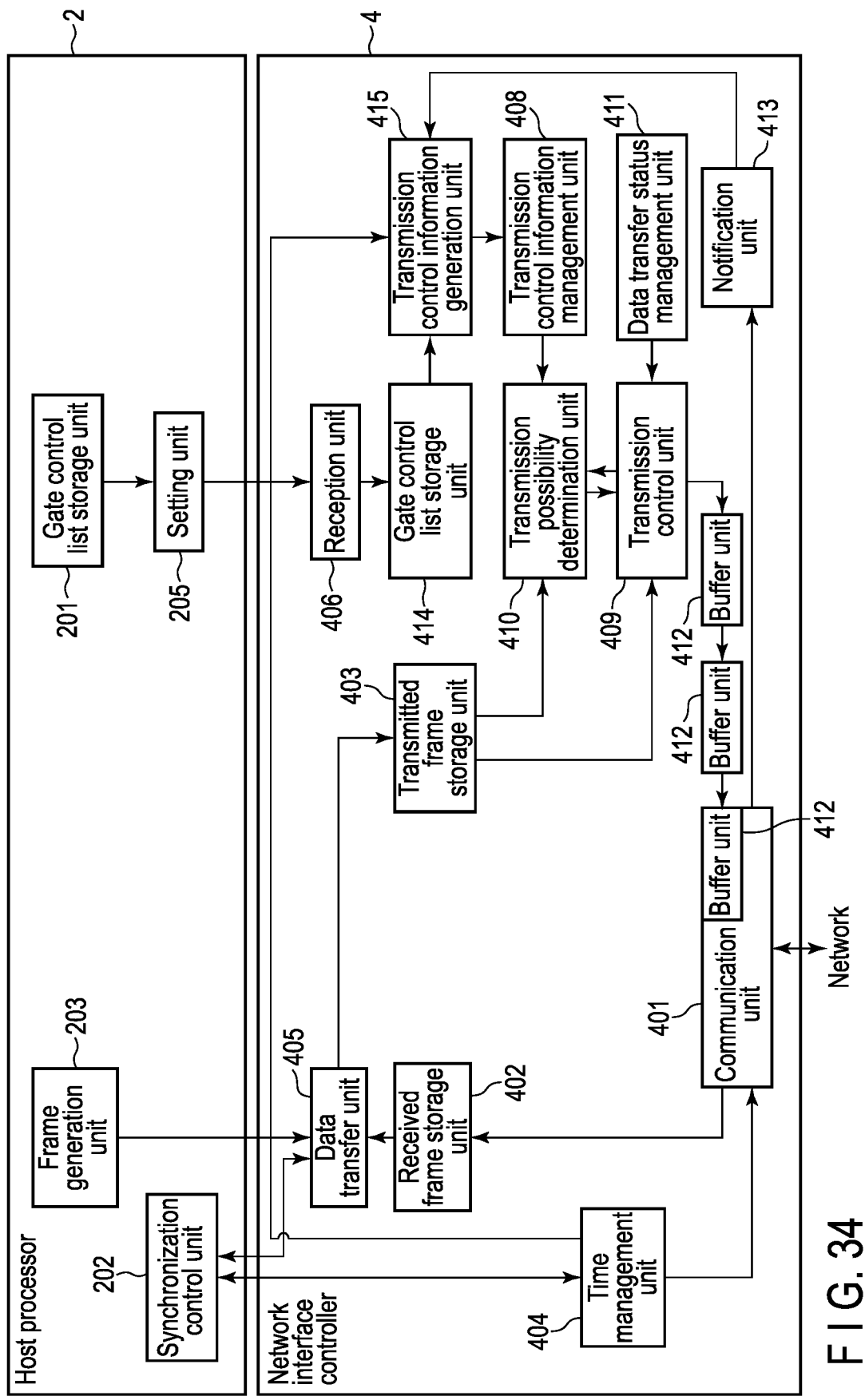
FIG. 34 is a diagram showing a combined configuration of the first and third modified examples of the embodiment.

The first to third modified example of the embodiment have been described, and the first to third modified examples can be combined as appropriate. More specifically, for example, when combing the first and third modified examples, a configuration shown in FIG. 34 can be implemented.

For example, the network interface controller 4 can be configured to execute transmission and reception of undividable frames (high priority frames which requires low-latency transmission) referred to as express frames by express Media Access Control (eMAC) defined under IEEE 802.3br and to execute transmission and reception of dividable frames (low priority frames which does not necessarily require the low-latency transmission) referred to as preemptable frames by preemptable Media Access Control (pMAC).

In this case, the network interface controller 4 may include a configuration (hereinafter referred to as a fourth modified example of the embodiment) of executing transmission control of each of the express frames and the preemptable frames. In the fourth modified example of the embodiment, as shown in FIG. 35, the transmission control unit 409 includes a first transmission control unit 409a and a second transmission control unit 409b, the data transfer status management unit 411 includes a first data transfer status management unit 411a and a second data transfer status management unit 411b, and the buffer unit 412 includes a first buffer unit 412a and a second buffer unit 412b. According to the configuration, the first transmission control unit 409a, the first data transfer status management unit 411a, and the first buffer unit 412a may operate to execute the transmission control of the express frames, and the second transmission control unit 409b, the second data transfer status management unit 411b, and the second buffer unit 412b may operate to execute the transmission control of the preemptable frames.

In this case, for example, the second data transfer status management unit 411b executes the frame transfer determination based on the amount of staying data of the second buffer unit 412b (amount of data of the frames stored in the second buffer unit 412b) in the transmission control of the preemptable frames, and the frame transfer determination may be executed with reference to the amount of staying data of the first buffer unit 412a obtained vi the first data transfer status management unit 411a. According to this, the second data transfer status management unit 411b can execute the frame transfer determination based on the amount of staying data of the first buffer unit 412a and the second buffer unit 412b. The time-delay in the frame transfer determination may be a time-delay of the first buffer unit 412a or a time-delay of the second buffer unit 412b. Furthermore, as for the second data transfer status management unit 411b, if it is determined that the condition for the frame transfer determination is not satisfied (i.e., the frame cannot be transferred) in the first data transfer status management unit 411a, it may be determined that the condition for the frame transfer determination is not satisfied in the frame transfer determination executed by the second data transfer status management unit 411b.

It is assumed that the network interface controller 4 according to the fourth modified example of the embodiment further includes a queue attribute information storage unit 416 storing attribute information indicating the queue (i.e., attribute of the queue) in which the express frames and the preemptable frames are stored, and a communication processing determination unit 417 determining whether the frames stored in each of the plurality of queues are transmitted as the express frames or transmitted as the preemptable frames, and determining the communication process for the frames, as shown in FIG. 35.

Moreover, though omitted in FIG. 35, the network interface controller 4 according to the fourth modified example of the embodiment may be configured to further include a communication processing unit including a first communication processing unit that executes the transmission and reception process of the express frames (undividable frames) and a second communication processing unit that executes the transmission and reception process of the preemptable frames (dividable frames).

Second Embodiment

Next, the second embodiment will be described. In the embodiment, descriptions of the portions like or similar to the above-described first embodiment are omitted and the portions different from those of the first embodiment will be mainly described. In addition, the hardware configuration of the communication device according to this embodiment is the same as that of the above-described first embodiment and will be described as appropriate with reference to FIG. 1.

Figure 36:
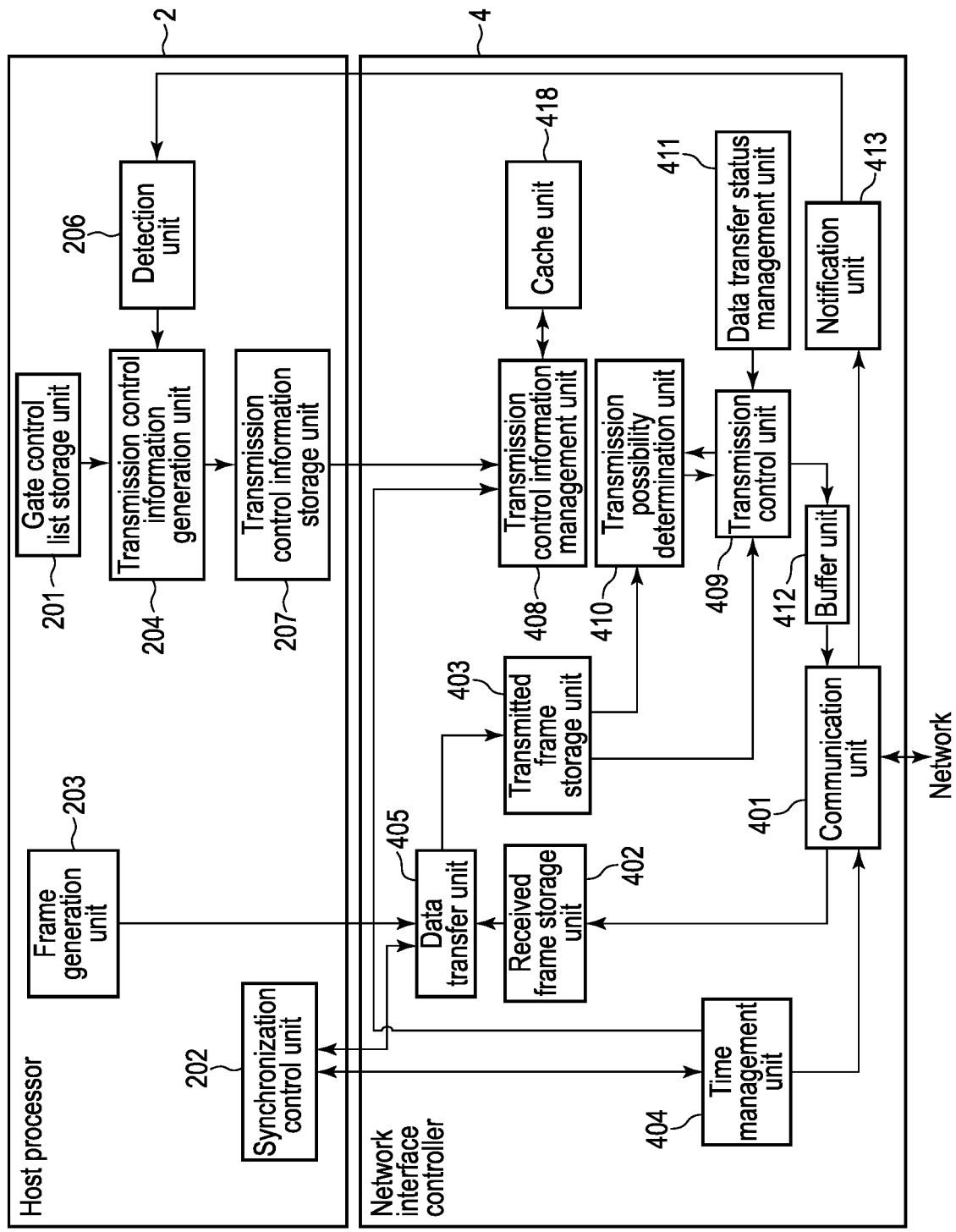
FIG. 36 is a block diagram showing an example of a functional configuration of a communication device according to a second embodiment.

FIG. 36 is a block diagram showing an example of a functional configuration of a communication device 100 according to the embodiment. In FIG. 36, portions like or similar to those shown in FIG. 2 are denoted by the same reference numerals and their detailed explanations are omitted.

As shown in FIG. 36, a host processor 2 of the embodiment is different from the host processor 2 shown in FIG. 2 described above in not including a setting unit 205 but including a transmission control information storage unit 207. In addition, a network interface controller 4 of the embodiment is different from the network interface controller 4 shown in FIG. 2 described above in not including a reception unit 406 or a transmission control information storage unit 407 but including a cache unit 418 (a temporary storage unit).

In the embodiment, the transmission control information storage unit 207 stores the transmission control information generated by a transmission control information generation unit 204.

A transmission control information management unit 408 obtains transmission control information from the transmission control information storage unit 207 not via the setting unit 205 or the reception unit 406 described in the above first embodiment, but directly. For example, the transmission control information management unit 408 obtains the transmission control information from the transmission control information storage unit 207 by DMA.

A cache unit 418 is a storage medium (temporary storage unit) that temporarily stores at least a part of the transmission control information. For example, the cache unit 418 can be constituted by a storage medium that can be accessed faster than the transmission control information storage unit 207. The cache unit 418 may not be provided.

For example, the transmission control information management unit 408 periodically reads the transmission control information from the transmission control information storage unit 207 in advance and stores the transmission control information in the cache unit 418. Thus, the constitution can correspond to a case where the memory of the network interface controller 4 is small and cannot store all (entries included in) the transmission control information.

To prevent the transmission control information required for transmission control from being starved, the cache unit 418 may be configured to have a plurality of storage areas (cache areas). FIG. 37 is a diagram showing a configuration example of a cache area inside the cache unit 418. The transmission control information storage unit 207 may be constituted by, for example, a large-capacity memory such as DRAM, as well as SRAM. In contrast, the cache unit 418 is constituted by a memory such as SRAM, which has a smaller capacity than the transmission control information storage unit 207 but can be read at a high speed with a fixed delay.

As shown in FIG. 37, the cache unit 418 includes a fixed (static) cache area (fixed storage unit) and a variable (dynamic) cache area (variable storage unit).

In the fixed cache area, predetermined transmission control information among the transmission control information stored in the transmission control information storage 207 is stored. The predefined transmission control information is, for example, a fixed number of elements of transmission control information from the leading part. In the variable cache area, a fixed number of elements of transmission control information other than the transmission control information stored in the fixed cache area, which varies in accordance with the transmission control is stored.

In the example shown in FIG. 37, the cache unit 418 stores m entries in the fixed cache area and n entries in the variable cache area. A leading area (entries 0 to m−1) of the transmission control information storage unit 207 is written to the fixed cache area, and several areas (entries k to k+n−1) of the other areas are written to the variable cache area. k is the offset from the leading part of the transmission control information. An area where reading of the transmission control information management unit 408 has been completed, of the variable cache area, is overwritten and reused.

The number of entries m of the fixed cache area and the number of entries n of the variable cache area may be specified at any value, and may be determined by, for example, the capacity of the SRAM to be used or the like. The ratio of the fixed cache area to the variable cache area can be varied by m and n. For example, the ratio may be set to 1:1 as m=n or set to 1:2 as 2m=n.

A flowchart of FIG. 38 shows an example of a procedure of an initialization process of the cache unit 418. The initialization processing is executed, for example, by user settings or via a network when the gate control list is updated.

The transmission control information management unit 408 writes the transmission control information to the fixed cache area from the leading part (step S131). When finishing writing all information to the fixed cache area, the transmission control information management unit 408 starts writing subsequent information to the variable cache area (step S132). More specifically, if m entries are cached in the fixed cache area, m+1-th entry and subsequent entries are written to the variable cache area.

If the number of entries that can be cached in the variable cache area is n, the initialization processing is completed when writing the n entries to the variable cache area is finished. The transmission control information management unit 408 manages the position where the writing has been completed.

After that, the transmission control information management unit 408 reads the transmission control information stored in the fixed cache area or variable cache area and uses the transmission control information for the transmission control. When reading the transmission control information stored in the variable cache area is completed, the transmission control information management unit 408 updates the transmission control information stored in the variable cache area.

The transmission control information management unit 408 updates, for example, the information from the entry following the last write position in the variable cache area to the entry before the read position from which the transmission control information management unit 408 reads the entry.

A specific example of the process of updating the transmission control information will be described with reference to FIG. 39 to FIG. 46. For simplicity of description, the number of entries n in the variable cache area is set to 10. In addition, as shown in FIG. 39, the number of elements of the transmission control information stored in the transmission control information storage unit 207 is set to m+20 (from the 0-th to the m+19-th). The entries included in the transmission control information are stored in the fixed cache area and the variable cache area, but the transmission control information is stored in the fixed cache area and the variable cache area, for convenience, in the following descriptions.

FIG. 43 is a diagram showing the status of the cache unit 418 after the initialization process shown in FIG. 38. In this status, 0 to m−1-th elements of the transmission control information of the transmission control information storage unit 207 are stored in entries 0 to m−1 of the fixed cache area, and m to m+9-th elements of the transmission control information storage unit 207 are stored in entries m to m+9 of the variable cache area. At this time, the last write position is m+9. Since the variable cache area operates as a circular buffer, a position following m+9 is m. When the transmission control is validated, the transmission control information management unit 408 reads the transmission control information of entry 0 corresponding to the current read position 0 and executes read transmission control.

Figure 41:
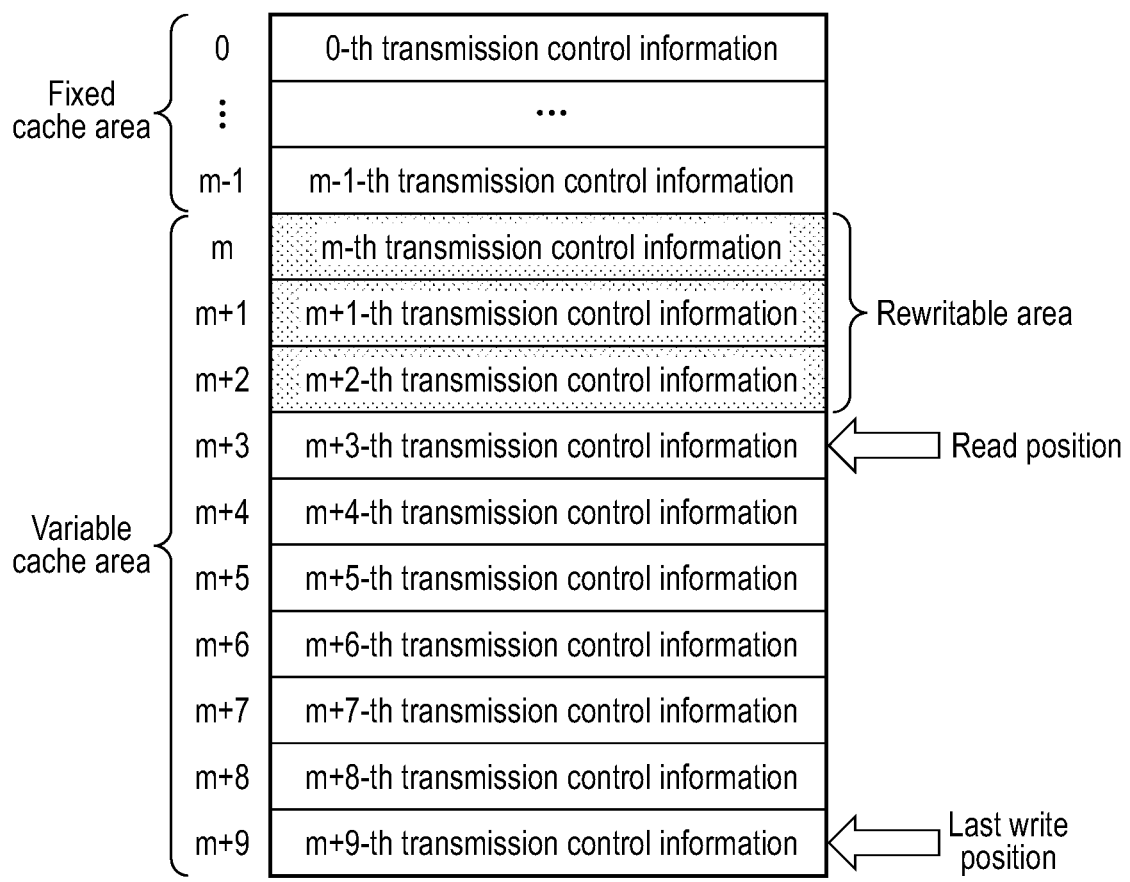
FIG. 41 is a diagram specifically illustrating an updating process of the transmission control information.

FIG. 41 is a diagram showing a status in which time has elapsed and the read position of the transmission control information management unit 408 is m+3. In this status, the transmission control information of entries m to m+2, which corresponds to information from the entry following the last write position to the entry before the read position, will not be retrieved immediately in future. This is because the transmission control information is read and used in order from the leading part as the time elapses. Therefore, the transmission control information management unit 408 updates these entries.

FIG. 42 is a diagram showing a status of these entries that have been updated. The transmission control information management unit 408 reads the number of elements of transmission control information corresponding to the rewritable area of the variable cache area, from the position of the last written transmission control information in the transmission control information storage unit 207, and writes the transmission control information to the variable cache area. In the example shown in FIG. 42, the transmission control information management unit 408 writes m+10-th to m+12-th transmission control information to entries m to m+2.

FIG. 43 is a diagram showing a status of entries m+3 to m+8 that have been updated similarly after the time has elapsed. In other words, when the time elapses and the read position reaches m+9, entries m+3 to m+8 are updated. As described above, since the variable cache area is a circulating buffer (ring buffer), an entry following m+9 is m.

When the read position is circulated to m, the transmission control information management unit 408 updates entry m+9 corresponding to a position following the last write position. FIG. 44 shows a status of entry m+9 that has been updated.

Thus, the transmission control information to be next retrieved can be stored while updated, in the variable cache area.

The transmission control (gate control) is operated by the clock (local clock) that controls the operation of the transmission control information management unit 408 and the clock (global clock) of the time management unit 404. In the embodiment, even when the operation of returning the gate control list to the leading entry is executed by a signal (CycleStart signal) generated based on the time of the time management unit 404 referred to as CycleStart, the transmission control information is not starved (underrun) and the transmission control can be executed by storing a certain number of elements of the transmission control information from the leading part in the fixed cache area.

FIG. 45 is a diagram showing the read position returning from the status shown in FIG. 44 to the leading position by the CycleStart signal. As shown in FIG. 45, the read position returns to 0, which is the leading position of the fixed cache area, and the last write position moves to m−1. After this, the transmission control information management unit 408 writes the transmission control information to the variable cache area in the same manner as the initialization process.

Figure 46:
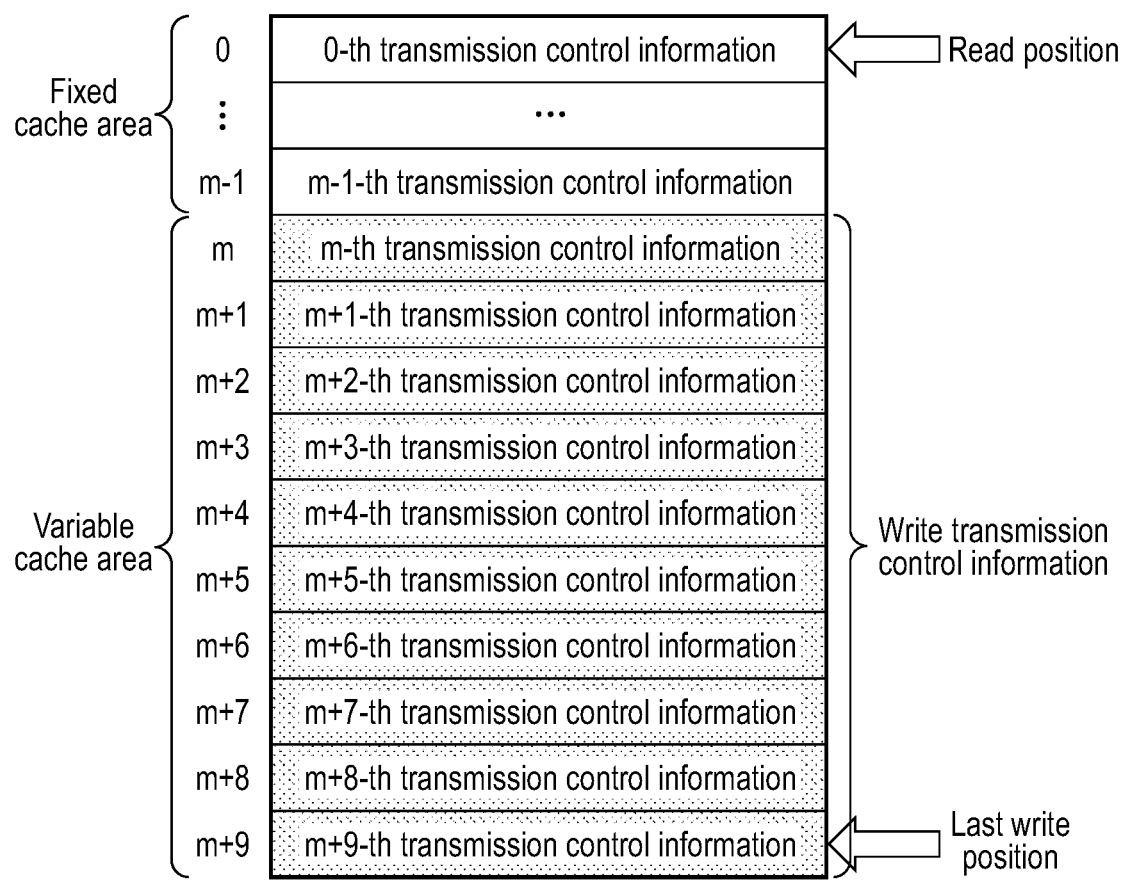
FIG. 46 is a diagram specifically illustrating an updating process of the transmission control information.

FIG. 46 is a diagram showing a status in which writing the transmission control information to the variable cache area has been executed. After this, even when the read position is moved to the variable cache area, the transmission control information can be kept in a status of being stored in the cache unit 418 by the process.

Figure 47:
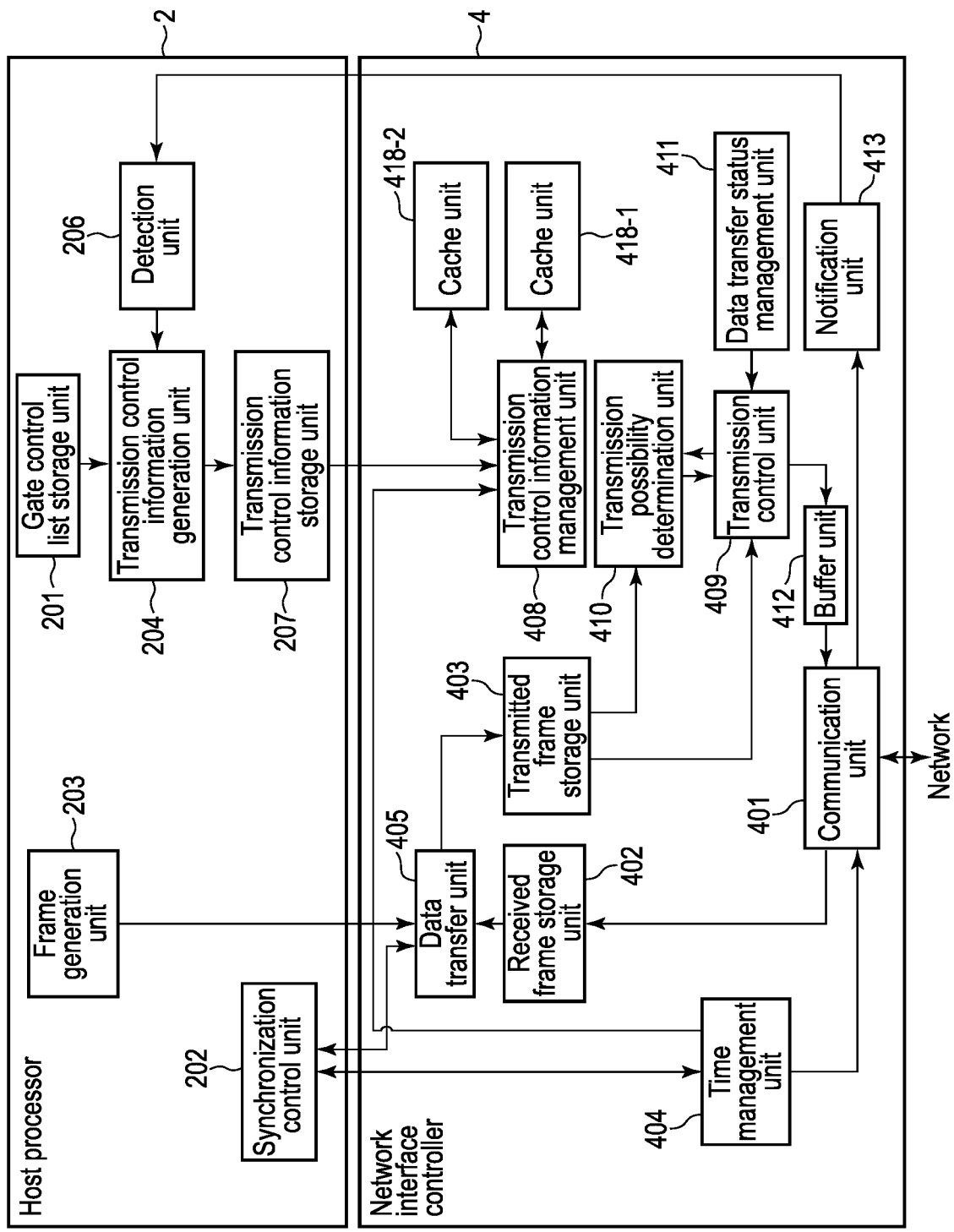
FIG. 47 is a diagram showing another example of a functional configuration of the communication device according to the embodiment.

FIG. 36 and FIG. 37 show the configuration of including one cache unit 418, but a plurality of cache units may be provided. FIG. 47 is a block diagram showing an example of a functional configuration of the communication device 100 (host processor 2 and network interface controller 4) configured to include two cache units 418-1 and 418-2.

In transmission control (gate control), when the gate control list is switched, it is specified at the same time when the gate control list becomes valid. When switching the gate control list to a new gate control list, the transmission control information management unit 408 desirably executes the transmission control using the old gate control list immediately before switching, and executes the transmission control using the new gate control list immediately after switching.

If the two cache units 418-1 and 418-2 are configured to store the transmission control information generated from the gate control list before and after the switching, respectively, and the cache units to be used are switched, the transmission control information can be switched more accurately at the specified time. The transmission control information management unit 408 stores the new transmission control information in the cache unit which is not currently used, of the cache units 418-1 and 418-2, in advance, before switching, and switches the cache unit to be read at the timing of switching (specified time). Thus, the transmission control using the old transmission control information can be executed immediately before switching and can be immediately switched to the transmission control using the new transmission control information.

In this embodiment, it has been described that the transmission control information storage unit 207 is implemented in the memory in the host processor 2, but the transmission control information storage unit 207 may be implemented in the memory (DRAM) in the network interface controller 4. In addition, it has been described that the transmission control information management unit 408 reads the transmission control information from the transmission control information storage unit 207 and urges the cache unit 418 to store the transmission control information, but a method of storing in the cache unit 418 is not limited to this. 409. For example, the transmission control information management unit 408 or the other control unit may instruct a DMA controller to read the transmission control information from the transmission control information storage unit 207 and to store the transmission control information in the cache unit 418.

In this embodiment, it has been described that the cache unit 418 is located outside the transmission control information management unit 408, but the registers (fixed and variable registers) in the transmission control information management unit 408 can also be used as the cache units.

In addition, the cache units 418, 418-1, and 418-2 described in the embodiment may be configured not to include the variable cache area, but the only fixed cache area. In addition, the number of entries of the fixed cache area may be set to 1.

In addition, since the frame transmission control in the embodiment is the same as that of the above first embodiment, its detailed description is omitted here.

In the embodiment, the same advantages as those in the first embodiment described above can be achieved in the configuration where the network interface controller 4 includes the cache units as described above.

Third Embodiment

Next, a third embodiment will be described. In the embodiment, descriptions of the portions like or similar to the above-described first embodiment are omitted and the portions different from those of the first embodiment will be mainly described. In addition, the hardware configuration of the communication device according to this embodiment is the same as that of the above-described first embodiment and will be described as appropriate with reference to FIG. 1.

Figure 48:
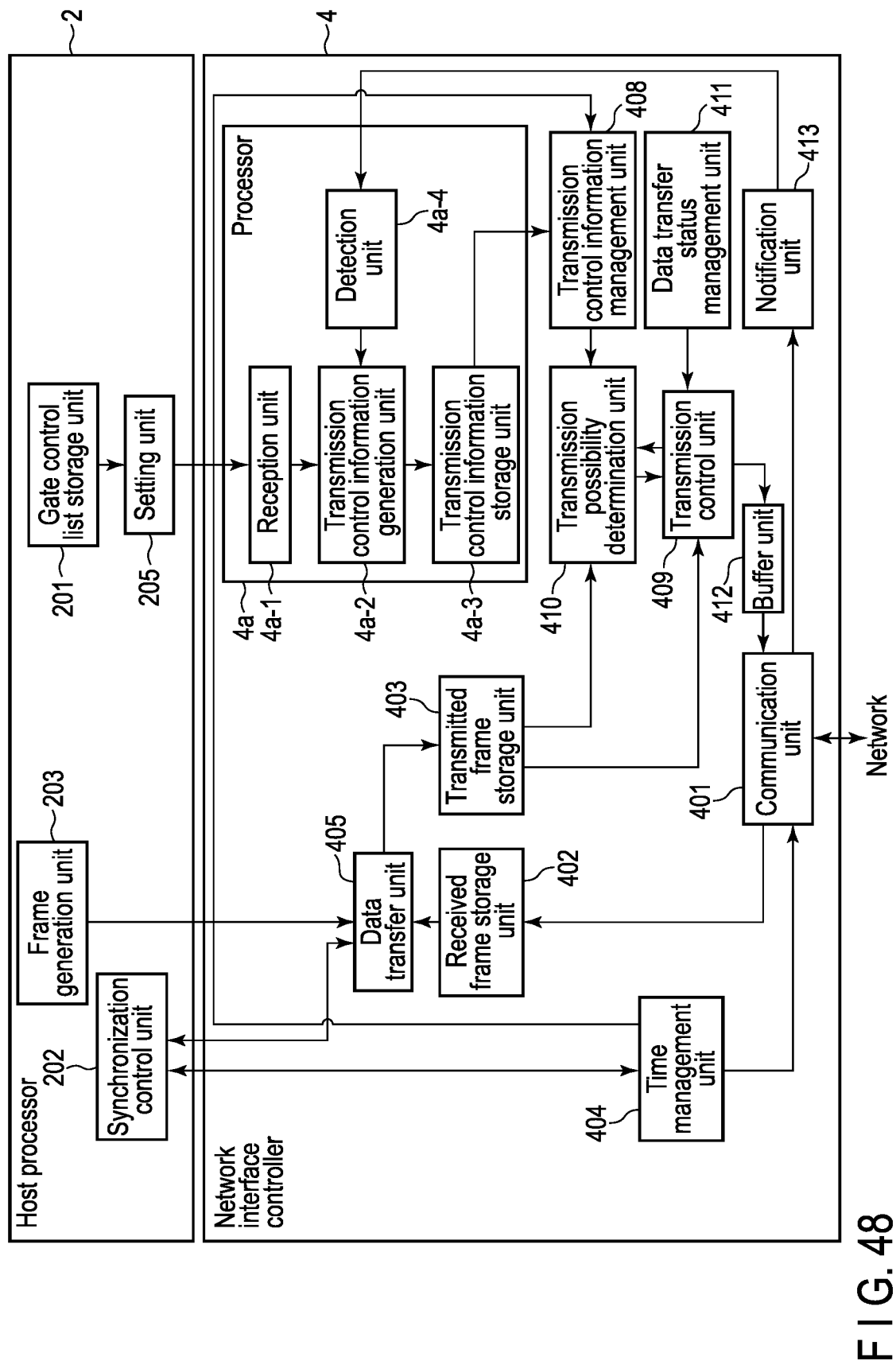
FIG. 48 is a diagram showing an example of a functional configuration of a communication device according to a third embodiment.

FIG. 48 is a block diagram showing an example of a functional configuration of a communication device 100 according to the embodiment. In FIG. 48, portions like or similar to those shown in FIG. 2 are denoted by the same reference numerals and their detailed explanations are omitted.

As shown in FIG. 48, a host processor 2 of the embodiment is different from the host processor 2 shown in FIG. 2 described above in not including a transmission control information generation unit 204 or a detection unit 206. In addition, a network interface controller 4 of the embodiment is different from the network interface controller 4 shown in FIG. 2 described above in including a processor 4a.

In the embodiment, the setting unit 205 transmits the gate control list stored in the gate control list storage unit 201 to the network interface controller 4.

The processor 4a includes a reception unit 4a-1, a transmission control information generation unit 4a-2, a transmission control information storage unit 4a-3, and a detection unit 4a-4.

The reception unit 4a-1 receives an input of the gate control list transmitted by the setting unit 205 of the host processor 2. The reception unit 4a-1 may also receive the gate control list from a device other than the host processor 2, for example, via a network 200.

The transmission control information generation unit 4a-2 generates transmission control information from the gate control list received by the reception unit 4a-1.

The transmission control information storage unit 4a-3 stores the transmission control information generated by the transmission control information generation unit 4a-2.

The detection unit 4a-4 detects change in a link speed and operating speed information via an internal bus of the network interface controller 4. When detecting the change in the link speed or the operating speed information, the detection unit 4a-4 instructs the transmission control information generation unit 4a-2 to regenerate the transmission control information.

In addition, since the frame transmission control in the embodiment is the same as that of the above first embodiment, its detailed description is omitted here.

In the embodiment, the same advantages as those of the above-described first embodiment can be achieved by the configuration where the network interface controller 4 includes a processor as described above.

Fourth Embodiment

In each of the above embodiments, the configuration including one network interface controller and one port has been described, but each of the embodiments may be configured to include a plurality of network interface controllers and a plurality of ports corresponding to the respective network interface controllers. In this case, transmission control information is set (generated) for each port.

In addition, in each of the above embodiments, it has been described that the frame generation unit 203 is implemented by the host processor 2, but the frame generation unit 203 may be implemented by hardware such as FPGA or ASIC. In such a case, a DMA function of a data transfer unit 405 may be omitted such that data (frames) can be directly exchanged through a stream interface.

According to at least one of the above-described embodiments, a communication control device, a communication control method, and a program capable of exactly controlling the transmission timing and the amount of transmission of messages (frames) can be provided.

In the embodiment, the operation according to the gate control list can be executed precisely and the given bandwidth can be effectively used while simplifying the hardware configuration or software processing, in the above-described configuration. In addition, the real-time performance (completing the process within a determined time) can be formed for the transmission control process.

In the description of the operations of each of the above embodiments, the example of executing the processing in every operating clock cycle, i.e., executing the processing in every cycle has been mainly described, but this does not preclude executing the processing in every predetermined number of clock cycles. For example, the processing may be executed in every five clock cycles. In this case, in the process of subtracting a predetermined amount of the transmission control information (the transmittable amount indicated by the transmittable information), the subtraction may be executed in accordance with the number of clock cycles in which the processing is executed. In addition, for the calculation of the transfer cost information, a data output amount measurement unit (not shown) for recognizing an amount of data output (transferred) between clock cycles for processing may be provided to calculate the transfer cost information based on the amount of data obtained from the data output amount measurement unit.

Furthermore, in each of the above embodiments, it has been described that the subtracted value of the transmittable amount indicated by the link speed and the transmittable information used to generate the transmission control information, and the subtracted value of the transfer cost information, are determined based on the data transfer rate (i.e., the amount of data transmitted per clock cycle) of MAC (communication unit 401), but the embodiment may be applied to a case where communication is executed inside a predetermined device. In this case, the data transfer rate between components executing communication in a predetermined device may be used as the criterion. In other words, when internal data transfer is executed, the data transfer rate between components that communicate in a predetermined device may be used as the criterion. Although not shown in the figure, 256 bits or 64 bits may be used as the standard for the data transfer rate when it is assumed that, for example, a bus width of the transmission control unit 409 is 256 bits and a bus width of the component is 64 bits. In either case, it is important that the process of generating the transmission control information, the process of subtracting the transmittable amount, and the process of calculating the transfer cost information are consistent (i.e., based on a common data transfer rate).

In addition, in each of the above embodiments, the example in which the amount of data is calculated until the gate is closed next time in each traffic class when generating the transmission control information, has been described, but the amount of transmittable data before the point (calculation target end point) of calculating the time (hereinafter referred to as a maximum frame transmittable time) to transmit a sum of queueMaxSDU defined in each traffic class, the frame checksum sequence, and the media-dependent overhead from the current link speed, and adding the maximum frame transmittable time from the leading part of the next entry (end of the current entry), may be calculated. In this case, in each traffic class, if a gate close exists between the leading part of the current entry and the calculation target end point, the amount of transmittable data before the gate close is calculated as the transmittable amount. If the gate close does not exist, the amount of data that can be transmitted before the calculation target end point is set as the transmittable amount. The maximum frame transmittable time may be calculated using the value of MTU instead of queueMaxSDU. Alternatively, for example, the transmittable amount may be calculated by using the end of the current entry as the calculation target end point. Alternatively, the transmittable amount may be calculated by using the amount between the current entry and an end of an n-th preceding entry as the calculation target end point.

In each of the above embodiments, it has been described that the communication unit 401 is connected to an external network, but this may be an internal communication unit (i.e., an internal module) that makes internal connections. In this case, the communication unit 401 may not include a function such as MAC or PHY, but may simply make bus connection inside the configuration.

(Example of System Configuration)

FIG. 49 is a diagram showing a configuration example of a system using the communication device 100 according to each of the above-described embodiments. FIG. 49 shows an example of controlling robot arms 602a and 602b and a belt conveyor 601 at a site from an edge server 700 via a 5th Generation (5G)/local 5G (private 5G) system 500 in a factory or plant.

The 5G/local 5G system 500 includes a 5G core network 505, a central unit 504, a distributed unit 503, a remote unit 502, and user equipment 501. The 5G/local 5G system 500 executes 5G communication defined under 3rd Generation Partnership Project (3GPP) standards.

The communication device 100 in each embodiment can be mounted on, for example, an edge server 700 or a 5G core network 505. The real-time performance of the communication between the edge server 700 and the 5G core network 505 can be thereby improved.

In addition, the communication device 100 in each embodiment may be used for communication between the units in the 5G/local 5G system 500. In other words, to execute communication between the remote unit 502, the distributed unit 503, the central unit 504, and the 5G core network 505, the communication device 100 in each embodiment may be mounted on at least some of the remote unit 502, the distributed unit 503, the central unit 504, and the 5G core network 505.

The communication device 100 in each embodiment may be used for communication between at least one of the conveyor belt 601 and robot arms 602a and 602b, and the user equipment 501 or communication between the conveyor belt 601 and the robot arms 602a and 602b.

The system to which the communication device 100 in each embodiment can be applied is not limited to this, but can be any system. For example, the system can also be applied to industrial network systems in factories or plants that do not use 5G/local 5G, network systems inside vehicles and aircraft, and the like.

A program to be run by the communication device 100 (information processing device and communication control device) in each embodiment is stored in the storage 3, ROM (not shown), and the like, in advance and is provided. When the communication device 100 is implemented in FPGA, for example, the data for setting the FPGA configuration (configuration data) correspond to the programs.

The program to be run by the communication device 100 in each embodiment may be configured to be recorded on a computer-readable storage medium such as Compact Disk Read Only Memory (CD-ROM), Flexible Disk (FD), Compact Disk Recordable (CD-R), and Digital Versatile Disk (DVD) as files of an installable or executable format and to be provided as a computer program product.

Furthermore, the program to be run by the communication device 100 in each embodiment may be configured to be stored on a computer connected to a network such as the Internet, and to be provided by being downloaded via the network. Alternatively, the program to be run by the communication device 100 of the embodiments may be configured to be provided or distributed via a network such as the Internet.

The program to be run by the communication device 100 in each embodiment can cause the computer to function as each unit of the communication device 100. The computer can be executed by a CPU reading the program from a computer readable storage medium to a main memory unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described above may include clauses below.

A non-transitory computer-readable storage medium having stored thereon a program which is executed by a computer of a communication control device, the program comprising instructions capable of causing the computer to execute functions of:

causing a transmission control unit to control transfer start timing of a first message stored in a queue, based on gate control information in which open or close status of a gate corresponding to each of a plurality of queues is specified; and causing a communication unit to transmit the first message transferred from the transmission control unit in accordance with the transfer start timing, wherein the transfer start timing of the first message is determined based on a transmission cost at a time when a second message, which has been already determined to pass through the gate, is transmitted by the communication unit, and a transfer status of the second message between the transmission control unit and the communication unit.

A non-transitory computer-readable storage medium having stored thereon a program which is executed by a computer of a communication control device, the program comprising instructions capable of causing the computer to execute functions of:

causing a transmission control unit to control transfer start timing of a first message stored in a queue, based on gate control information in which open or close status of a gate corresponding to each of a plurality of queues is specified;

causing a communication unit to transmit the first message transferred from the transmission control unit in accordance with the transfer start timing;

causing a transmission possibility determination unit to determine whether the first message stored at the top of each queue is able to be transmitted, based on transmission control information generated from the gate control information, and a transmission cost at a time when the first message stored at the top of each queue is transmitted by the communication unit; and causing a data transfer status management unit to determine whether the first message is able to be transferred, based on a time-delay that occurs between the transmission control unit and the communication unit, an amount of data of a second message waiting for transmission between the transmission control unit and the communication unit, and an amount of data which the communication unit is able to transmit per unit time, wherein the transmission control information of each queue indicates the transmittable data amount of the first message or the transmittable time of the first message, at a time when the transmission control unit determines the transfer start timing of the first message, and the transfer start timing of the first message is determined based on a result of the determination of the transmission possibility determination unit and a result of the determination of the data transfer status management unit.

A non-transitory computer-readable storage medium having stored thereon a program which is executed by a computer of an information processing device, the program comprising instructions capable of causing the computer to execute functions of:

generating transmission control information, based on gate control information in which open or close status of a gate corresponding to each of a plurality of queues is specified, wherein the transmission control information of each queue indicates the transmittable data amount of the first message or the transmittable time of the first message, at a time of determining transfer start timing of the first message.

What is claimed is:

1. A communication control device comprising:
a transmission control unit configured to control transfer start timing of a first message stored in a queue, based on gate control information in which open or close status of a gate corresponding to each of a plurality of queues is specified;
a communication unit configured to transmit the first message transferred from the transmission control unit in accordance with the transfer start timing, wherein
the transfer start timing of the first message is determined based on a transmission cost at a time when a second message, which has been already determined to pass through the gate, is transmitted by the communication unit, and a transfer status of the second message between the transmission control unit and the communication unit; and
a transmission possibility determination unit configured to determine whether the first message is able to be transmitted, based on transmission control information generated from the gate control information, a transmission cost at a time when the first message stored at a top of each queue is transmitted by the communication unit, and transfer cost information that is based on the transmission cost at a time when the second message, which has been already determined to pass through the gate, is transmitted by the communication unit, wherein
the transmission control information of each queue indicates a transmittable data amount of the first message or a transmittable time of the first message, at a time when the transmission control unit determines the transfer start timing of the first message, and the transfer start timing of the first message is determined based on a result of the determination of the transmission possibility determination unit.

2. The communication control device of claim 1, wherein the second message, which has been already determined to pass through the gate, comprises a message which has been completely passed through the gate or a message which is being currently passed through the gate.

3. The communication control device of claim 2, wherein when the second message is the message which has been completely passed through the gate, the transmission possibility determination unit is configured to calculate the transfer cost information based on the transmission cost at the time when the second message is transmitted by the communication unit, and an amount of data which the communication unit is able to transmit per unit time.

4. The communication control device of claim 2, wherein when the second message is the message which is being currently passed through the gate, the transmission possibility determination unit is configured to calculate the transfer cost information based on communication overhead of the second message, an amount of data of the second message that have actually passed through the gate, and an amount of data which the communication unit is able to transmit per unit time.

5. A communication control device comprising:
a transmission control unit configured to control transfer start timing of a first message stored in a queue, based on gate control information in which open or close status of a gate corresponding to each of a plurality of queues is specified;
a communication unit configured to transmit the first message transferred from the transmission control unit in accordance with the transfer start timing, wherein
the transfer start timing of the first message is determined based on a transmission cost at a time when a second message, which has been already determined to pass through the gate, is transmitted by the communication unit, and a transfer status of the second message between the transmission control unit and the communication unit; and
a data transfer status management unit configured to determine whether the first message is able to be transferred, based on a time-delay that occurs between the transmission control unit and the communication unit, an amount of data of the second message waiting for transmission between the transmission control unit and the communication unit, and an amount of data which the communication unit is able to transmit per unit time, wherein
the transfer start timing of the first message is determined based on a result of the determination of the data transfer status management unit.

6. The communication control device of claim 5, further comprising:
a buffer unit located between the transmission control unit and the communication unit, wherein
the time-delay includes a delay that occurs in the buffer unit, and
the amount of data of the second message waiting for transmission includes data of the second message stored in the buffer unit.

7. The communication control device of claim 5, wherein
the communication unit comprises a buffer unit, and
the amount of data of the second message waiting for transmission includes data of the second message which is pushed into the buffer unit.

8. A communication control device comprising:
a transmission control unit configured to control transfer start timing of a first message stored in a queue, based on gate control information in which open or close status of a gate corresponding to each of a plurality of queues is specified; and
a communication unit configured to transmit the first message transferred from the transmission control unit in accordance with the transfer start timing, wherein
the transfer start timing of the first message is determined based on a transmission cost at a time when a second message, which has been already determined to pass through the gate, is transmitted by the communication unit, and a transfer status of the second message between the transmission control unit and the communication unit,
the transfer start timing of the first message is determined based on at least one of a first determination result and a second determination result,
the first determination result indicates whether the first message is able to be transmitted based on transmission control information generated from the gate control information, a transmission cost at a time when the first message stored at a top of each queue is transmitted by the communication unit, and transfer cost information that is based on the transmission cost at a time when the second message, which has been already determined to pass through the gate, is transmitted by the communication unit,
the second determination result indicates whether the first message is able to be transferred based on a time-delay that occurs between the transmission control unit and the communication unit, an amount of data of the second message waiting for transmission between the transmission control unit and the communication unit, and an amount of data which the communication unit is able to transmit per unit time, and
the transmission control information of each queue indicates a transmittable data amount of the first message or a transmittable time of the first message, at a time when the transmission control unit determines the transfer start timing of the first message.

9. The communication control device of claim 1, wherein
the transmission control information comprises a plurality of entries,
each of the plurality of entries comprises a period assigned to the entry, and
the period is indicated by number of clock cycles based on an operation clock of the transmission control unit.

10. The communication control device of claim 9, further comprising:
a temporary storage unit configured to temporarily store the transmission control information, wherein
the transmission possibility determination unit is configured to determine whether the first message is able to be transmitted, based on the transmission control information stored in the temporary storage unit.

11. The communication control device of claim 9, further comprising:
    a transmission control information management unit configured to subtract a value from an amount of data or time indicated by the transmission control information, wherein
    the value corresponds to one clock for each operation clock or an actually elapsed time.

* * * * *